United States Patent
Sahlin et al.

(10) Patent No.: US 11,863,329 B2
(45) Date of Patent: Jan. 2, 2024

(54) UPLINK CONTROL SIGNALING ON PUSCH WITH SHORTENED TRANSMISSION TIME INTERVAL (TTI)

(71) Applicant: Telefonaktiebolaget LM Ericsson (publ), Stockholm (SE)

(72) Inventors: Henrik Sahlin, Mölnlycke (SE); Daniel Larsson, Lund (SE); Laetitia Falconetti, Järfälla (SE); Jingya Li, Gothenburg (SE); Gustav Wikström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 532 days.

(21) Appl. No.: 16/324,671

(22) PCT Filed: Aug. 11, 2017

(86) PCT No.: PCT/EP2017/070504
§ 371 (c)(1),
(2) Date: Feb. 11, 2019

(87) PCT Pub. No.: WO2018/029363
PCT Pub. Date: Feb. 15, 2018

(65) Prior Publication Data
US 2019/0190663 A1   Jun. 20, 2019

Related U.S. Application Data

(60) Provisional application No. 62/374,279, filed on Aug. 12, 2016.

(51) Int. Cl.
*H04L 1/1867* (2023.01)
*H04L 1/00* (2006.01)
(Continued)

(52) U.S. Cl.
CPC ............ *H04L 1/1887* (2013.01); *H04L 1/009* (2013.01); *H04L 1/0079* (2013.01);
(Continued)

(58) Field of Classification Search
USPC ....... 370/236, 252, 319, 328, 329, 330, 343, 370/344
See application file for complete search history.

(56) References Cited

U.S. PATENT DOCUMENTS

2011/0142076 A1   6/2011  Ko et al.
2011/0261858 A1* 10/2011  Baldemair ........ H04W 72/0413
                                                       375/130

(Continued)

FOREIGN PATENT DOCUMENTS

CN   102696271 A   9/2012
CN   103427940 A   12/2013
(Continued)

OTHER PUBLICATIONS

Unknown, Author, "PUSCH design for short TTI", 3GPP TSG RAN WG1 Meeting #85, R1-164820, Nanjing, China, May 23-27, 2016, 1-5 (Year: 2016).*

(Continued)

*Primary Examiner* — Nguyen H Ngo
(74) *Attorney, Agent, or Firm* — Murphy, Bilak & Homiller, PLLC

(57) ABSTRACT

According to an aspect, a transmitting device determines, for each of a plurality of transmissions, whether user data to be transmitted within a time transmission interval, TTI, will be closest in time to a DMRS transmitted before the user data or after the user data. If before the user data, all HARQ ACK/NACK data for the transmission is mapped to the earliest in time SC-FDMA symbol carrying user data in the transmission, and to pre-DFT symbols closest in time to the (Continued)

DMRS transmitted before the user data. If after the user data, all HARQ ACK/NACK data for the transmission is mapped to the last in time SC-FDMA symbol carrying user data in the transmission, and to pre-DFT symbols closest in time to the DMRS transmitted after the user data. SC-FDMA signals are formed from user data and control information for the transmission, based on the mapping.

16 Claims, 40 Drawing Sheets

(51) Int. Cl.
H04L 1/1812 (2023.01)
H04L 1/1829 (2023.01)
H04L 5/00 (2006.01)
H04W 28/12 (2009.01)
H04W 28/22 (2009.01)

(52) U.S. Cl.
CPC .......... *H04L 1/0088* (2013.01); *H04L 1/1812* (2013.01); *H04L 1/1854* (2013.01); *H04L 1/1861* (2013.01); *H04L 1/1893* (2013.01); *H04L 5/0053* (2013.01); *H04L 5/0055* (2013.01); *H04L 5/0094* (2013.01); *H04W 28/12* (2013.01); *H04W 28/22* (2013.01); *H04L 5/0051* (2013.01)

(56) References Cited

U.S. PATENT DOCUMENTS

| | | | | |
|---|---|---|---|---|
| 2012/0320880 A1* | 12/2012 | Han | ......................... | H04L 5/001 370/335 |
| 2013/0064228 A1 | 3/2013 | Jang et al. | | |
| 2016/0028518 A1* | 1/2016 | Zhao | ..................... | H04L 1/0088 370/330 |
| 2016/0338049 A1* | 11/2016 | Takeda | .................... | H04L 5/001 |
| 2017/0135090 A1* | 5/2017 | Yin | ....................... | H04L 1/1861 |
| 2018/0310298 A1* | 10/2018 | Li | .......................... | H04L 1/1671 |
| 2019/0028162 A1* | 1/2019 | Lee | ................... | H04W 72/0413 |
| 2019/0037585 A1* | 1/2019 | Li | .......................... | H04L 1/0071 |
| 2019/0159153 A1* | 5/2019 | Li | .......................... | H04L 5/0051 |
| 2019/0373597 A1* | 12/2019 | Bendlin | .............. | H04W 72/044 |
| 2020/0021415 A1* | 1/2020 | Gaal | ..................... | H04L 1/0078 |

FOREIGN PATENT DOCUMENTS

| | | |
|---|---|---|
| CN | 105308886 A | 2/2016 |
| EP | 2346201 A2 | 7/2011 |
| KR | 20100002108 A | 1/2010 |
| KR | 20110084472 A | 7/2011 |
| WO | 2013031119 A1 | 3/2013 |
| WO | 2016142006 A1 | 9/2016 |
| WO | 2017008840 A1 | 1/2017 |
| WO | 2017196250 A1 | 11/2017 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 13)", 3GPP TS 36.212 V13.2.0, Jun. 2016, 1-140.
ETSI, "LTE; Evolved Universal Terrestrial Radio Access (E-UTRA); Multiplexing and channel coding (3GPP TS 36.212 version 13.0.0 Release 13)", ETSI TS 136 212 V13.0.0, Jan. 2016, 1-123.
ETSI, "LTE; Evolved Universal Terrestrial Radio Access (E-UTRA); Physical channels and modulation (3GPP TS 36.211 version 13.0.0 Release 13)", ETSI TS 136 211 V13.0.0, Jan. 2016, 1-143.
Unknown, Author, "Mapping position of control channel for Uplink Shared Channel", 3GPP TSG RAN WG1 Meeting #51 bis, R1-080140, Sevilla, Spain, Jan. 14-18, 2008, 1-2.
Unknown, Author, "On the location of ACK/NACK bits on UL PUSCH", 3GPP TSG RAN WG1 #52, R1-080899, Sorrento, Italy, Feb. 11-15, 2008, 1-3.
Unknown, Author, "PUSCH design for short TTI", 3GPP TSG RAN WGI Meeting #85, R1-164820, Nanjing, China, May 23-27, 2016, 1-5.
Unknown, Author , "Study on PUSCH transmission in shortened TTI", ZTE, 3GPP TSG RAN WG1 Meeting #85 R1-164643, Nanjing, China, May 23-27, 2016, 1-5.

* cited by examiner

UPLINK CONTROL SIGNALING ON PUSCH WITH SHORTENED TRANSMISSION TIME INTERVAL (TTI)

TECHNICAL FIELD

The present disclosure is related to control signaling in wireless communications network, and more particularly is related to control signaling with single-carrier frequency-division multiple access (SC-FDMA), when shortened transmission time intervals (TTIs) are used.

BACKGROUND

Packet data latency is one of the performance metrics that wireless vendors and wireless system operators regularly measure. End-users may also measure packet data latency, using, for example, commonly available "speed test" applications. Latency measurements are performed during all phases of a radio access network system lifetime, when verifying a new software release or system component, when deploying a system, and when the system is in commercial operation.

Shorter latency than that supplied previous generations of radio access technologies (RATs) was one performance metric that guided the design by the 3rd-Generation Partnership Project (3GPP) of the Long-Term Evolution (LTE) wireless technology. LTE is also now recognized by end-users to be a system that provides faster access to internet and lower data latencies than previous generations of mobile radio technologies.

Packet data latency is important not only for the perceived responsiveness of the system. It is also a parameter that indirectly influences the throughput of the system. HTTP/TCP is the dominating application and transport layer protocol suite used on the internet today. According to HTTP Archive (http://httparchive.org/trends.php), the typical size of HTTP-based transactions over the internet are in the range of a few 10's of Kbyte up to 1 Mbyte. In this size range, the TCP protocol's slow start period is a significant part of the total transport period of the packet stream. During TCP's slow start, the performance is latency limited. Hence, improved latency can rather easily be showed to improve the average throughput, for this type of TCP-based data transactions.

Radio resource efficiency can also be positively impacted by latency reductions. Lower packet data latency can increase the number of transmissions possible within a certain delay bound; hence higher Block-Error Rate (BLER) targets can be used for the data transmissions, thus freeing up radio resources and potentially improving the capacity of the system.

One area to address when it comes to packet latency reductions is the reduction of the transport time for data and control signaling, by addressing the length of a transmission time interval (TTI), in some instances also termed a 'transmit-time' interval. For the purposes of the present discussion, a TTI should be understood as the interval in time allocated to a wireless node for a given transmission; the TTI can thus be understood as the scheduling unit, in terms of the time allocated to the transmission. LTE Release 8 uses a TTI of a fixed length, where a TTI corresponds to one subframe (SF) of length 1 millisecond. One such 1-millisecond TTI is constructed by using 14 Orthogonal Frequency-Division Multiplexing (OFDM) or single-carrier frequency-division multiple access (SC-FDMA) symbols, in the case of normal cyclic prefix, and 12 OFDM or SC-FDMA symbols in the case of extended cyclic prefix. In LTE release 13, members of the 3GPP are engaged in specifying transmissions with TTIs that are much shorter than the LTE release-8 TTI.

These shorter TTIs could have any length in time, in terms of some integer number of OFDM or SC-FDMA symbols, within the 1-millisecond subframe defined in the Release 8 LTE specifications. As one example, the duration of the short TTI may be 0.5 milliseconds, i.e. seven OFDM or SC-FDMA symbols for the case with normal cyclic prefix. As another example, the duration of the short TTI may be 2 OFDM/SC-FDMA symbols.

4G wireless access in LTE systems is based on the use of OFDM in the downlink and discrete Fourier-Transform (DFT)-spread OFDM, also known as SC-FDMA, in the uplink. (See 3GPP TS 36.211.) An illustration of DFT-spread OFDM is given in FIG. 1, where information bits are used to calculate an error detection code (CRC, Cyclic Redundancy Check). The information bits and the CRC bits are channel-coded, rate-matched and modulated to complex-valued symbols such as QPSK, 16QAM or 64QAM. Symbols corresponding to several control entities and symbols corresponding to user data payload are multiplexed, precoded by a DFT (transform precoding), mapped to a frequency interval allocated to the transmission, transformed to the time domain, concatenated with a cyclic prefix and finally transmitted over the air, via a radio unit (RU). It will be appreciated that the order of some of the processing blocks might be changed. For example, the modulation might be placed after the multiplexing instead of before. The symbol resulting from the DFT, mapping, IFFT and CP insertion steps is denoted as a SC-FDMA symbol. (3GPP TS 36.211, section 5.6.) Within LTE release 8, a TTI is normally constructed with 14 such SC-FDMA symbols.

This DFT-spread OFDM as used in the LTE uplink has significantly lower PAPR (Peak to Average Power Ratio), as compared to OFDM. By having a low PAPR, the transmitter can be equipped with simpler and less energy consuming radio equipment, which is important for user devices where cost and battery consumptions are important issues. In future 5G systems, this single carrier property with low PAPR might be important not only for uplink but also for downlink and device-to-device transmissions.

Uplink control information (UCI) transmitted by wireless devices in the LTE uplink is used to support data transmission on downlink and uplink transport channels. The UCI in LTE includes: Scheduling Request (SR), indicating that the UE requests uplink resources for uplink data transmission; HARQ ACK/NACK, used to acknowledge the received data transport blocks on the Physical Downlink Shared Channel (PDSCH); and channel-state information (CSI) reports, consisting of a channel quality indicator (CoI), a precoding matrix indicator (PMI), and a rank indicator (RI). The CSI reports are related to downlink channel conditions, and are used to assist the network in performing downlink channel-dependent scheduling.

In LTE, two different methods are supported for transmitting UCI. First, if the wireless device (a "UE" or "user equipment" in 3GPP terminology) does not have a valid scheduling grant, the Physical Uplink Control Channel (PUCCH) is used for transmitting UCI. If the UE does have a valid scheduling grant, however, the UCI is time multiplexed with the coded uplink shared channel (UL-SCH) on to the Physical Uplink Shared Channel (PUSCH), prior to the DFT spreading and OFDM modulation, in order to preserve the low cubic-metric single-carrier property.

As noted above, if the UE has a valid scheduling grant, the UCI is time multiplexed with the data on PUSCH. Since the UE is already scheduled, there is no need to transmit a scheduling request, and the in-band buffer status reports are sent as part of the MAC headers. Therefore, only HARQ ACK/NACK and CSI reports need be transmitted on PUSCH.

FIG. 2 shows the time multiplexing, onto PUSCH, of CQI/PMI, RI and HARQ ACK/NACK with the data symbols. This is based on 3GPP TS 36.212 v13.0.0 and 3GPP TS 36.211 v13.0.0. Here, the column index I=0, 1, . . . , 13 corresponds to a SC-FDMA symbol index; in the illustrated example, the 14 SC-FDMA symbols of an LTE subframe are shown. The row index k=0, 1, . . . , M is the symbol index before the transform precoding (see section 5.3.3 in 3GPP TS 36.211), where M is the number of subcarriers allocated to the PUSCH. Thus, FIG. 2 may be understood as illustrating the mapping of the modulated symbols, prior to their DFT-spreading, to the SC-FDMA time and frequency resources allocated to a given wireless device, where each column represents an SC-FDMA symbol, and each row represents one series of the M complex-valued symbols that are DFT-spread to M allocated subcarriers, for transmission.

Hybrid Automatic Repeat Request (HARQ) acknowledgements and negative acknowledgements, referred to as HARQ ACK/NACK or HARQ A/N, are important for proper operation of the downlink. Thus, the HARQ ACK/NACK symbols are placed in SC-FDMA symbols 2, 4, 9 and 11, which are close to the demodulation reference symbols (DMRS) in the time domain (which covers all k for symbols 3 and 10), so that the channel estimation derived from the DMRS is particularly good when applied to the HARQ ACK/NACK. There is generally a non-zero probability that the UE misses some downlink assignment on the PDCCH. In such cases, the actual HARQ feedback payload from the UE is different from the one expected by the eNodeB. To avoid the effect of such errors, the coded HARQ ACK/NACK symbols are punctured into the coded data on PUSCH.

The coded rank indicator (RI) symbols are placed close to HARQ ACK/NACK symbol positions, so that they are also close to DMRS (symbols 1, 5, 8 and 12), again so that particularly good channel estimation applies to the RI. This is motivated by the fact that the decoding of CQI/PMI relies on the correct decoding of RI.

The CQI/PMI, on the other hand, is mapped across the full subframe duration (symbols 0-2, 4-9 and 11-13). The special mapping of CQI/PMI is less pronounced, since CSI reports are mainly useful for low-to-medium Doppler frequencies. The UL-SCH rate matching takes the presence of the CQI/PMI and RI into account. Note that RI contains both rank indication and CSI-RS resource indication (CRI).

SUMMARY

The existing way of multiplexing UCI and data on PUSCH is designed for a TTI having a fixed length of 1 millisecond. To reduce packet latency, it is desirable to have shorter TTIs, while still using LTE's basic SC-FDMA framework. Uplink transmission on shorter TTIs may be referred to as short Physical Uplink Shared Channel, or sPUSCH. Note that as used herein, the term "TTI" may be used to refer to the signal transmission itself, as mapped to the SC-FDMA framework, where this transmission may have a length that differs from the fixed TTI length in LTE. Accordingly, the term "transmission" and "TTI" may be used interchangeably in the discussion that follows.

For a TTI length of 7 symbols, the multiplexing method currently used by the LTE in one slot (0.5 milliseconds; half a subframe) can be reused. As seen in FIG. 2, this approach provides resources for HARQ ACK/NACK, RI, CQI/PMI, and DMRS, in addition to resources for user data (UL-SCH data). However, if the TTI length is less than 7 symbols, some SC-FDMA symbols that are used for UCI may become unavailable. In addition, the DMRS positions for sPUSCH may be changed, so that the existing UCI mapping rule is no longer applicable. Therefore, UCI transmission on sPUSCH needs to be redesigned.

Disclosed herein are several ways of multiplexing UCI and data on PUSCH with shortened TTIs. In particular, different UCI mapping solutions are provided by taking into account different short TTI lengths and different DMRS configurations for a PUSCH.

Embodiments of the presently disclosed techniques involve mapping HARQ ACK/NACK data to earlier or later SC-FDMA symbols of the TTI and pre-DFT symbols, relative to the user data in a transmission, based on a determination of whether user data in the transmission will be closest in time to a DMRS transmitted before the user data or to a DMRS transmitted after the user data. Other embodiments include the corresponding de-mapping.

According to some embodiments, a method in a transmitting device of mapping control information within TTIs, for each of a plurality of transmissions of control information and user data as SC-FDMA signals, where each transmission comprises one or more SC-FDMA symbols and where the control information in each transmission comprises at least HARQ ACK/NACK data. The method includes determining, for each transmissions, whether user data to be transmitted in the transmission will be closest in time to a DMRS transmitted before the user data or to a DMRS transmitted after the user data. The method includes, for each of the plurality of transmissions in which user data to be transmitted in the transmission will be closest in time to DMRS transmitted before the user data, mapping all HARQ ACK/NACK data for the transmission to the earliest in time SC-FDMA symbol carrying user data in the transmission, and to pre-DFT symbols that correspond to that SC-FDMA symbol and that are closest in time to the DMRS transmitted before the user data. The method also includes, for each of the plurality of transmissions in which user data to be transmitted in the transmission will be closest in time to DMRS transmitted after the user data, mapping all HARQ ACK/NACK data for the transmission to the last in time SC-FDMA symbol carrying user data in the transmission, and to pre-DFT symbols that correspond to that SC-FDMA symbol and that are closest in time to the DMRS transmitted after the user data. The method further includes forming, for each of the plurality of transmission, an SC-FDMA signal from the user data and control information for the transmission, based on the mapping of the HARQ ACK/NACK data. This provides the advantage that, because the HARQ ACK/NACK data is sent as close to the DMRS for short TTIs where the DMRS is not sent in a fixed symbol position of a transmission time interval, and in some cases not sent in the TTI in which the user data is to be transmitted, the HARQ ACK/NACK can be decoded based on the most recent DMRS. This in turn provides a more accurate decoding result considering varying channel conditions. In some embodiments, one or more of the transmissions may also include RI data, and/or CQI data; rules for mapping these data to the transmissions are also described herein.

In some aspects the method further comprises, for each of one or more transmissions in which two or more SC-FDMA symbols are to carry user data, mapping rank indicator, RI, data for the transmission to an SC-FDMA symbol that carries user data and that is immediately adjacent in time to the SC-FDMA symbol to which the HARQ ACK/NACK data is mapped, and to pre-DFT symbols that correspond to that adjacent SC-FDMA symbol and that are as close as possible to the DMRS closest in time to the user data of the transmission.

In some aspects the method further comprises, for each of one or more transmissions, mapping rank indicator, RI, data for the transmission to the same SC-FDMA symbol to which the HARQ ACK/NACK data is mapped, and to pre-DFT symbols that are as close as possible to the pre-DFT symbols to which the HARQ ACK/NACK data is mapped, given a predetermined maximum number of pre-DFT symbols allocated to HARQ ACK/NACK data.

In other aspects the method further comprises determining, for each of one or more transmissions, whether more than one SC-FDMA symbol of the transmission is to carry user data. For each of the one or more transmissions in which only one SC-FDMA symbol is to carry user data, rank indicator, RI, data for the transmission/TTI is mapped to the same SC-FDMA symbol to which the HARQ ACK/NACK data is mapped, and to pre-DFT symbols that correspond to that same SC-FDMA symbol but that are as far as possible from the DMRS closest in time to the user data of the transmission. For each of the one or more transmissions in which two or more SC-FDMA symbols are to carry user data, RI data for the transmissions is mapped to an SC-FDMA symbol that carries user data and that is immediately adjacent in time to the SC-FDMA symbol to which the HARQ ACK/NACK data is mapped, and to pre-DFT symbols that correspond to that adjacent SC-FDMA symbol and that are as close as possible to the DMRS closest in time to the user data of the transmission.

In some aspects the method further comprises, for each of one or more transmissions in which two or more SC-FDMA symbols are to carry user data, mapping channel quality indicator, CQI, data for the transmission as evenly as possible to the two or more SC-FDMA symbols that are to carry user data.

In other aspects the method further comprises, for each of one or more transmissions in which two or more SC-FDMA symbols are to carry user data, mapping channel quality indicator, CQI, data for the transmission, to the extent possible, to pre-DFT symbols that correspond to the first SC-FDMA symbol carrying user data for the transmission, and mapping any remaining CQI data to one or more subsequent SC-FDMA symbols of the transmission.

According to some embodiments, a transmitter apparatus configured to map control information within TTIs for each of a plurality of transmissions of control information and user data as SC-FDMA signals, where each of the plurality of transmissions comprises one or more SC-FDMA symbols and where the control information comprises at least HARQ ACK/NACK data for each of the plurality of transmissions, includes processing circuitry configured to determine, for each of the plurality of transmissions, whether user data to be transmitted in the transmission will be closest in time to DMRS transmitted before the user data or to a DMRS transmitted after the user data. The processing circuitry is configured to, for each of the plurality of transmissions in which user data to be transmitted in the transmission will be closest in time to DMRS transmitted before the user data, map all HARQ ACK/NACK data for the transmission to the earliest in time SC-FDMA symbol carrying user data in the transmission, and to pre-DFT symbols that correspond to that SC-FDMA symbol and that are closest in time to the DMRS transmitted before the user data. The processing circuitry is also configured to, for each of the plurality of transmissions in which user data to be transmitted in the transmission will be closest in time to DMRS transmitted after the user data, map all HARQ ACK/NACK data for the transmission to the last in time SC-FDMA symbol carrying user data in the transmission, and to pre-DFT symbols that correspond to that SC-FDMA symbol and that are closest in time to the DMRS transmitted after the user data. The processing circuitry is configured to form, for each of the plurality of transmissions, an SC-FDMA signal from the user data and control information for the transmission, based on the mapping of the HARQ ACK/NACK data. The transmitter apparatus also includes transmitter circuitry configured to transmit the SC-FDMA signals. This provides the advantage that, because the HARQ ACK/NACK data is sent as close to the DMRS for short TTIs where the DMRS is not sent in a fixed symbol position of a transmission time interval, and in some cases not sent in the TTI in which the user data is to be transmitted, a receiver can decode the HARQ ACK/NACK based on the most recent DMRS. This in turn provides a more accurate decoding result considering varying channel conditions. An example of a transmitted apparatus is a wireless device or User Equipment (UE). Again, in some embodiments, one or more of the transmissions may also include RI data, and/or CQI data; transmitter apparatuses configured to map these data to the transmissions are also described herein.

According to some embodiments, a method in a receiving device of de-mapping control information from within a transmission for each of a plurality of transmissions of control information and user data received as SC-FDMA signals, where each of the plurality of transmissions comprises one or more SC-FDMA symbols and where the control information comprises at least HARQ ACK/NACK data for each of the plurality of transmissions, includes receiving, for each of the plurality of transmissions, an SC-FDMA signal. The method also includes determining, for each of the plurality of transmissions, whether user data received in the transmission is closest in time to a DMRS transmitted before the user data or to a DMRS transmitted after the user data. The method includes, for each of the plurality of transmissions in which user data received in the transmission is closest in time to DMRS transmitted before the user data, de-mapping all HARQ ACK/NACK data for the transmission from the earliest in time SC-FDMA symbol carrying user data in the transmission, and from post-despreading symbols that correspond to that SC-FDMA symbol and that are closest in time to the DMRS transmitted before the user data. The method also includes, for each of the plurality of transmissions in which user data received in the transmission is closest in time to DMRS transmitted after the user data, de-mapping all HARQ ACK/NACK data for the transmission from the last in time SC-FDMA symbol carrying user data in the transmission, and from post-despreading symbols that correspond to that SC-FDMA symbol and that are closest in time to the DMRS transmitted after the user data. This provides the advantage that, because the HARQ ACK/NACK data is received as close to the DMRS for short TTIs where the DMRS is not received in a fixed symbol position of a transmission time interval, and in some cases not received in the TTI in which the user data is received, the receiver can decode the HARQ ACK/NACK based on the most recent DMRS. This in turn provides a more accurate decoding result considering varying channel conditions.

According to some embodiments, a receiver apparatus configured to de-map control information from within a TTI for each of a plurality of transmissions of control information and user data received as SC-FDMA signals, where each of the plurality of transmissions comprises one or more SC-FDMA symbols and where the control information comprises at least HARQ ACK/NACK data for each of the plurality of transmissions, includes receiver circuitry configured to receive, for each of the plurality of transmissions, an SC-FDMA signal. The receiver apparatus also includes processing circuitry configured to determine, for each of the plurality of transmissions, whether user data received in the transmission is closest in time to a DMRS transmitted before the user data or to a DMRS transmitted after the user data. The processing circuitry is configured to, for each of the plurality of transmissions in which user data received in the transmission is closest in time to DMRS transmitted before the user data, de-map all HARQ ACK/NACK data for the transmission from the earliest in time SC-FDMA symbol carrying user data in the transmission, and from post-despreading symbols that correspond to that SC-FDMA symbol and that are closest in time to the DMRS transmitted before the user data. The processing circuitry is also configured to, for each of the plurality of transmissions in which user data received in the transmission is closest in time to DMRS transmitted after the user data, de-map all HARQ ACK/NACK data for the transmission from the last in time SC-FDMA symbol carrying user data in the transmission, and from post-despreading symbols closest in time to the DMRS transmitted after the user data. This provides the advantage that, because the HARQ ACK/NACK data is received as close to the DMRS for short TTIs where the DMRS is not received in a fixed symbol position of a transmission time interval, and in some cases not received in the TTI in which the user data is received, the receiver can decode the HARQ ACK/NACK based on the most recent DMRS. This in turn provides a more accurate decoding result considering varying channel conditions.

In another embodiment a transmitter apparatus is configured to map control information within a transmission time interval, TTI, for each of a plurality of transmissions of control information and user data as Single-Carrier Frequency-Division Multiple Access, SC-FDMA, signals, where each of the plurality of transmissions comprises one or more SC-FDMA symbols and where the control information for each transmission comprises at least Hybrid Automatic Repeat-Request, HARQ, ACK/NACK data. The apparatus comprising a determining module for determining, for each of the plurality of transmissions, whether user data to be transmitted in the transmission will be closest in time to a DMRS transmitted before the user data or to a DMRS transmitted after the user data. The apparatus further comprising a mapping module for, for each of the plurality of transmissions in which user data to be transmitted in the transmission will be closest in time to DMRS transmitted before the user data, mapping all HARQ ACK/NACK data for the transmission to the earliest in time SC-FDMA symbol carrying user data in the transmission, and to pre-DFT symbols that correspond to that SC-FDMA symbol and that are closest in time to the DMRS transmitted before the user data. The mapping module also for, for each of the plurality of transmissions in which user data to be transmitted in the transmission will be closest in time to DMRS transmitted after the user data, mapping all HARQ ACK/NACK data for the transmission to the last in time SC-FDMA symbol carrying data in the transmission, and to pre-DFT symbols that correspond to that SC-FDMA symbol and that are closest in time to the DMRS transmitted after the user data. The apparatus further comprising a signal forming module for forming, for each of the plurality of transmissions, an SC-FDMA signal from user data and control information for the transmission, based on the mapping of the HARQ ACK/NACK data.

In another embodiment a receiver apparatus is configured for de-mapping control information from within a transmission time interval, TTI, for each of a plurality of transmissions of control information and user data received as Single-Carrier Frequency-Division Multiple Access, SC-FDMA, signals, where each of the plurality of transmissions comprises one or more SC-FDMA symbols and where the control information for each transmission comprises at least Hybrid Automatic Repeat-Request, HARQ, ACK/NACK data. The apparatus comprising a receiving module for receiving, for each of the plurality of transmissions, an SC-FDMA signal. The apparatus further comprising a determining module for determining, for each of the plurality of transmissions, whether user data received in the transmission is closest in time to a DMRS transmitted before the user data or to a DMRS transmitted after the user data. The apparatus further comprising a de-mapping module for, for each of the plurality of transmissions in which user data received in the transmission is closest in time to DMRS transmitted before the user data, de-mapping all HARQ ACK/NACK data for the transmission from the earliest in time SC-FDMA symbol carrying user data in the transmission, and from post-despreading symbols that correspond to that SC-FDMA symbol and that are closest in time to the DMRS transmitted before the user data. The de-mapping module is also for, for each of the plurality of transmissions in which user data received in the transmission is closest in time to DMRS transmitted after the user data, de-mapping all HARQ ACK/NACK data for the transmission from the last in time SC-FDMA symbol carrying data in the transmission, and from post-despreading symbols that correspond to that SC-FDMA symbol and that are closest in time to the DMRS transmitted after the user data.

Further aspects of the present invention are directed to an apparatus, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
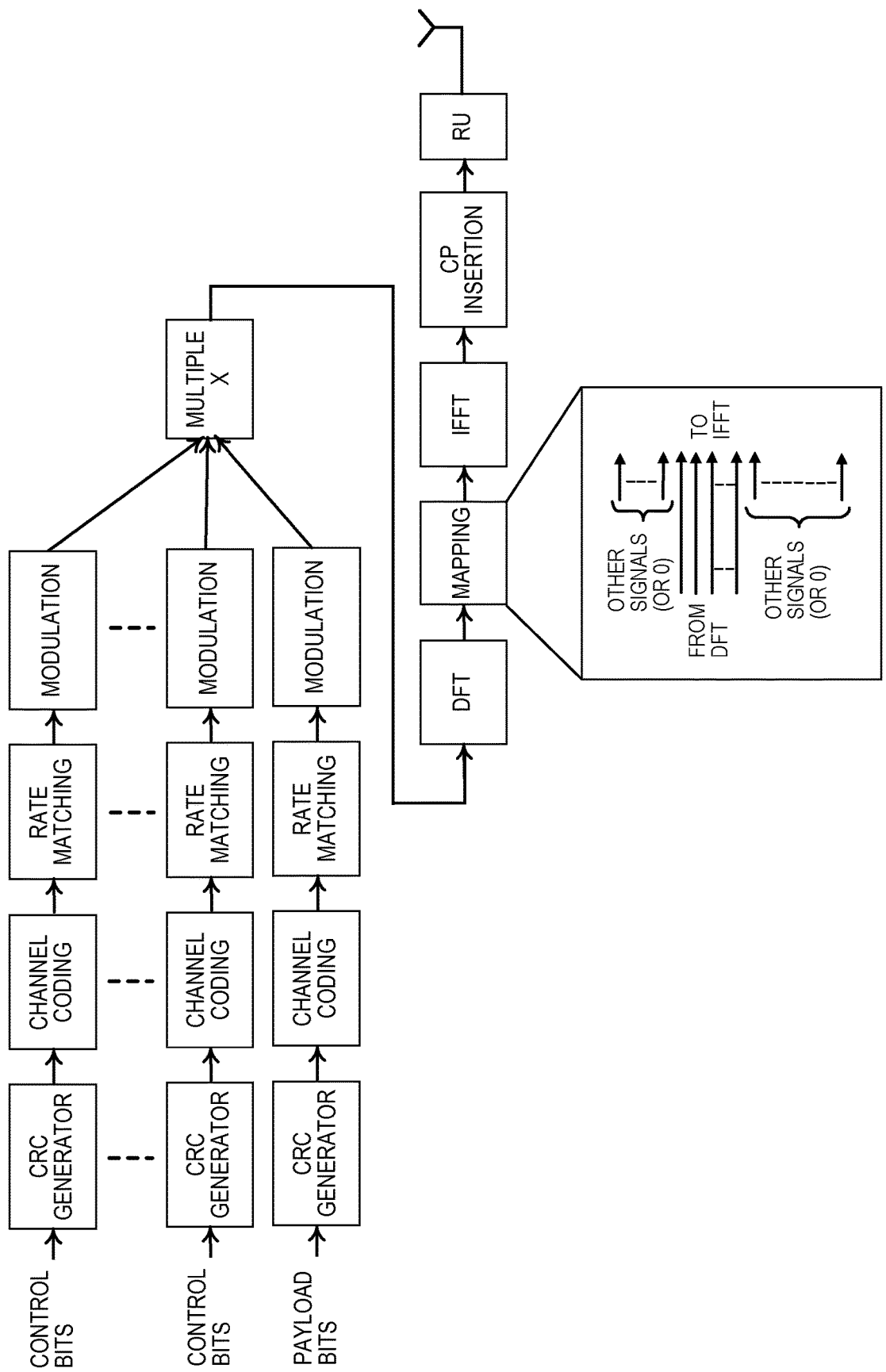
FIG. 1 illustrates an example of DFT-spread OFDM, or SC-FDMA.

In the discussion that follows, several ways of multiplexing control information (including, for example, uplink control information, or UCI, onto a shared channel (such as the PUSCH) transmitted by an SC-FDMA signal with shortened transmission time intervals (TTIs). In particular, different mapping solutions are provided by taking into account different short TTI lengths and different demodulation reference signal (DMRS) configurations for the shared channel. The described solutions enable the transmission of uplink control signals on shared channels with shortened TTIs, to obtain improved latency while taking account of the need for reliable reception of certain control information, such as HARQ ACK/NACK data.

As discussed in the background section above, one way to reduce latency in a wireless system is to reduce the TTI length. However, when the length of the TTI is reduced, such as in an uplink transmission, transmitting DMRS with one or more SC-FDMA symbols, for each short TTI, leads to an increased overhead and a corresponding decrease in data rates.

To reduce the overhead, one possible approach is to multiplex the reference signals from several transmitters into the same SC-FDMA symbol while the user data from different transmitters are transmitted in separate SC-FDMA symbols. According to another possible approach, which may be applied in the downlink, for example, short Physical Downlink Shared Channel (PDSCH), or sPDSCH, transmissions do not necessarily contain DMRS if recent DMRS transmissions to the same UE have occurred. According to this approach, the presence of DMRS in a downlink short TTI is either signaled in the short PDCCH, or the UE tries to blindly decode the transmission under the two assumptions that DMRS is present or not. This dynamic DMRS insertion approach can also be applied to PUSCH for uplink transmissions within short TTIs. Note that the term "TTI," as used here, refers to the transmission, as mapped to the SC-FDMA framework—thus, a "short TTI" refers to a transmission that is shorter (with respect to the number of SC-FDMA symbols) than an LTE transmission of standard length, which is a 1-millisecond subframe with 12 or 14 symbols.

In the LTE context, it is desirable to provide for uplink short TTI patterns for PUSCH, with several different short TTI lengths. One approach to handling the issue of where to place the reference symbols and data symbols is to fix the positions of reference symbols and data symbols, for each of several predefined short TTIs for a PUSCH, for each subframe. The techniques described herein provide a more flexible approach.

Throughout the discussion that follows, the term short PUSCH (sPUSCH) is used to denote an uplink physical shared channel with short TTIs/transmissions. The control information described herein will also be referred to as uplink control information (UCI). It will be appreciated, however, that the disclosed techniques are not limited to channels known by this name, and are not necessarily limited to uplink transmissions and uplink control information.

Detailed below and in the accompanying figures are several methods of time-multiplexing control information, e.g., UCI, and data on sPUSCH. Several of the multiplexing methods are designed based on the following rules.

A mapping rule for HARQ ACK/NACK: HARQ ACK/NACK is placed in time-domain samples (before DFT-spreading of the SC-FDMA symbols) as close to DMRS as possible in order to obtain good channel estimation. Note that elsewhere herein, these time-domain samples, which are the time-ordered samples provided to the input of the DFT block in FIG. 1, may be referred to as "pre-DFT symbols." These time-domain symbols can be as close to the DMRS as possible in two different ways, depending on whether they are mapped to an SC-FDMA symbol that follows the symbol carrying DMRS or to an SC-FDMA symbol that precedes the symbol carrying DMRS. If these time-domain symbols are mapped to an SC-FDMA symbol that follows the closest symbol carrying DMRS, they are closest to that DMRS if they appear first, or as close as possible to the beginning, in the time-ordered series of M symbols that are supplied to a size-M DFT for DFT-spreading, with the output of the DFT then being mapped to the SC-FDMA symbol with an Inverse Fast-Fourier Transform (IFFT). If these time-domain symbols are instead mapped to an SC-FDMA symbol that precedes the closest symbol carrying DMRS, they are closest to that DMRS if they appear last, or as close as possible to the end, in the time-ordered series of M symbols that are supplied to a size-M DFT for DFT-spreading, with the output of the DFT then being mapped to the SC-FDMA symbol with an IFFT.

A mapping rule for RI/CRI is that a fixed starting position of RI is established, in such a way that the mapping of RI is independent of the HARQ-A/N mapping. According to a first option, "Option 1," this is done by first defining the maximum number of complex-valued symbols that may be used for HARQ ACK/NACK, where not necessarily all of these complex-valued symbols are used for HARQ ACK/NACK in every TTI. The mapping of RI starts after this maximum number of complex-valued symbol positions. With this approach, the RI is placed near to DMRS, to obtain good channel estimation. According to a second option, "Option 2," the RI mapping starts from the other end of the same SC-FDMA symbol used for HARQ ACK/NACK. According to a third option, "Option 3," if there is more than one SC-FDMA symbol carrying user data on the sPUSCH, RI mapping starts from a different SC-FDMA symbol from the one carrying HARQ ACK/NACK, and the RI mapping is placed as close to DMRS as possible, within that SC-FDMA symbol.

If DMRS is transmitted before or at the beginning of sPUSCH, Option 1 and Option 2 result in that HARQ feedback and RI can be time multiplexed at the beginning of sPUSCH close to the DMRS, which gives an optimal mapping from the latency reduction perspective. Option 3 allows for the best flexibility of UCI mapping, that is, more HARQ feedback bits and RI bits can be multiplexed, as compared to Option 1 and Option 2.

Figure 2:
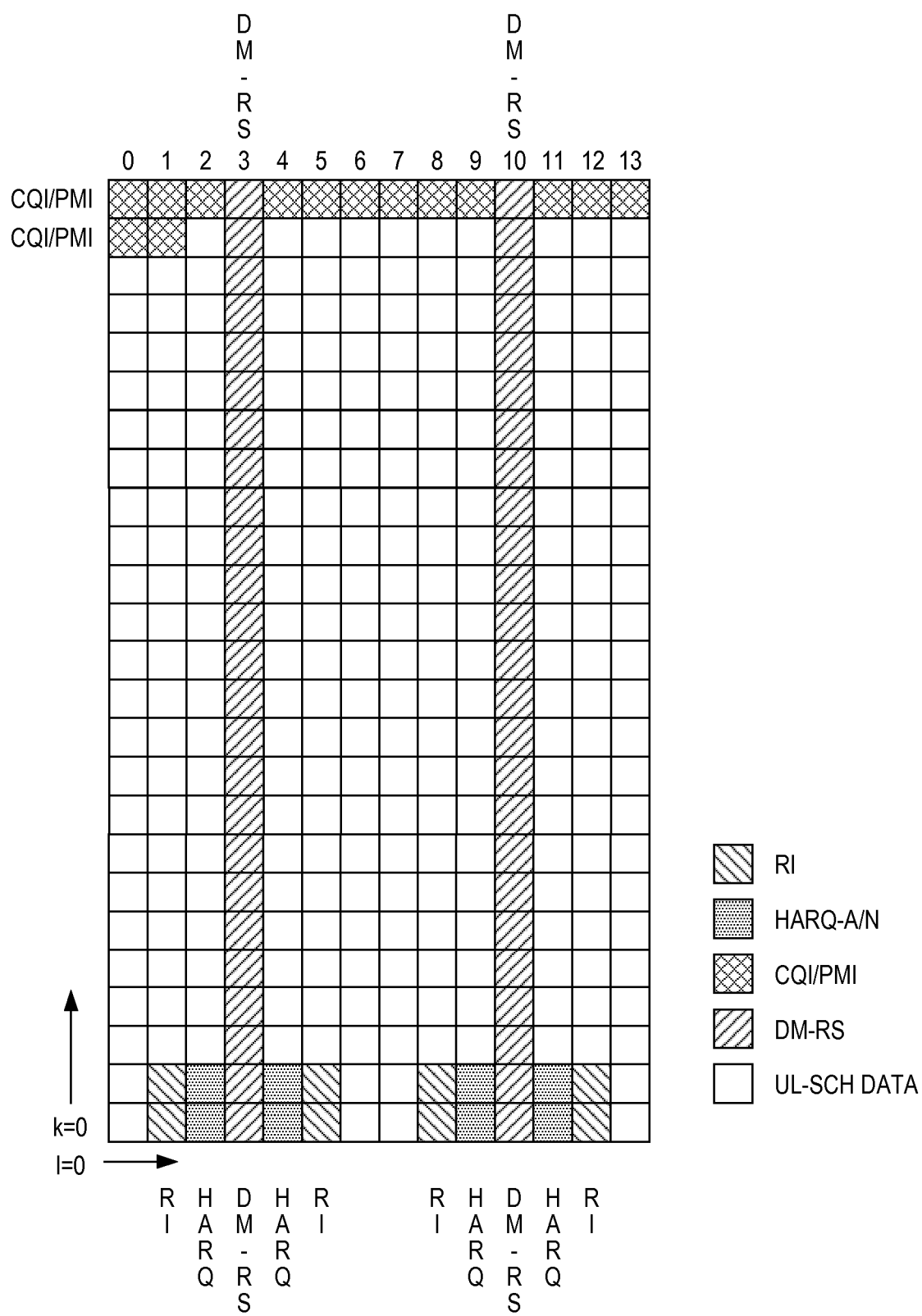
FIG. 2 illustrates time multiplexing UCI and data on PUSCH.

A mapping rule for CQI/PMI is that if there is only one SC-FDMA symbol carrying user data on sPUSCH, the CQI/PMI is mapped to the same SC-FDMA symbol carrying the HARQ ACK/NACK, to pre-DFT symbols that are mapped to that same SC-FDMA and unused for RI/CRI. If there is more than one SC-FDMA symbol carrying user data on the sPUSCH, on the other hand, there are two options. According to a first option, "Option 1," the CQI/PMI data, which may be referred to simply as "CQI data" may be mapped to all SC-FDMA symbols within the sPUSCH on one "row", i.e., to the same position in the pre-DFT samples for the respective SC-FDMA's before continuing on the next row. Referring to FIG. 2 and its description above, it should be appreciated that a "row," as that term is used here, refers to a given k in the illustrated pattern, where the row index k=0, 1, . . . , M in FIG. 2 is the symbol index before the transform precoding, where M is the number of subcarriers allocated to the PUSCH. According to a second option for CQI data mapping, "Option 2," the CQI data are first mapped to pre-DFT symbols corresponding to the first SC-FDMA symbol and left unused by RI/CRI, before using pre-DFT symbols mapped to the next SC-FDMA, if needed.

Option 1 for the CQI data mapping provides the best flexibility for multiplexing UCI. It also provides time diversity for CQI/PMI. For Option 2, since UCI is time multiplexed at the beginning of sPUSCH, this mapping rule is latency optimized, if DMRS is transmitted before or at the beginning of sPUSCH.

To further simplify the UCI mapping design, a mirroring method can be considered, where the UCI mapping patterns for the cases of DMRS transmitted before and after data are mirrored with each other against the DMRS symbol. In other words, any of the above mapping rules may be used to first design the UCI mapping for the cases where the DMRS is transmitted before data, and then, obtain the UCI mapping for the cases where the DMRS is transmitted after data by mirroring the first obtained mapping. The reverse procedure may also be used, i.e., where the above mapping rules are used to first design the UCI mapping for the cases where the DMRS is transmitted after the data, and then the UCI mapping for the cases where the DMRS is transmitted after data is obtained by mirroring the first obtained mapping.

As a preliminary matter, example calculations and techniques for determining the size of the control region on sPUSCH are presented. First, how to determine the number of coded modulation symbols per layer Q' for HARQ ACK/NACK and RI/CRI is considered.

For the case when only one transport block is transmitted in the sPUSCH conveying the HARQ-ACK bits, RI or CRI bits:

$$Q' = \min\left(\left\lceil \frac{O \cdot M_{sc}^{sPUSCH-initial} \cdot N_{symb}^{sPUSCH-initial} \cdot \beta_{offset}^{sPUSCH}}{\sum_{r=0}^{C-1} K_r} \right\rceil, Q'_{max}\right) \quad (1)$$

$$\approx \min\left(\left\lceil \frac{O}{Q_m \cdot R} \cdot \beta_{offset}^{sPUSCH} \right\rceil, Q'_{max}\right),$$

where O is the number of HARQ-ACK bits, rank indicator bits or CRI bits, and $Q_m$ and R are the modulation order and coding rate of the transport block. $M_{sc}^{sPUSCH-initial}$ is the scheduled bandwidth for initial sPUSCH transmission for the transport block, expressed as a number of subcarriers, and $N_{symb}^{sPUSCH-initial}$ is the number of SC-FDMA symbols per short TTI for initial sPUSCH transmission for the same transport block, excluding the DMRS symbols and SRS symbols if SRS is transmitted in the initial sPUSCH. C is the number of code blocks for initial PUSCH transmission for the same transport block (TB), $K_r$ is the number of bits in the code block number r, and $\beta_{offset}^{sPUSCH}$ is the MSC offset between the data and the corresponding control information, configured by high-layer signaling to control the additional coding gain (i.e., lower coding rate) for the UCI over data. $Q'_{max}$ is the maximum number of coded modulation symbols (i.e., the maximum amount of resources) for the corresponding control information. The value of $Q'_{max}$ may differ for different UCI mapping rules.

For the case when two transport blocks are transmitted in the PUSCH conveying the HARQ-ACK bits, rank indicator bits or CRI bits:

$$Q' = \max[\min(Q'_{temp}, Q'_{max}), Q'_{min}], \text{ with} \quad (2)$$

$$Q'_{temp} = \left[ \frac{O \cdot M_{sc}^{sPUSCH-initial(1)} \cdot N_{symb}^{sPUSCH-initial(1)} \cdot M_{sc}^{sPUSCH-initial(2)} \cdot N_{symb}^{sPUSCH-initial(2)} \cdot \beta_{offset}^{sPUSCH}}{\sum_{r=0}^{C^{(1)}-1} K_r^{(1)} \cdot M_{sc}^{sPUSCH-initial(2)} \cdot N_{symb}^{sPUSCH-initial(2)} + \sum_{r=0}^{C^{(2)}-1} K_r^{(2)} \cdot M_{sc}^{sPUSCH-initial(1)} \cdot N_{symb}^{sPUSCH-initial(1)}} \right]$$

$$\approx \left[ \frac{O}{Q_m^{(1)} \cdot R^{(1)}} \cdot \beta_{offset}^{sPUSCH} + \frac{O}{Q_m^{(2)} \cdot R^{(2)}} \cdot \beta_{offset}^{sPUSCH} \right],$$

where O is the number of HARQ-ACK bits, rank indicator bits or CRI bits, and $Q_m^{(x)}$ and $R^{(x)}$, x={1,2}, are the modulation order and coding rate of the first and second transport block, respectively. $M_{sc}^{PUSCH-initial(x)}$, x={1,2} are the scheduled bandwidths for sPUSCH transmission in the initial short TTI for the first and second transport block, respectively, expressed as a number of subcarriers, and $N_{symb}^{PUSCH-initial(x)}$, x={1,2} are the number of SC-FDMA symbols per short TTI for initial sPUSCH transmission for the first and second transport block, respectively, excluding the DMRS symbols and SRS symbols if SRS is transmitted in the initial sPUSCH. $C^{(x)}$, x={1,2} are the number of code blocks for initial PUSCH transmission for the first and second transport block, respectively, and $K_r^{(x)}$, x={1,2} are the number of bits in the code block number r for the first and second transport block, respectively. $Q_{min}' = O$ if $O \leq 2$, $Q_{min}' = \lceil 2O/Q_m' \rceil$ if $3 \leq O \leq 11$ with $Q_m' = \min(Q_m^1, Q_m^2)$ where $Q_m^x$, x={1,2} is the modulation order of transport block "x", and $Q_{min}' = \lceil 2O_1/Q_m' \rceil + \lceil 2O_2/Q_m' \rceil$ if $O > 11$ with $O_1 = \lceil O/2 \rceil$ and $O_2 = O - \lceil O/2 \rceil$. $\delta_{offset}^{sPUSCH}$ is the MSC offset between the data and the corresponding control information, configured by high-layer signaling to control the additional coding gain (i.e., lower coding rate) for the UCI over data, $Q_{max}'$ is the maximum number of coded modulation symbols (i.e., the maximum amount of resources) for the corresponding control information. The value of $Q_{max}'$ may differ for different UCI mapping rules.

To determine the number of coded modulation symbols per layer Q' for CQI/PMI:

$$Q' = \min\left(\left\lceil \frac{(O+L) \cdot M_{sc}^{sPUSCH-initial(x)} \cdot N_{symb}^{sPUSCH-initial(x)} \cdot \beta_{offset}^{sPUSCH}}{\sum_{r=0}^{C^{(x)}-1} K_r^{(x)}} \right\rceil, M_{sc}^{sPUSCH} \cdot N_{symb}^{sPUSCH} - \frac{Q_{RI}^{(x)}}{Q_m^{(x)}} \right) \quad (3)$$

$$\approx \min\left(\left\lceil \frac{(O+L)}{Q_m^{(x)} \cdot R^{(x)}} \cdot \beta_{offset}^{sPUSCH} \right\rceil, M_{sc}^{sPUSCH} \cdot N_{symb}^{sPUSCH} - Q_{RI}'^{(x)} \right),$$

where O is the number of CQI/PMI bits, and L is the number of CRC bits given by $$L = \begin{cases} 0 & O \leq 11 \\ 8 & \text{otherwise} \end{cases},$$

and $M_{sc}^{sPUSCH}$ is the scheduled bandwidth for current sPUSCH transmission for the transport block, expressed as a number of subcarriers. $N_{symb}^{sPUSCH}$ is the number of SC-FDMA symbols for the current sPUSCH transmission, excluding the DMRS symbols and SRS symbols if SRS is transmitted in the current sPUSCH, $Q_{RI}^{(x)}$ and $Q'_{RI}^{(x)}$ are the number of coded bits of RI and the number of coded modulation symbols of RI, respectively, multiplexed with the transport block with the highest IMCS value, and $Q_m^{(x)}$ and $R^{(x)}$ are the modulation order and coding rate of the transport block with the highest IMCS value indicated by the initial UL grant. $M_{sc}^{PUSCH-initial(x)}$, $N_{symb}^{PUSCH-initial(x)}$, $C^{(x)}$ and $K_r^{(x)}$ are parameters related to the same transport block.

Equation (3), above, applies for all the UCI mapping rules presented above. For equations (1) and (2), the value of $Q_{max}'$ depends on the mapping rules used for HARQ ACK/NACK and RI. If Option 1 of the RI/CRI mapping rules is adopted, that is, if a maximum number of coded modulation symbols for HARQ ACK/NACK, $Q'_{ACK,max}$, is defined and the mapping of RI starting after this maximum number of code modulation symbol position, the value of $Q_{max}'$ is determined as, for HARQ-ACK: $Q_{max}' = \alpha \cdot Q'_{ACK,max}$. For RI/CRI, $Q_{max}' = \alpha \cdot (M_{sc}^{sPUSCH} - Q'_{ACK,max})$. If Option 2 or Option 3 of the RI/CRI mapping rules is adopted, the value of $Q_{max}'$ is determined as, for HARQ-ACK, $Q_{max}'=\alpha \cdot M_{sc}^{sPUSCH}$. For RI/CRI, $Q_{max}'=\alpha \cdot M_{sc}^{sPUSCH}$. In either case, $\alpha$ is the number of SC-FDMA symbols used for HARQ-ACK and RI mapping. For all the examples discussed below for 2, 3, and 4-symbol sPUSCH, as well as the examples shown in FIG. 27, FIG. 28, and on the right-hand side of FIG. 29, $\alpha=1$. For the examples shown in FIG. 26 and on the left-hand side and middle of FIG. 29, for 7-symbol sPUSCH, $\alpha=2$.

In the following, UCI mapping solutions for different short TTI lengths are presented, considering different DMRS configurations for a sPUSCH, according to various embodiments. Many of these mappings conform to the rules presented above. Other variants, which may not conform to all of these rules, are also discussed and/or illustrated. Note that throughout this disclosure, except where legacy LTE mappings are illustrated, i.e., in FIGS. 2 and 26, it is assumed that the order of the modulated data and DMRS symbol mapping is from k=0 (bottom row of the figures) to a maximum k (top row of figures). If the order of modulated data and DMRS symbol mapping is from top to bottom, which is the case for current LTE mappings, the UCI mapping for the cases where DMRS is transmitted before the data, as shown in the figures discussed below, should be used for the cases where DMRS is transmitted after the data instead, and vice-versa.

UCI Mapping on 2-Symbol sPUSCH

Figure 3:
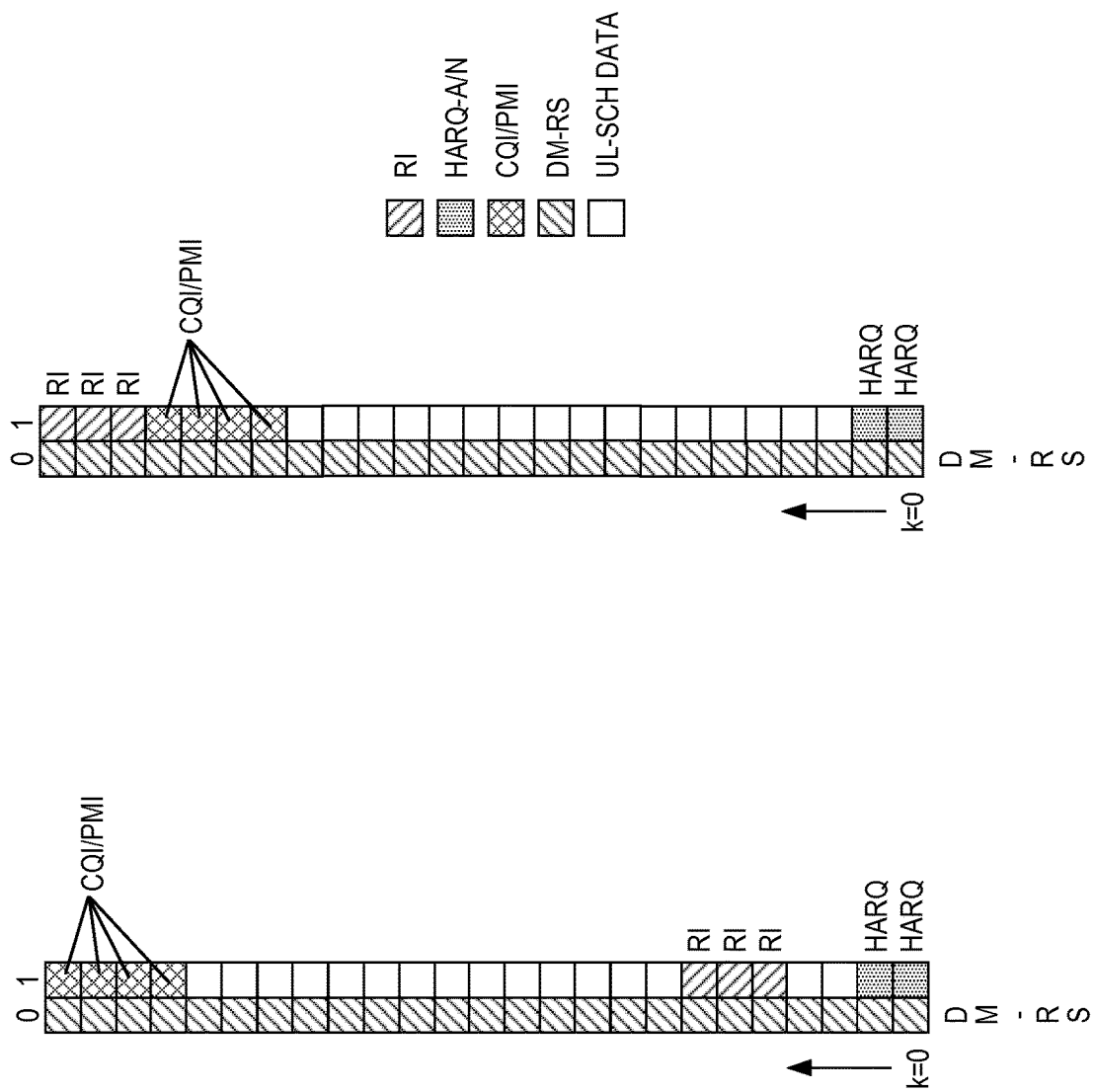
FIG. 3 illustrates multiplexing of UCI, DMRS and data on 2-symbol sPUSCH. sPUSCH is configured with DMRS+data, according to some embodiments.

In this section, some examples of UCI mapping on 2-symbol sPUSCH are listed, considering different DMRS configurations. FIG. 3 illustrates two examples of multiplexing UCI, DMRS and data on 2-symbol sPUSCH, where the first SC-FDMA symbol of sPUSCH is used for transmitting DMRS, and the second symbol is for data transmission.

On the left-hand side of FIG. 3, the maximum number of complex-valued symbols for HARQ ACK/NACK is predefined, in this example as 4. In the particular example illustrated, only two are actually used, so the remaining two are used for UL-SCH data. The mapping of RI starts from the 5th complex-valued symbol from the bottom (symbols 5-7 from bottom). The mapping of CQI/PMI starts from the top of the second SC-FDMA symbol (top 4 symbols). In the alternative approach shown on the right-hand side of FIG. 3, the mapping of RI starts from the top of the second symbol, and the mapping of CQI/PMI starts after the RI. The benefit of this alternative is that there is no need to define a maximum number of complex-valued symbols for HARQ ACK/NACK, which gives more freedom for HARQ ACK/NACK mapping. The drawback is that the RI is placed not as close to DMRS, as compared to the mapping shown in the left-hand side of FIG. 3.

Figure 4:
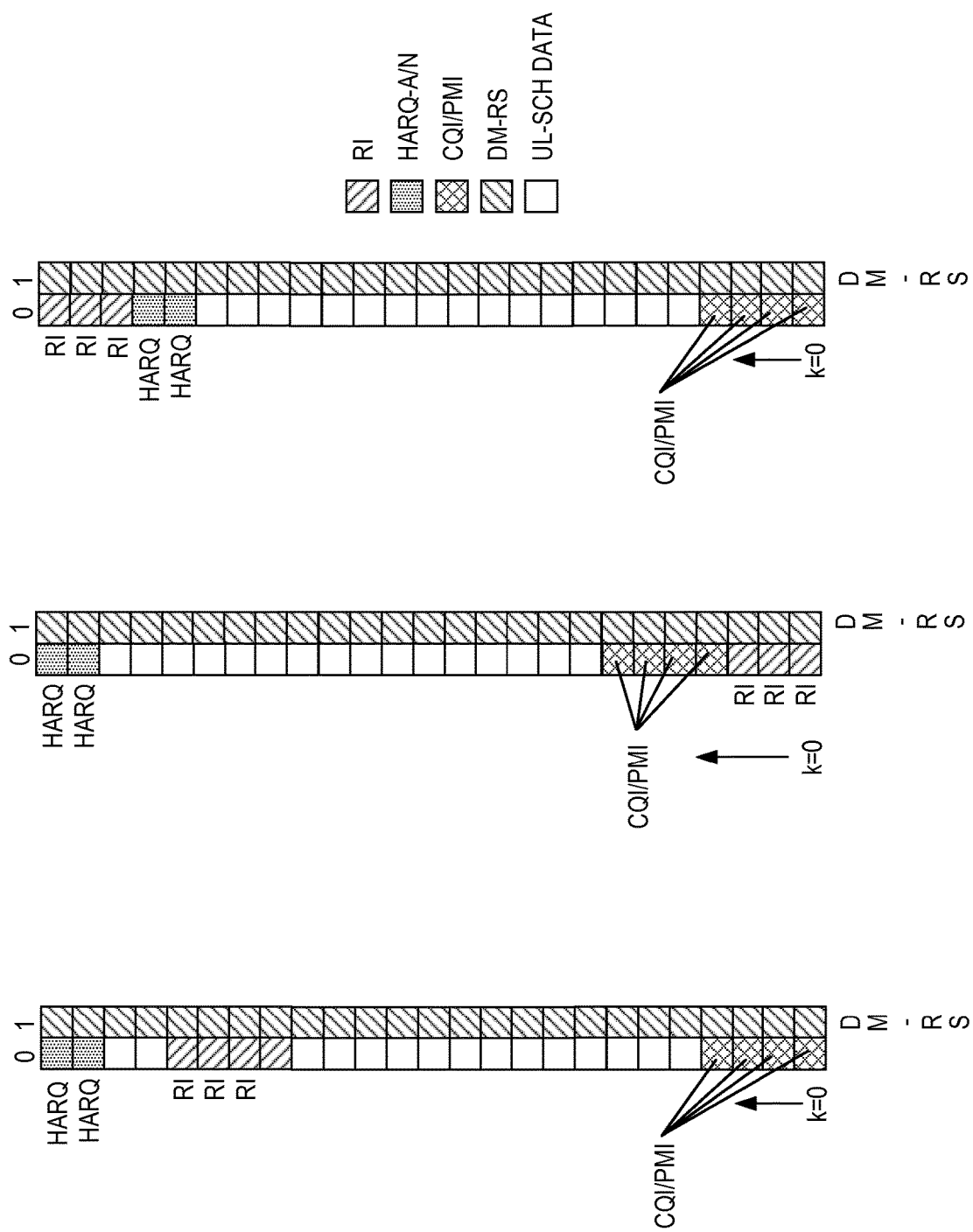
FIG. 4 illustrates multiplexing of UCI, DMRS and data on 2-symbol sPUSCH. sPUSCH is configured with data+DMRS, according to some embodiments.

FIG. 4 illustrates additional examples of multiplexing UCI, DMRS and data on 2-symbol sPUSCH, where the first SC-FDMA symbol of sPUSCH is used for transmitting data, and the second symbol is for DMRS transmission. In this configuration, the HARQ ACK/NACK is mapped from the top of the first SC-FDMA symbol (top 2 symbols), so that it is near to the DMRS in time domain samples.

Similar to FIG. 3, in the left-most example in FIG. 4 it is assumed that the maximum number of complex-valued symbols for HARQ ACK/NACK is 4. The mapping of RI thus starts from the 5th complex-valued symbol from the top of the first SC-FDMA symbol (5-7 symbols from the top). The mapping of CQI/PMI starts from the bottom of the first symbol (bottom 4 symbols). In the middle example, the mapping of RI starts from the bottom of the first symbol (bottom 3 symbols), and the mapping of CQI/PMI starts after the RI (next 4 symbols).

Figure 5:
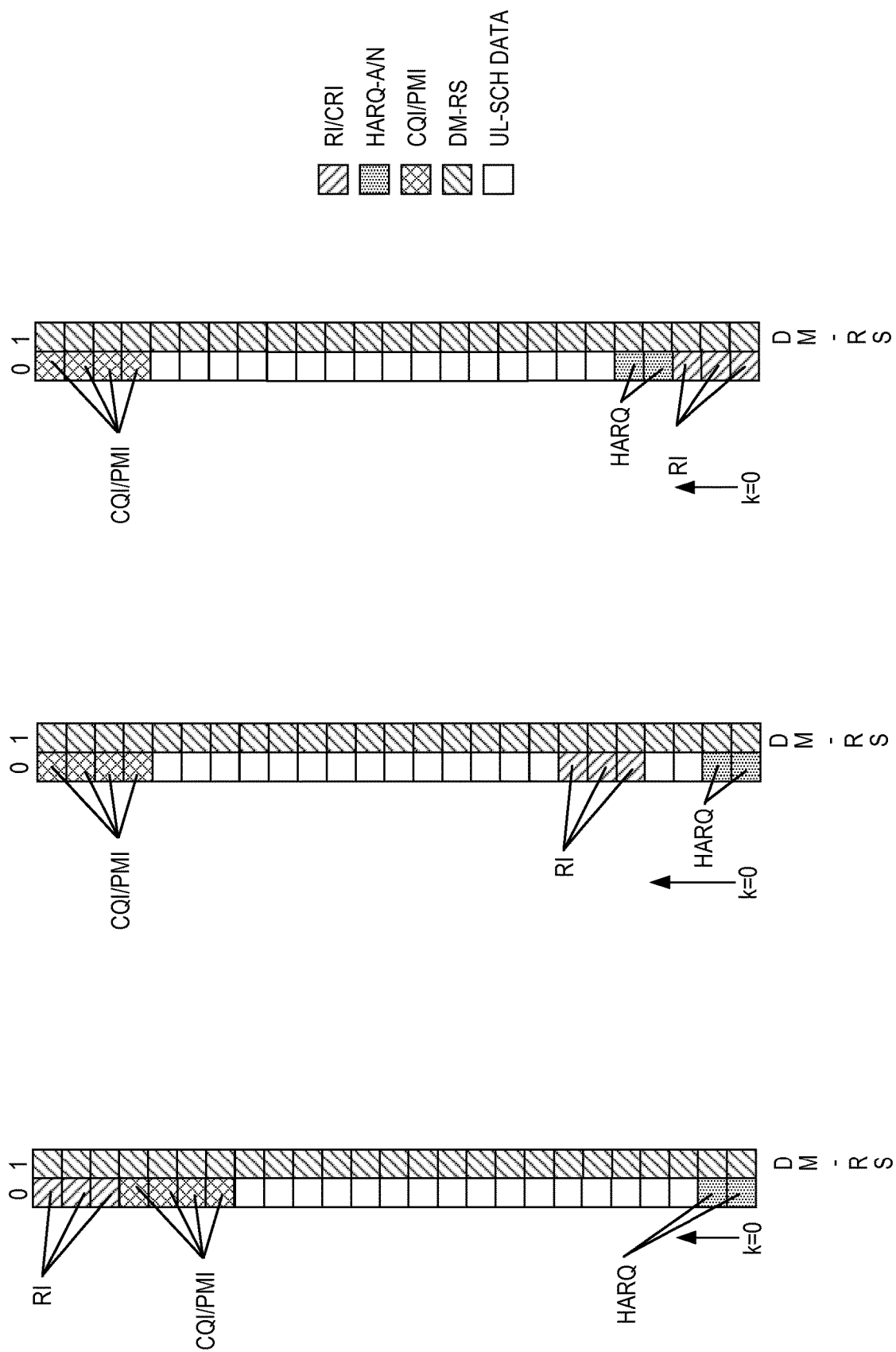
FIG. 5 illustrates alternative multiplexing of UCI, DMRS and data on 2-symbol sPUSCH. sPUSCH is configured with data+DMRS, according to some embodiments.

FIG. 5 shows alternative patterns for the case where DMRS follows the data symbol; these patterns are obtaining by mirroring the patterns of FIG. 3 against the DMRS symbol. With the mirroring operation, these alternative patterns use the same methodology as the legacy pattern depicted in FIG. 2.

Figure 6:
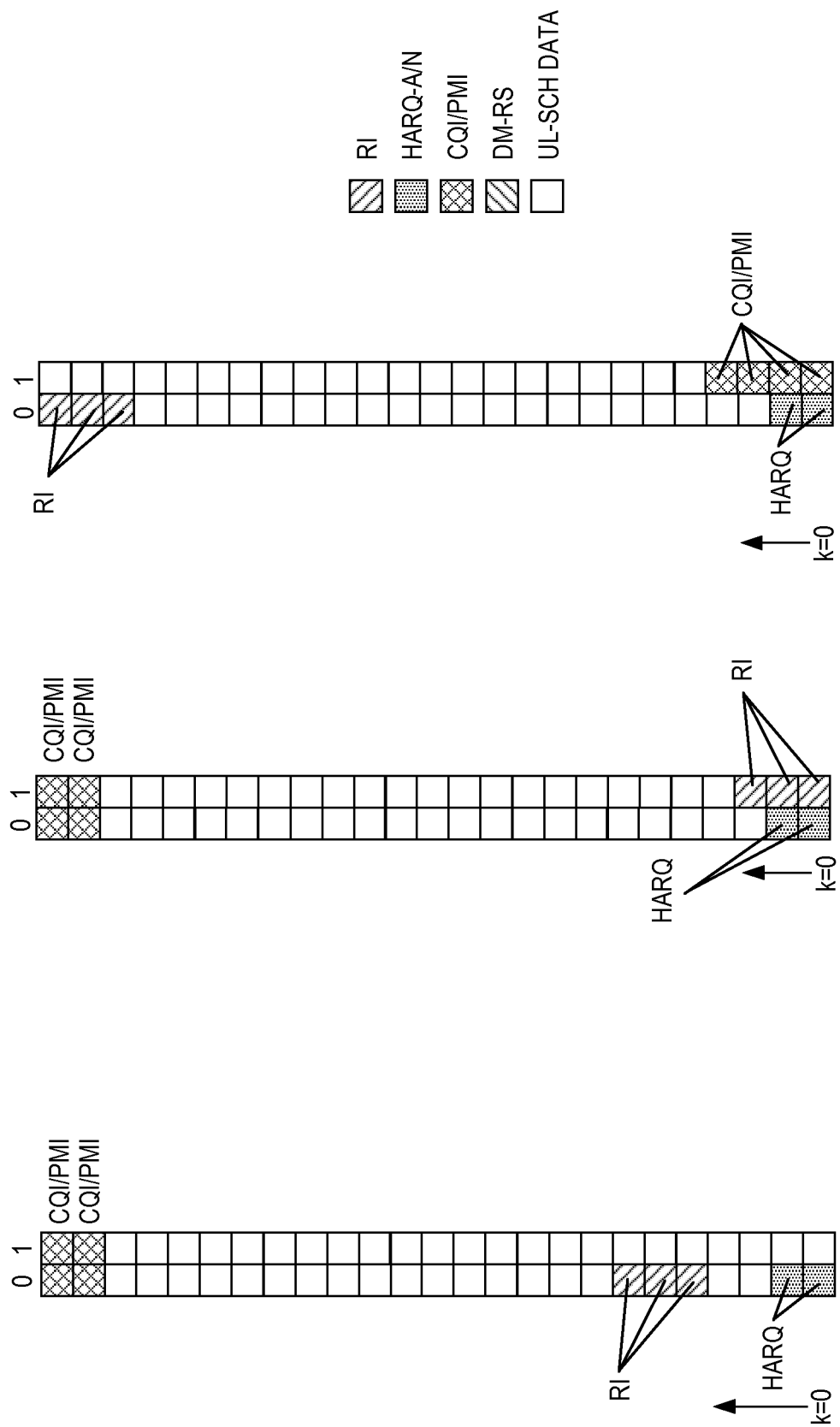
FIG. 6 illustrates multiplexing of UCI and data on 2-symbol sPUSCH configured with data+data where the closest DMRS in time domain is transmitted on the previous sPUSCH, according to some embodiments.

FIG. 6 shows examples of multiplexing UCI and data on 2-symbol sPUSCH, where there is no DMRS on this sPUSCH, and the DMRS used for channel estimation for this sPUSCH is transmitted at the previous short TTIs. The mapping of HARQ ACK/NACK starts from k=0 (bottom) of the first symbol, in these examples, so that it is close to DMRS in time domain samples.

In the left-most example in FIG. 6, it is assumed that the maximum number of complex-valued symbols for HARQ ACK/NACK is 4. Thus, the mapping of RI starts from the 5th complex-valued symbol from the bottom of the first SC-FDMA symbol. The mapping of CQI/PMI starts from the top of the first symbol. In the middle example in FIG. 6, the mapping of RI starts from the bottom of the second symbol. In the right-most example in FIG. 6, the mapping of RI starts from the top of the first symbol. Comparing these three examples, the position of RI is closest to DMRS in time domain samples in the left-most example, while the distance between the RI and DMRS in time domain samples is the largest in the middle example. However, the mapping in the middle example provides the best flexibility for multiplexing UCI.

In the left and middle examples of FIG. 6, the coded CQI/PMI is mapped to all SC-FDMA symbols within the sPUSCH on one row k before continuing on the next row k−1. In the rightmost example, the mapping of CQI/PMI starts from the bottom of the second SC-FDMA symbol.

Figure 7:
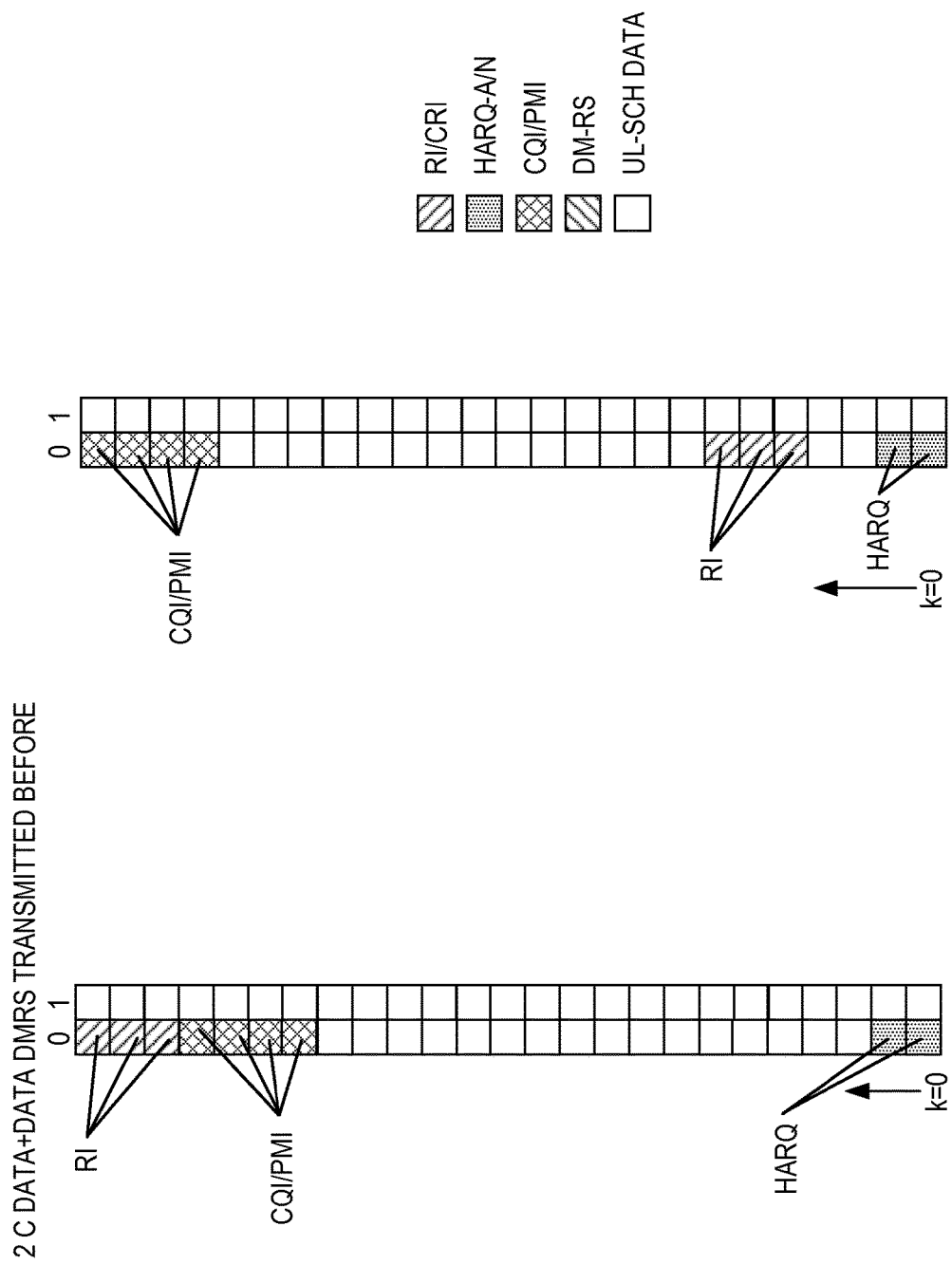
FIG. 7 illustrates a latency-optimized alternative for multiplexing of UCI and data on 2-symbol sPUSCH configured with data+data where the closest DMRS in time domain is transmitted on the previous sPUSCH, according to some embodiments.

Similar to FIG. 6, FIG. 7 shows examples of multiplexing UCI and data on 2-symbol sPUSCH, where there is no DMRS on this sPUSCH, and the DMRS used for channel estimation for this sPUSCH is transmitted at the previous sTTIs. The difference from FIG. 6 is that here the CQI/PMI bits are mapped to the time-domain samples, for the first SC-FDMA symbol, that are left unused by HARQ feedback and RI/CRI first, before using time-domain symbols corresponding to the second SC-FDMA, if needed. This enables a reduction in latency before decoding PMI/CQI and CRI/RI, since these bits are transmitted as early as possible after the DMRS.

Figure 8:
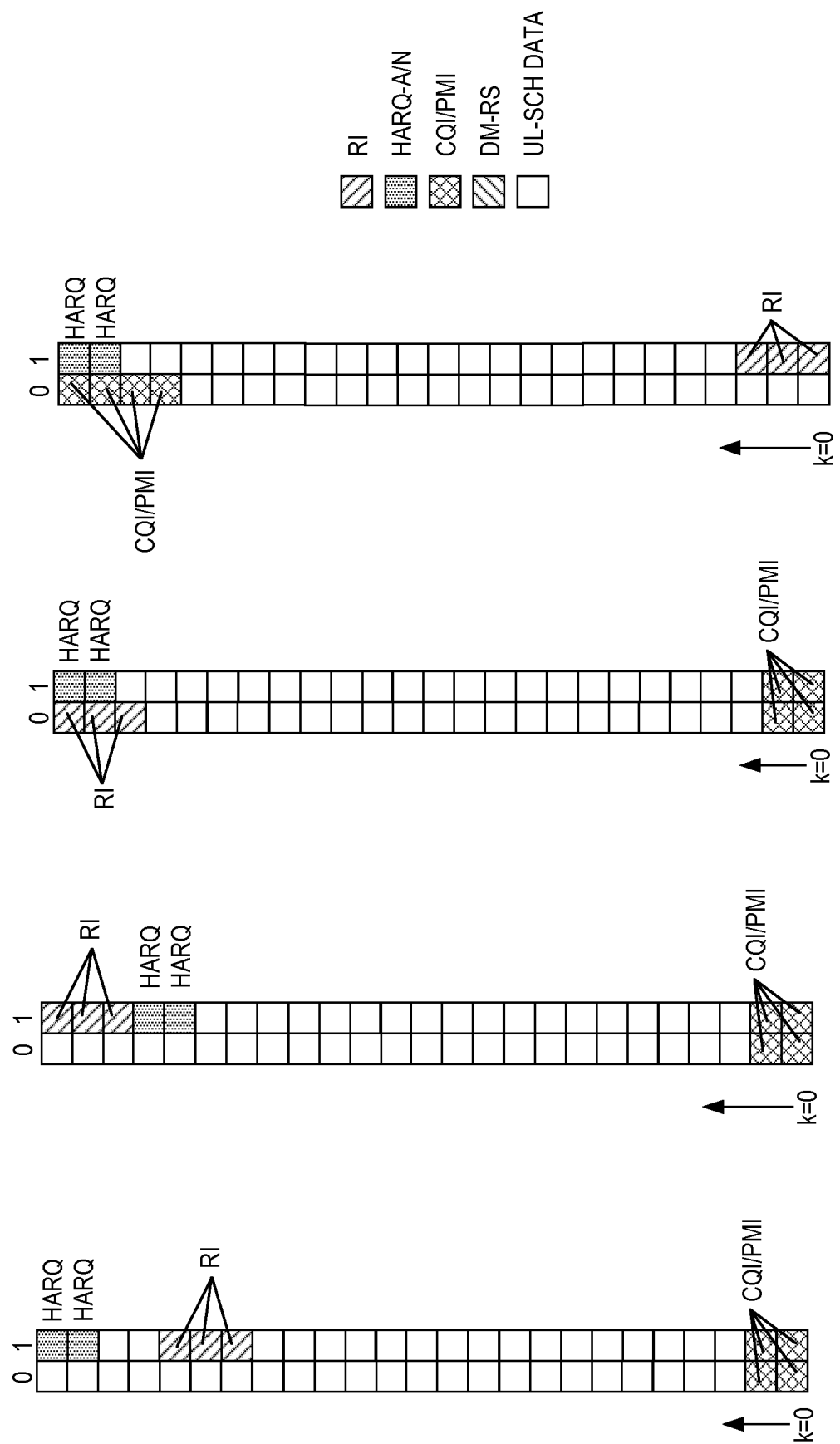
FIG. 8 illustrates multiplexing of UCI and data on 2-symbol sPUSCH configured with data+data where the closest DMRS in time domain is transmitted after this sPUSCH, according to some embodiments.
Figure 9:
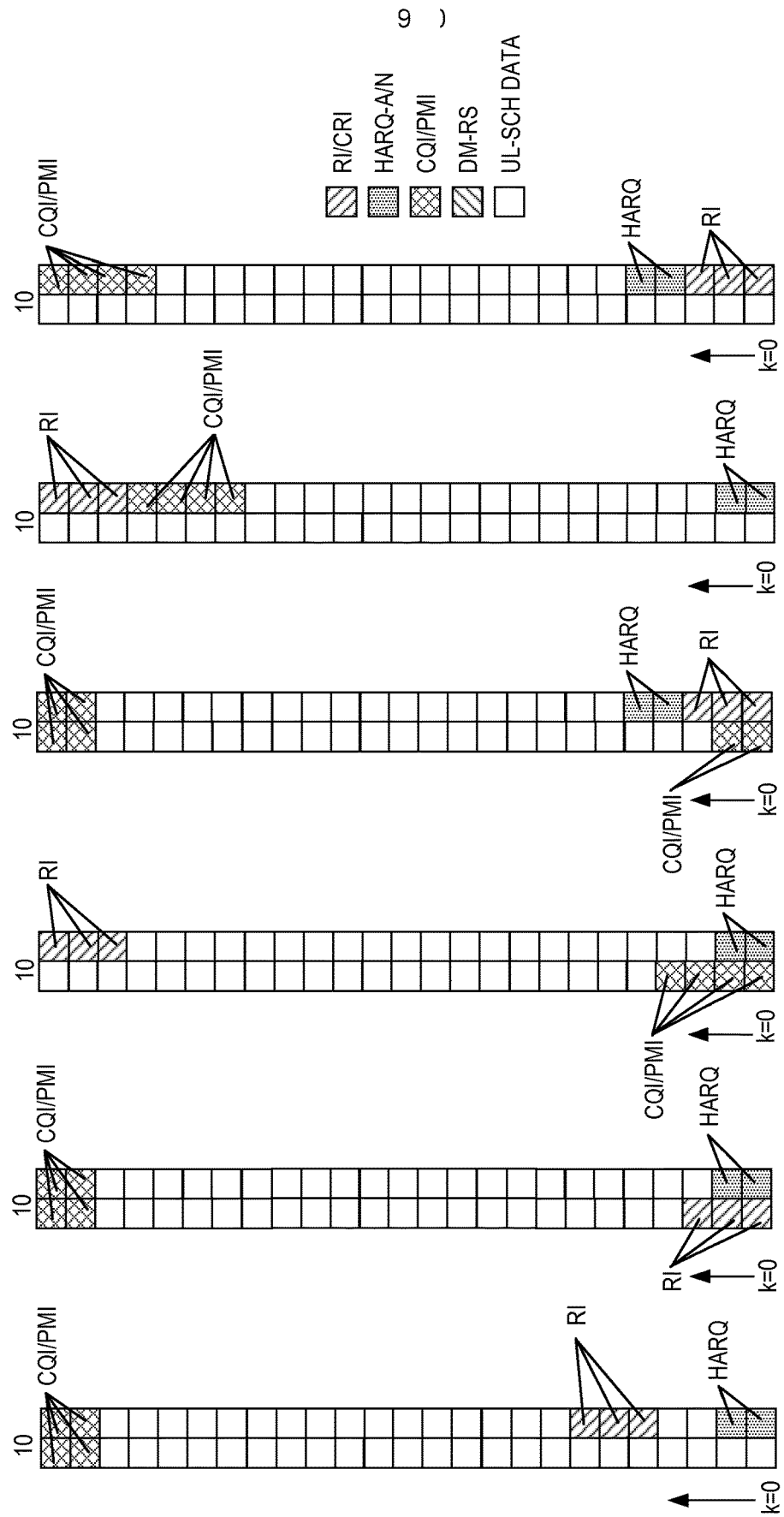
FIG. 9 illustrates multiplexing of UCI and data on 2-symbol sPUSCH configured with data+data where the closest DMRS in time domain is transmitted after this sPUSCH, according to some embodiments.

FIG. 8 shows an example of multiplexing UCI and data on 2-symbol sPUSCH, where there is no DMRS on this sPUSCH, and the DMRS used for channel estimation for this sPUSCH is transmitted after this sPUSCH. FIG. 9 illustrates alternatives for multiplexing UCI and data on 2-symbol sPUSCH, where there is no DMRS on this sPUSCH, and the DMRS used for channel estimation for this sPUSCH is transmitted after this sPUSCH. These alternatives are based on mirroring patterns of FIG. 6 and FIG. 7, against the DMRS symbol that comes before in those examples.

Figure 10:
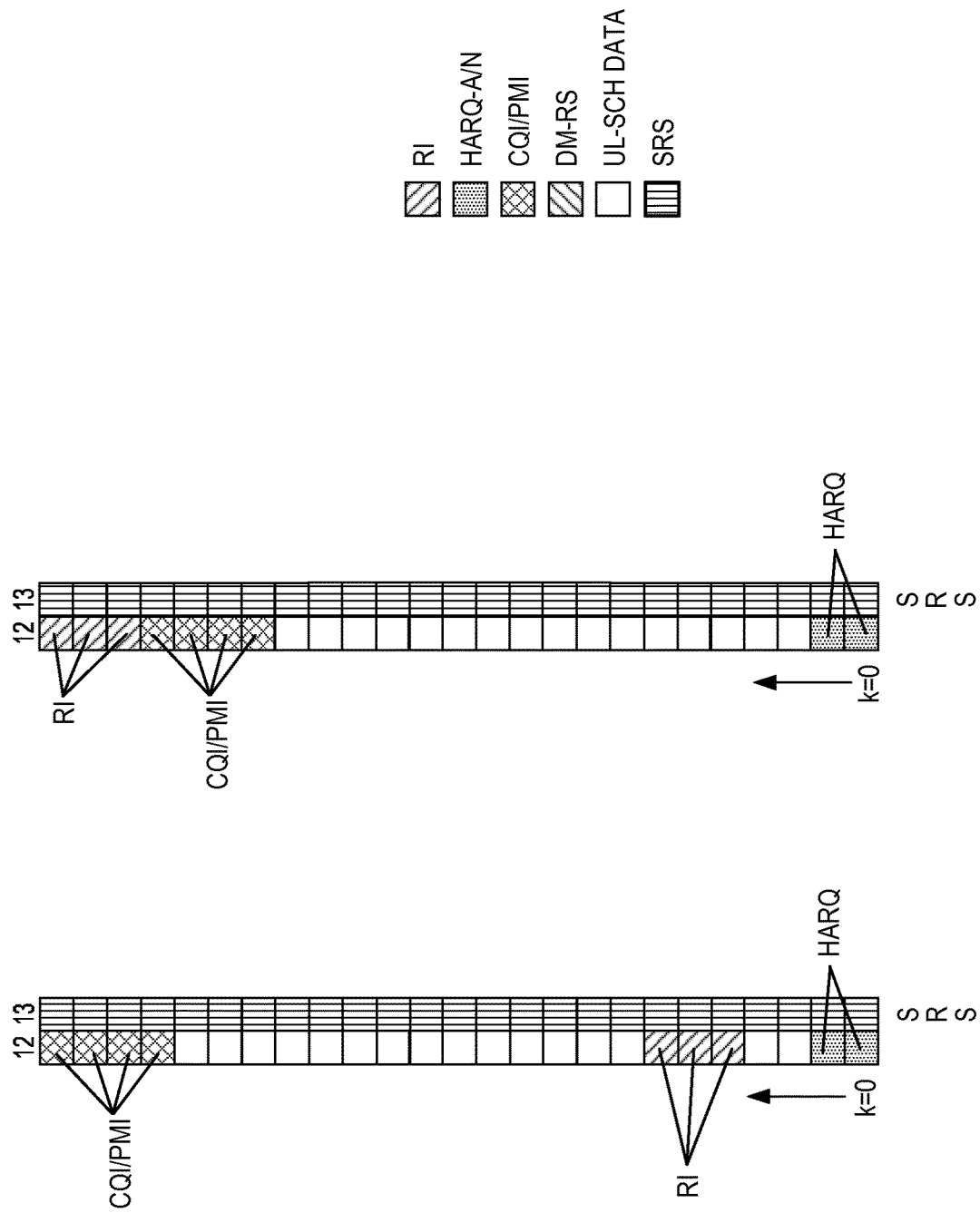
FIG. 10 illustrates multiplexing of UCI, data and SRS on 2-symbol sPUSCH configured with data+SRS where the closest DMRS in time domain is transmitted before this sPUSCH, according to some embodiments.

FIG. 10 shows an example of multiplexing UCI, data and SRS on 2-symbol sPUSCH, where the first symbol 12 is used for data transmission (UL-SCH data) and the second symbol 13 is used for SRS. The DMRS used for channel estimation for this sPUSCH is transmitted before this sPUSCH.

UCI Mapping on 3-Symbol PUSCH

Figure 11:
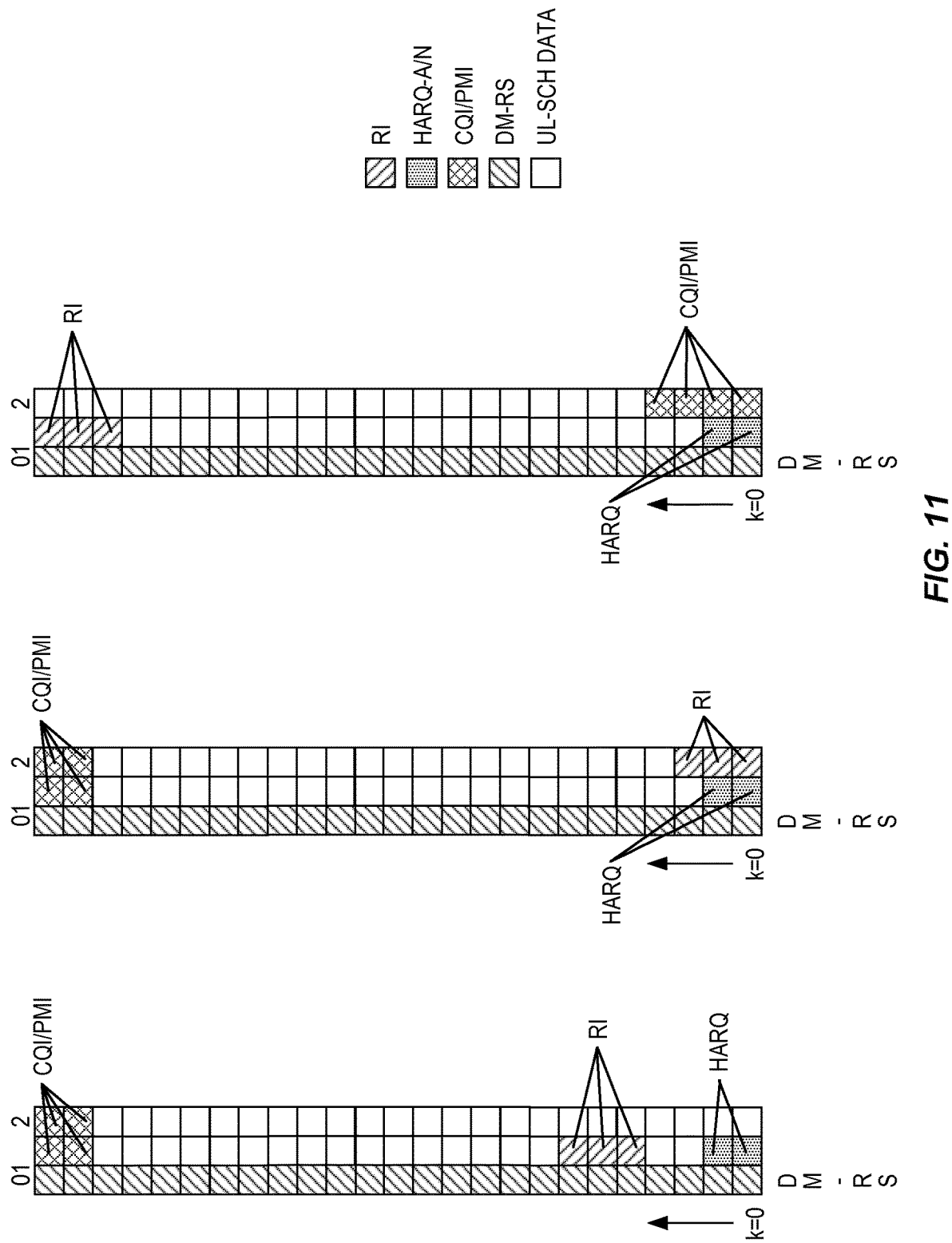
FIG. 11 illustrates multiplexing of UCI, DMRS and data on 3-symbol sPUSCH configured with DMRS+data+data, according to some embodiments.

In this section are described examples of UCI mapping on 3-symbol sPUSCH, considering different DMRS configurations. FIG. 11 illustrates examples of multiplexing UCI, DMRS and data on 3-symbol sPUSCH, where the first SC-FDMA symbol of sPUSCH is used for transmitting DMRS, and the second and the third symbols are for data transmission. As can be seen from FIG. 11, the UCI mapping rule is the same as the one shown in FIG. 6, that is, multiplexing UCI and data on 2-symbol sPUSCH, where there is no DMRS on this sPUSCH, and the DMRS is transmitted before the 2-symbol sPUSCH.

Figure 12:
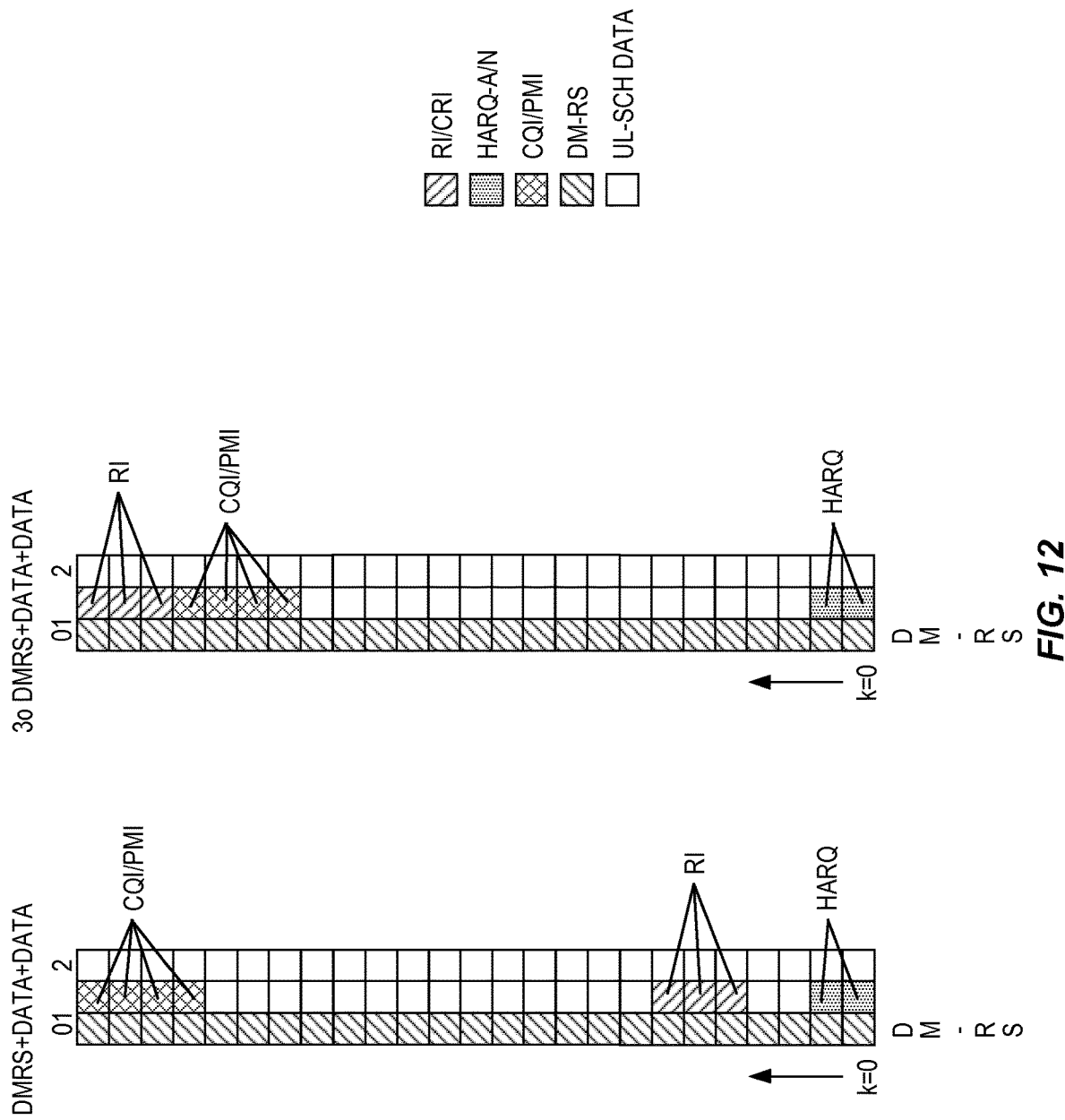
FIG. 12 illustrates latency-optimized multiplexing of UCI, DMRS and data on 3-symbol sPUSCH configured with DMRS+data+data, according to some embodiments.

FIG. 12 illustrates latency-optimized alternative patterns to FIG. 11, where the RI/CRI bits and CQI/PMI bits are mapped to the resource elements of the first SC-FDMA symbol following the DMRS symbol first. Note that resource elements of the last SC-FDMA symbol can be used for PMI/CQI if there is not sufficient number of remaining time-domain symbols corresponding to the previous SC-FDMA symbol.

Figure 13:
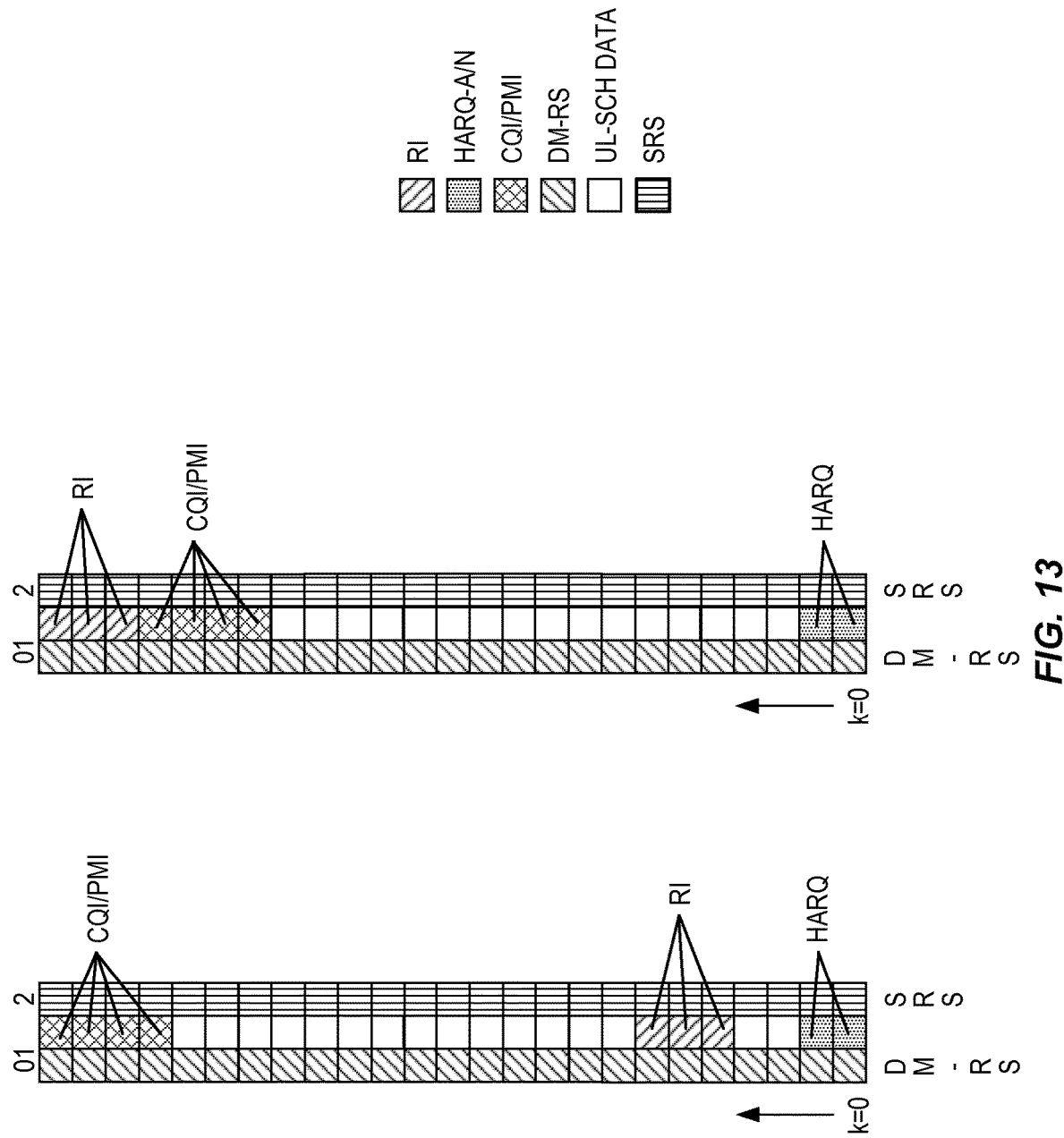
FIG. 13 illustrates multiplexing of UCI, DMRS, data and SRS on 3-symbol sPUSCH configured with DMRS+data+SRS, according to some embodiments.

FIG. 13 illustrates examples of multiplexing UCI, DMRS, data and SRS on 3-symbol sPUSCH, where the first SC-FDMA symbol of sPUSCH is used for transmitting DMRS, and the second symbol is for data transmission, and the third one for SRS. As can be seen from FIG. 13, the UCI mapping rule is the same as the one in FIG. 3, that is, multiplexing UCI and data on 2-symbol sPUSCH, where the first SC-FDMA symbol of sPUSCH is used for DMRS, and the second symbol is for data.

Figure 14:
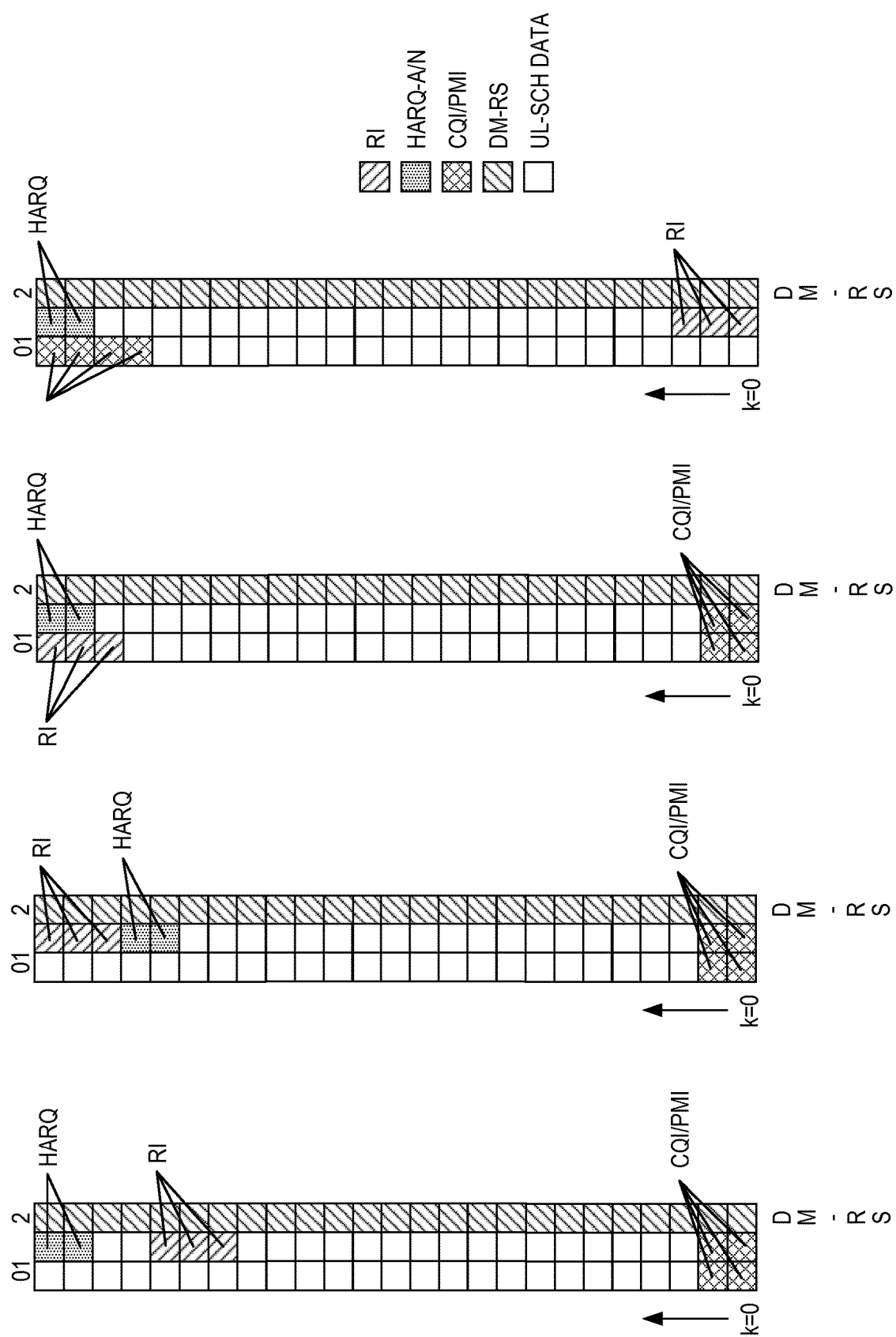
FIG. 14 illustrates multiplexing of UCI, DMRS and data on 3-symbol sPUSCH configured with data+data+DMRS, according to some embodiments.
Figure 15:
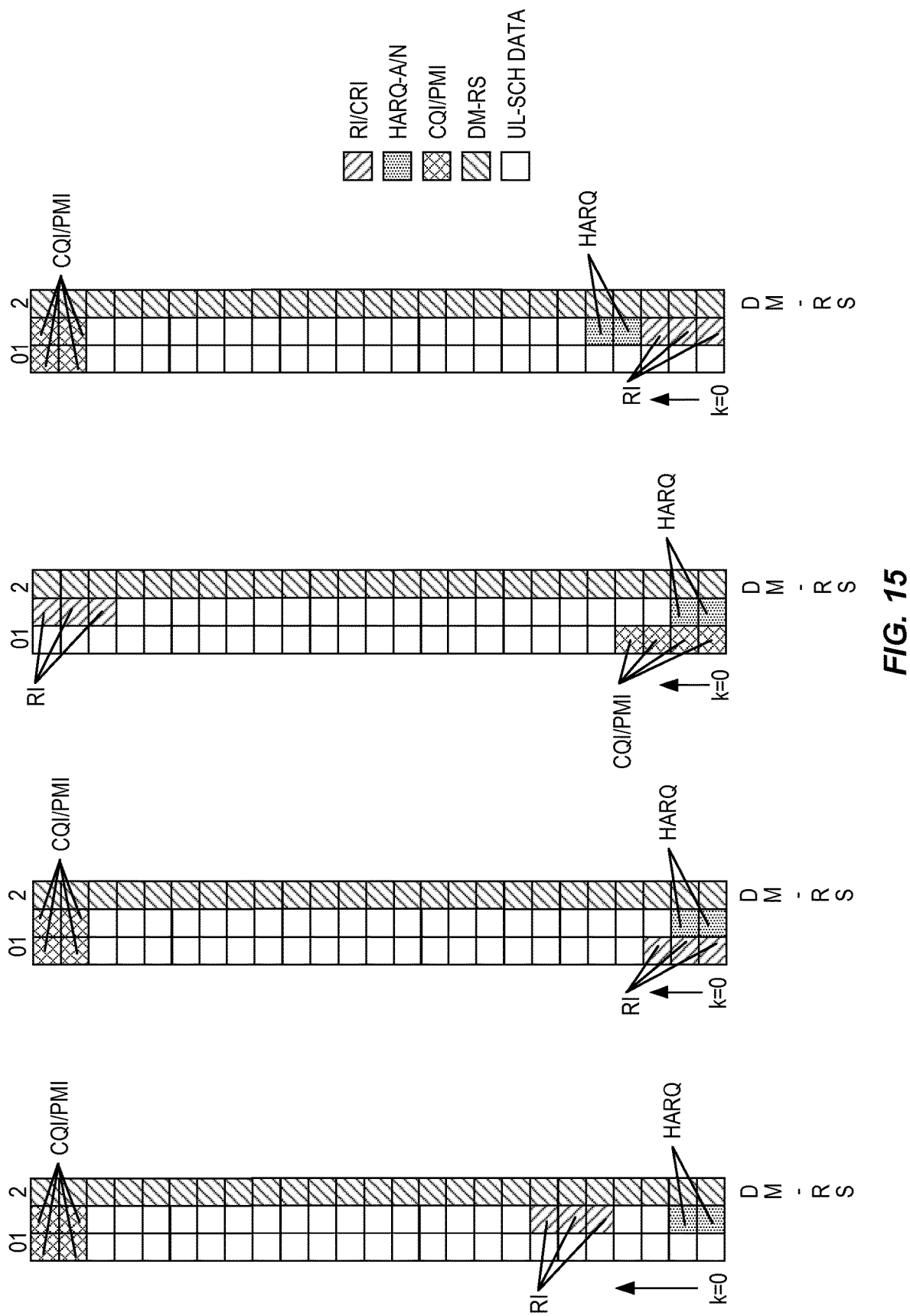
FIG. 15 illustrates alternative multiplexing of UCI, DMRS and data on 3-symbol sPUSCH configured with data+data+DMRS, according to some embodiments.

By using the same mapping as shown in FIG. 8, examples of multiplexing of UCI, DMRS and data on 3-symbol sPUSCH with configuration data+data+DMRS are shown in FIG. 14. FIG. 15 illustrates alternatives for multiplexing UCI and data on 3-symbol sPUSCH, where the DMRS used for channel estimation for this sPUSCH is transmitted after this sPUSCH. These alternatives are based on mirroring patterns of FIG. 11 against the DMRS symbol.

Figure 16:
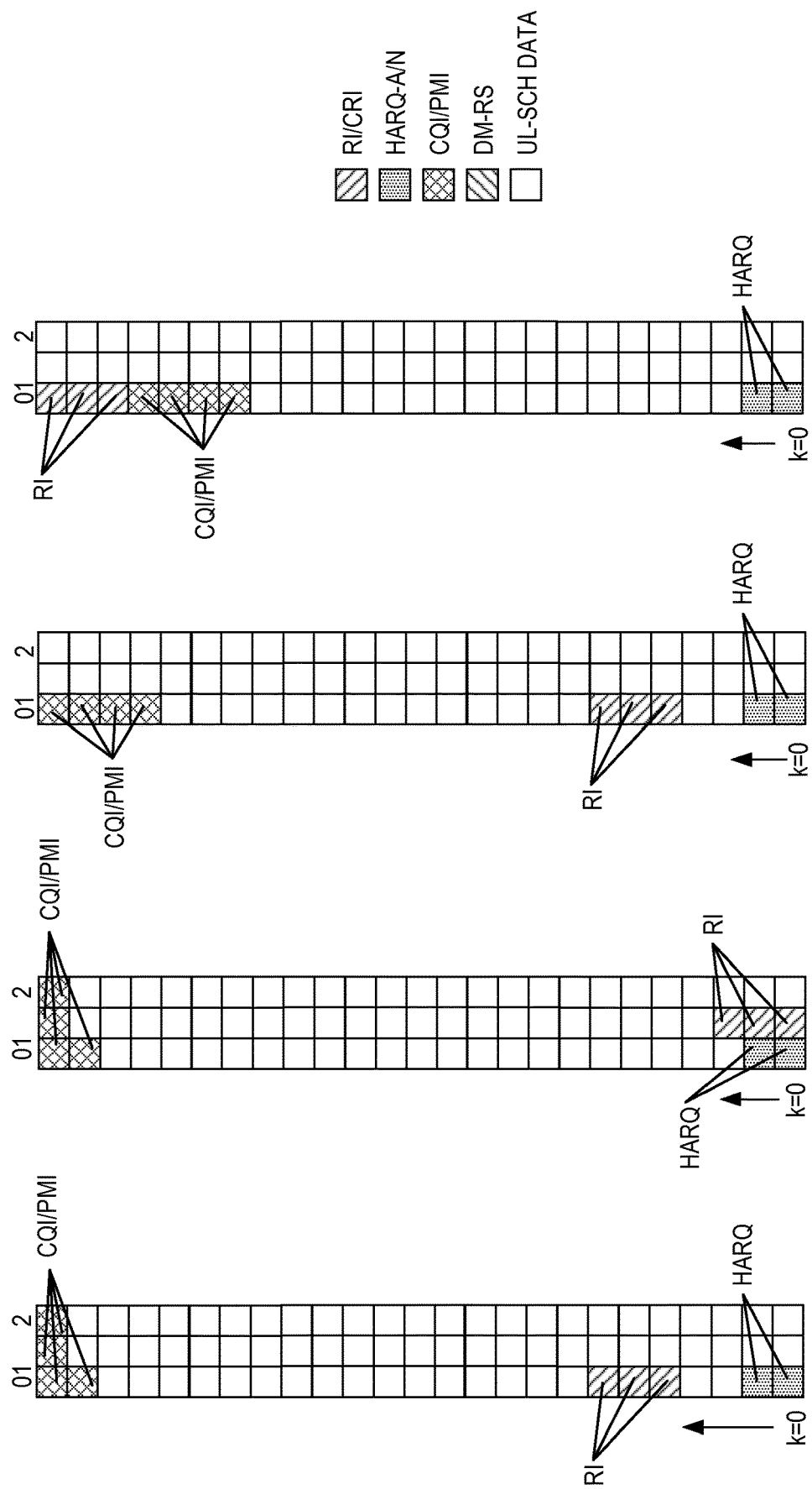
FIG. 16 illustrates multiplexing of UCI and data on 3-symbol sPUSCH configured with data+data+data where the closest DMRS in time domain is transmitted before this sPUSCH, according to some embodiments.
Figure 17:
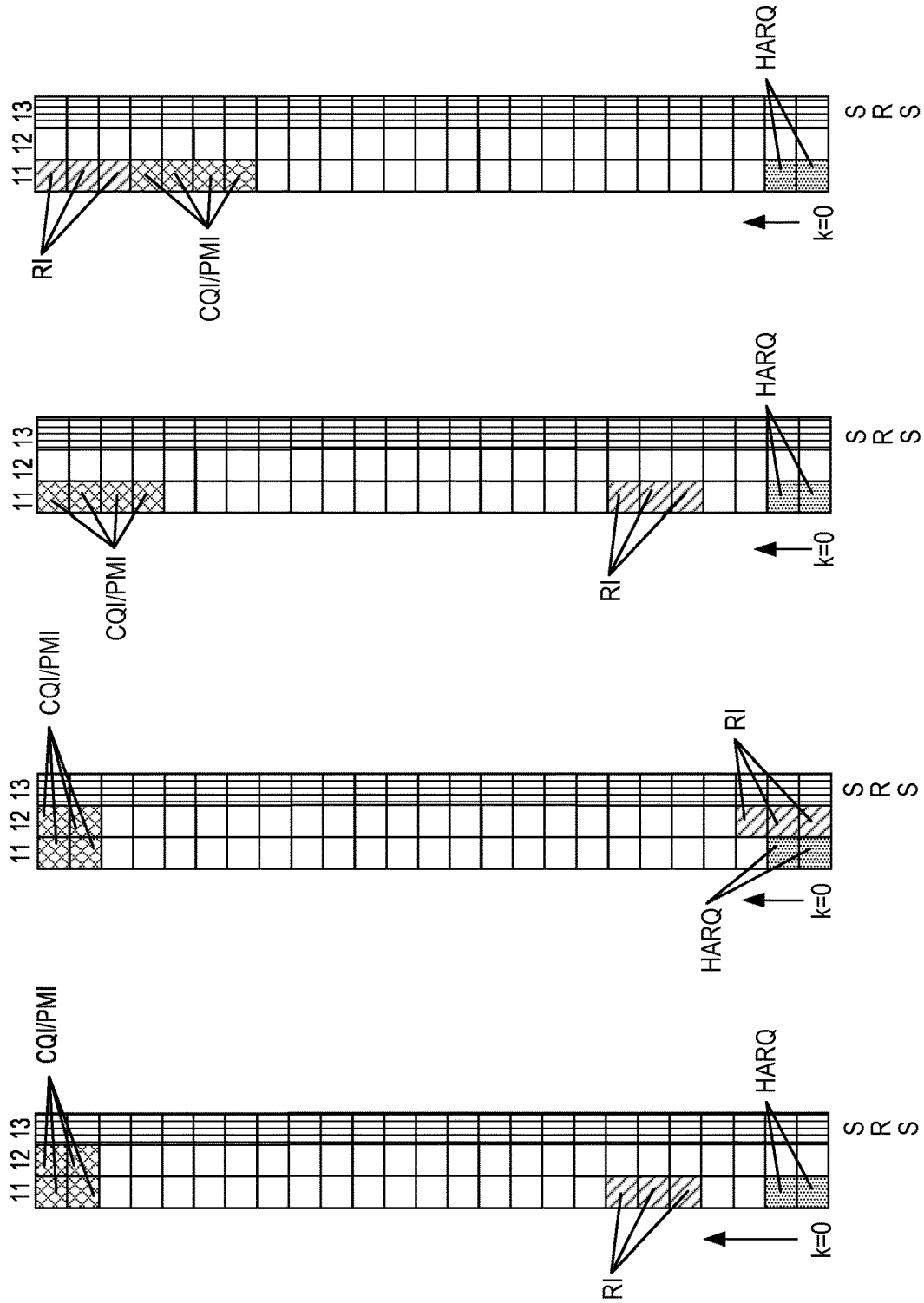
FIG. 17 illustrates multiplexing of UCI and data on 3-symbol sPUSCH configured with data+data+SRS where the closest DMRS in time domain is transmitted before this sPUSCH, according to some embodiments.

FIG. 16 shows examples of multiplexing UCI and data on 3-symbol sPUSCH, where there is no DMRS on this sPUSCH, and the DMRS used for channel estimation for this sPUSCH is transmitted before this sPUSCH. FIG. 17 illustrates examples of multiplexing UCI, data and SRS on 3-symbol sPUSCH, where there is no DMRS on this sPUSCH, and the DMRS is transmitted before this sPUSCH. The same mapping rule illustrated in FIG. 6 is applied. Here, the coded CQI/PMI is mapped to all SC-FDMA symbols within the sPUSCH on one subcarrier before continuing on the next subcarrier.

UCI Mapping on 4-Symbol PUSCH

Figure 18:
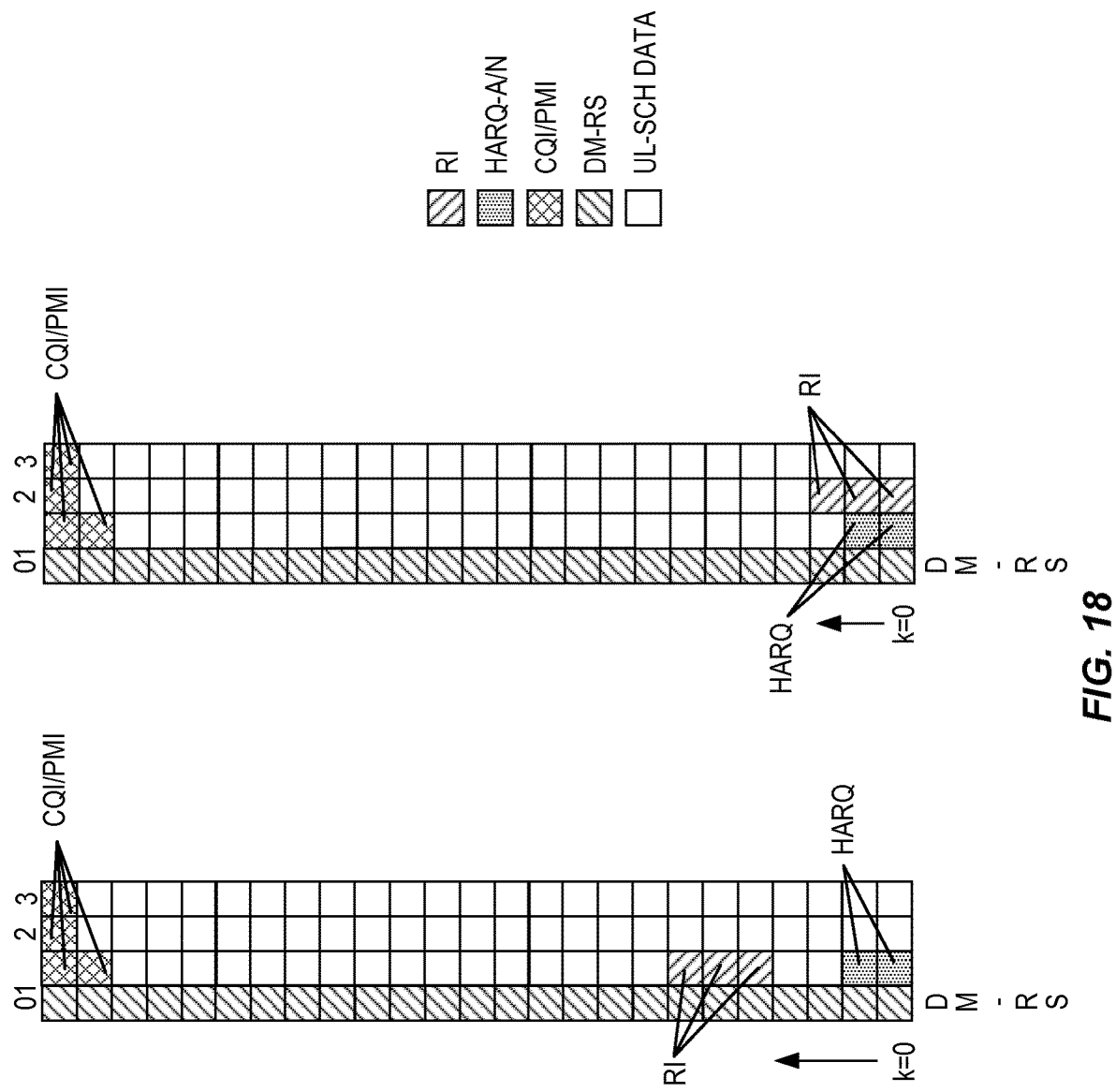
FIG. 18 illustrates multiplexing of UCI and data on 4-symbol sPUSCH configured with DMRS+data+data+data, according to some embodiments.

In this section, we list some examples of UCI mapping on 4-symbol sPUSCH, considering different DMRS configurations. FIG. 18 illustrates examples of multiplexing UCI, DMRS and data on 4-symbol sPUSCH, where the first SC-FDMA symbol of sPUSCH is used for transmitting DMRS, and the rest symbols are for data transmission. The UCI mapping rule is the same as the one shown in FIG. 11.

Figure 19:
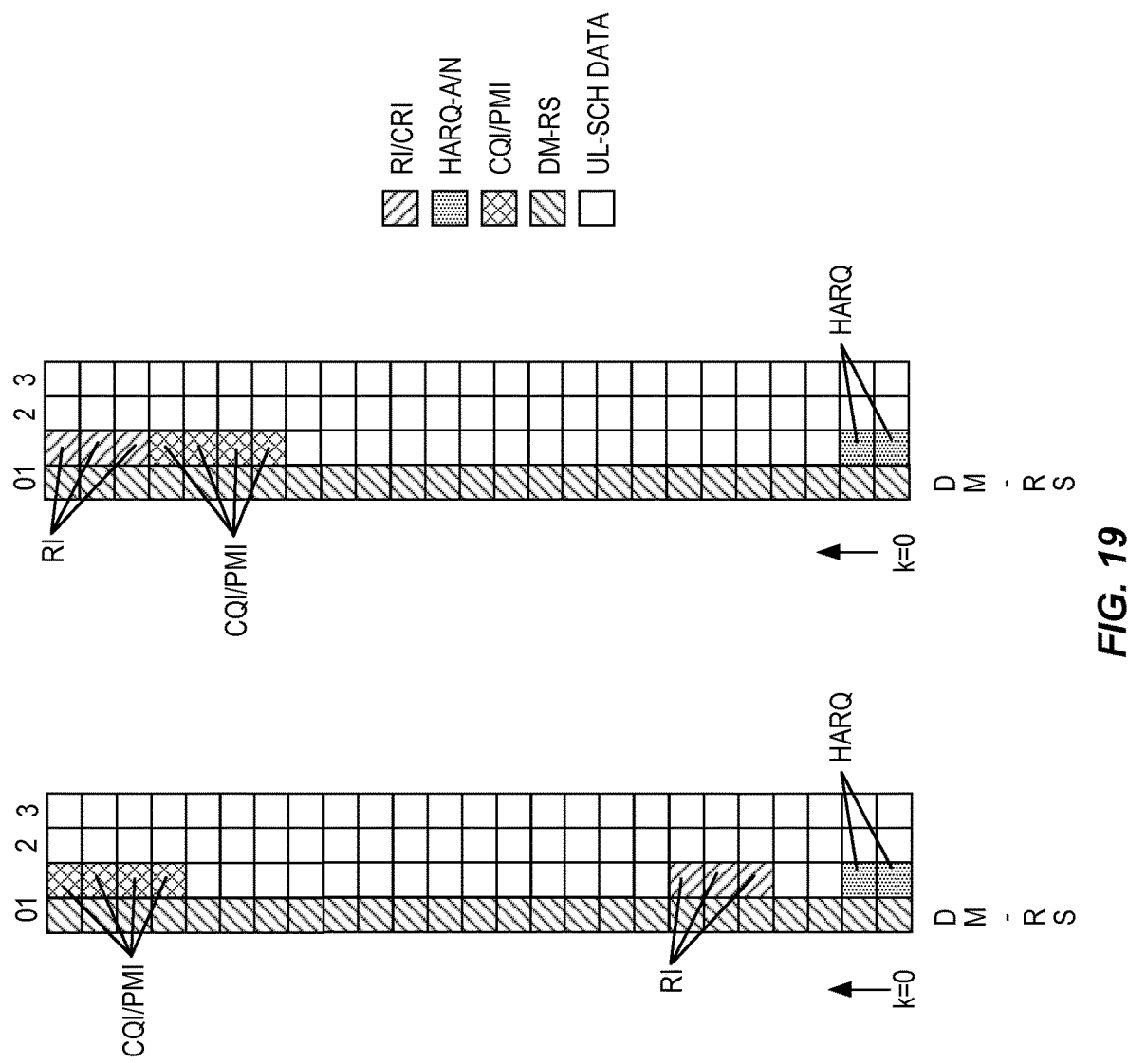
FIG. 19 illustrates latency-optimized multiplexing of UCI and data on 4-symbol sPUSCH configured with DMRS+data+data+data, according to some embodiments.

FIG. 19 shows latency-optimized alternative patterns to FIG. 18, where the RI/CRI bits and CQI/PMI bits are mapped to the resource elements of the first SC-FDMA symbol following the DMRS symbol first. Note that resource elements of the last SC-FDMA symbol can be used for PMI/CQI if there is not sufficient number of remaining resource elements in the previous SC-FDMA symbol.

Figure 20:
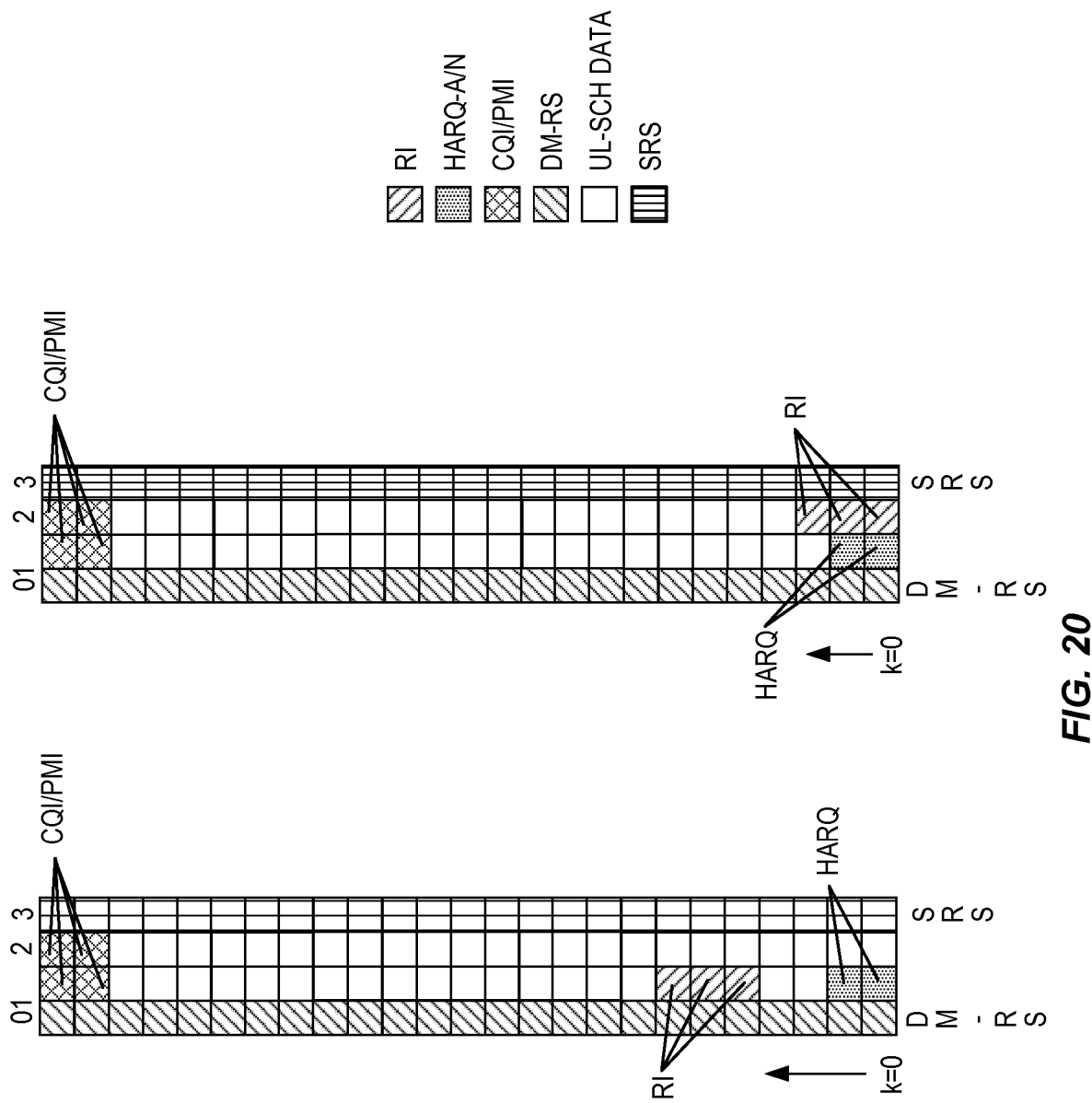
FIG. 20 illustrates multiplexing of UCI and data on 4-symbol sPUSCH configured with DMRS+data+data+SRS, according to some embodiments.

FIG. 20 illustrates examples of multiplexing UCI, DMRS, data and SRS on 4-symbol sPUSCH, where the first SC-FDMA symbol of sPUSCH is used for transmitting DMRS, and the last symbol is for SRS. The UCI mapping rule is the same as the one shown in FIG. 11. Note that alternative UCI mappings that are latency-optimized can be used as well similarly as in FIG. 19, with the addition of SRS in the last SC-FDMA symbol.

Figure 21:
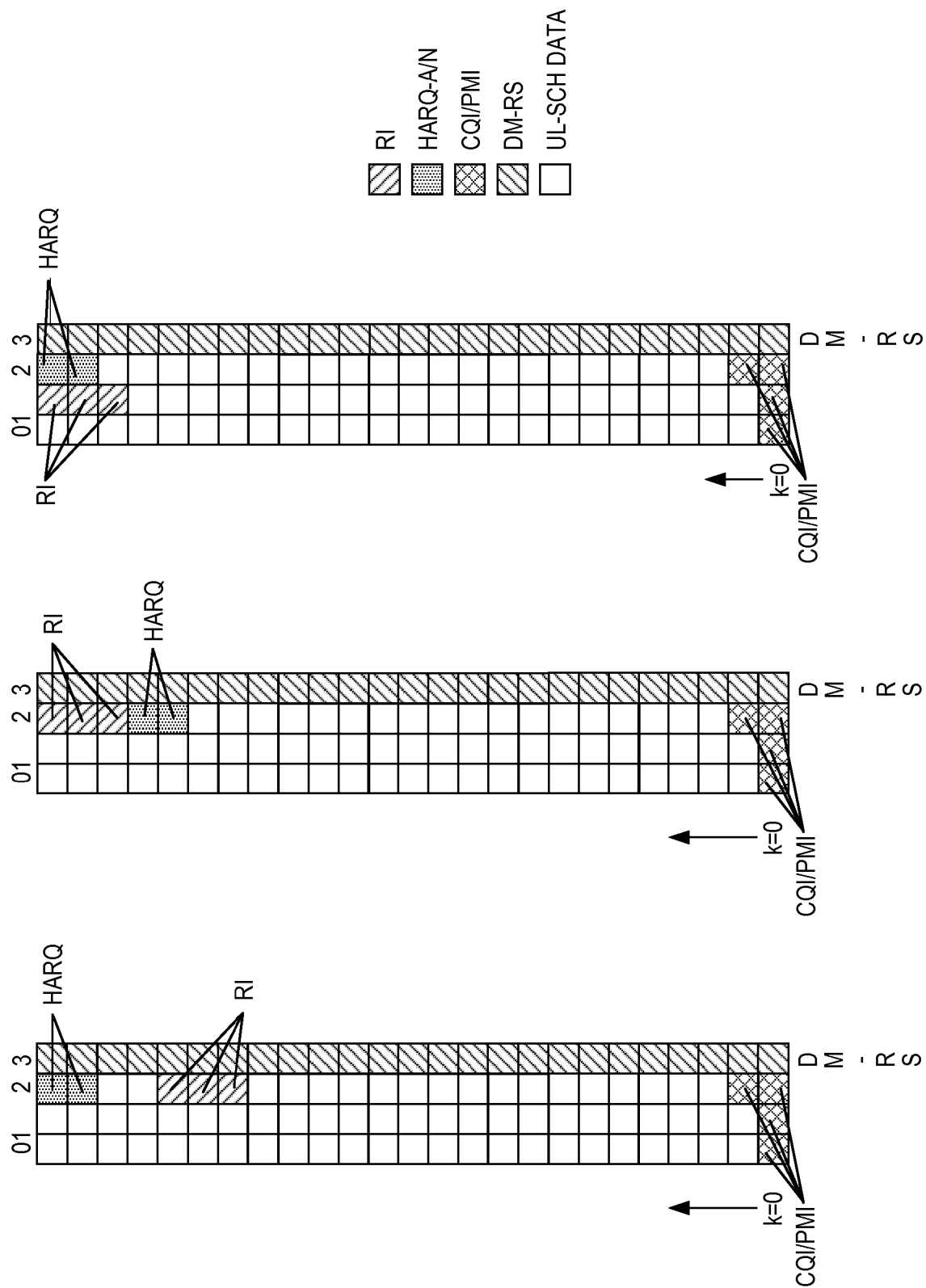
FIG. 21 illustrates multiplexing of UCI, DMRS and data on 4-symbol sPUSCH configured with data+data+data+DMR, according to some embodiments.
Figure 22:
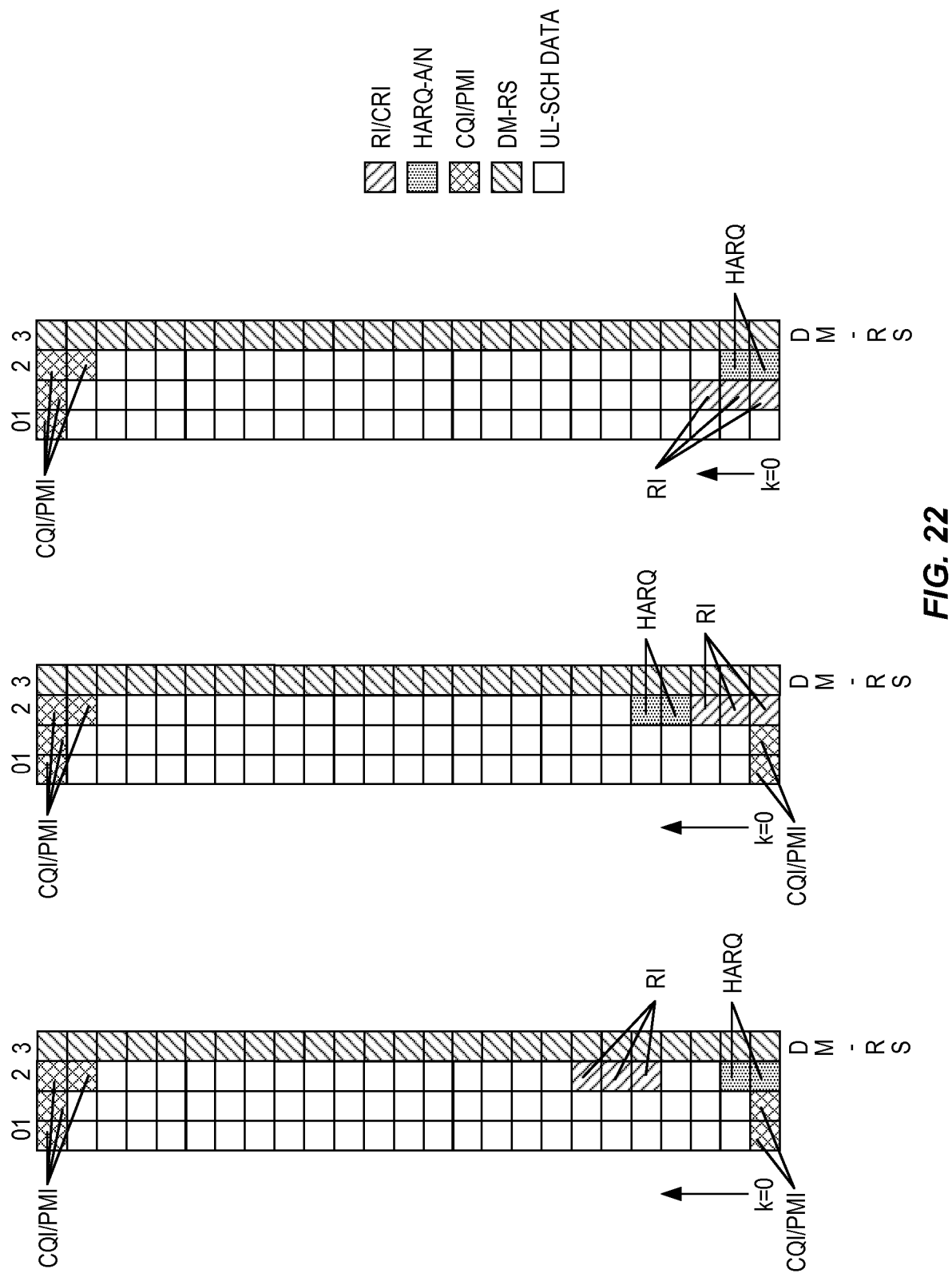
FIG. 22 illustrates alternative multiplexing of UCI, DMRS and data on 4-symbol sPUSCH configured with data+data+data+DMRS, according to some embodiments.

FIG. 21 illustrates examples of multiplexing UCI, DMRS, data and SRS on 4-symbol sPUSCH, where the first three SC-FDMA symbols of sPUSCH are used for data, and the last symbol is for DMRS. The UCI mapping rule is the same as the one shown in FIG. 8 and FIG. 14. FIG. 22 shows alternatives for multiplexing UCI and data on 4-symbol sPUSCH, where the DMRS used for channel estimation for this sPUSCH is transmitted after this sPUSCH. These alternatives are based on mirroring patterns of FIG. 20 against the DMRS symbol.

Figure 23:
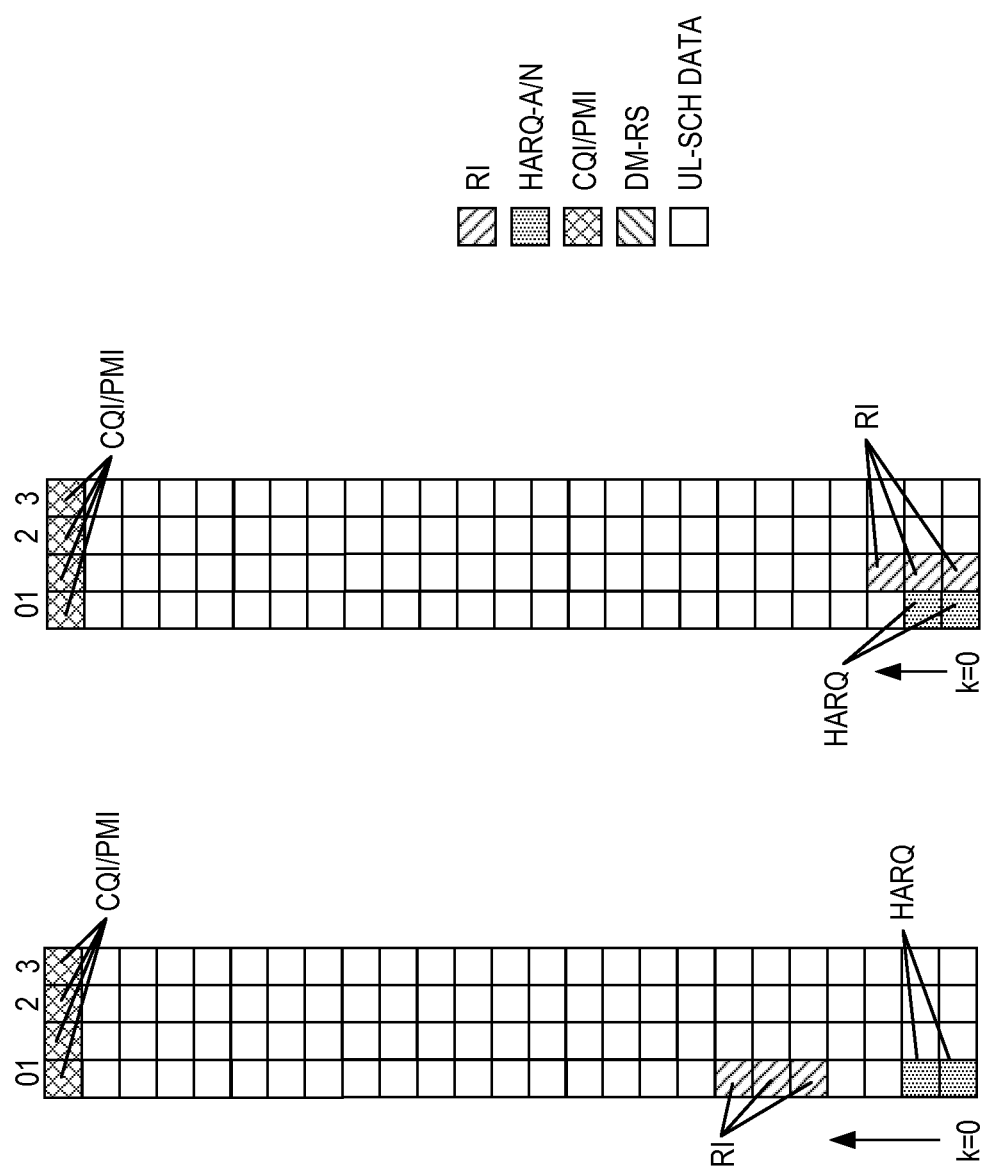
FIG. 23 illustrates multiplexing of UCI and data on 4-symbol sPUSCH configured with data+data+data+data where the closest DMRS in time domain is transmitted before this sPUSCH, according to some embodiments.
Figure 24:
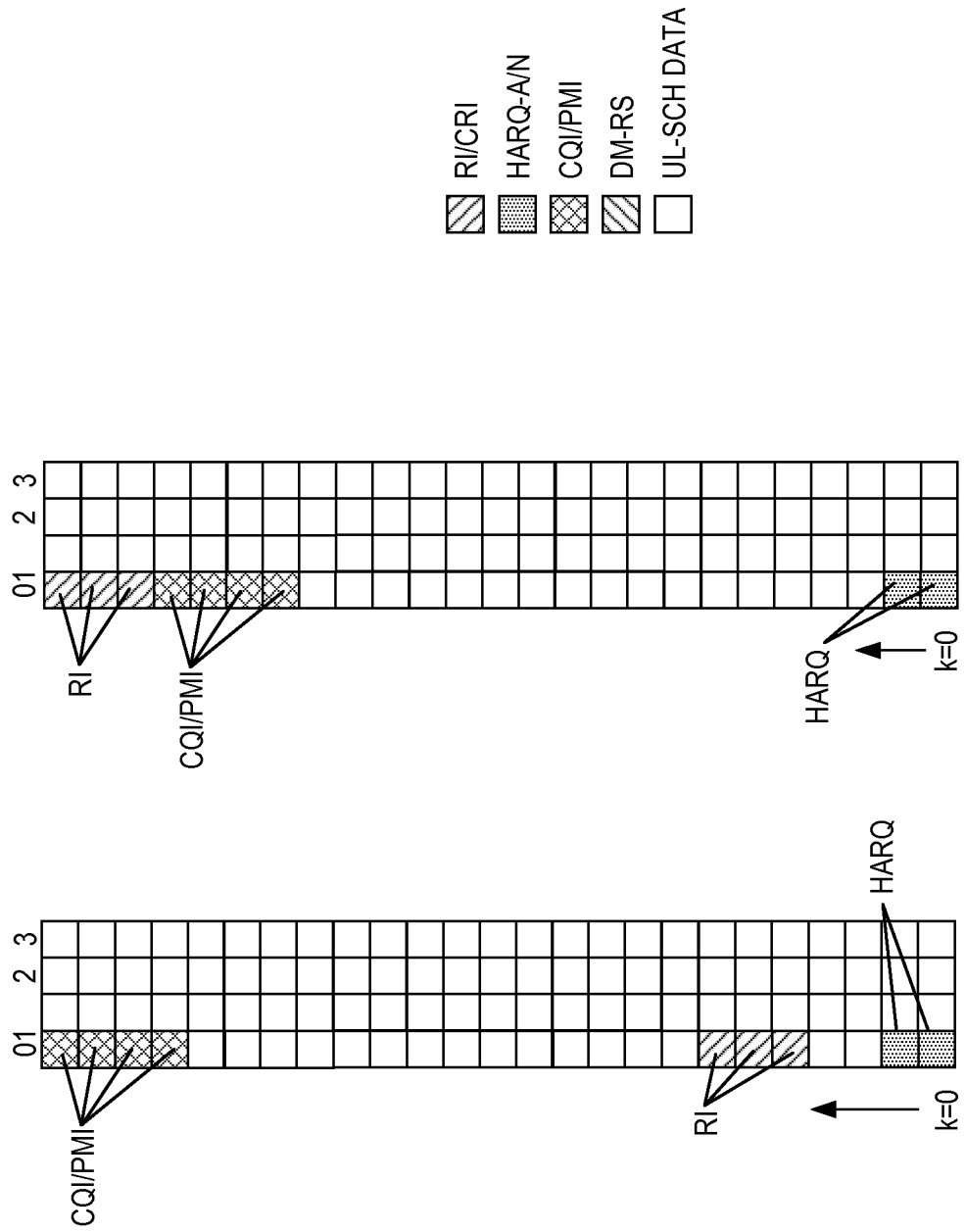
FIG. 24 illustrates multiplexing of UCI and data on 4-symbol sPUSCH configured with data+data+data+data where the closest DMRS in time domain is transmitted before this sPUSCH, according to some embodiments.

Similar to FIG. 16, FIG. 23 shows examples of multiplexing UCI on 4-symbol sPUSCH, where this is no DMRS on sPUSCH, and the DMRS is transmitted before. FIG. 24 shows latency-optimized alternative patterns to FIG. 23, where the RI/CRI bits and CQI/PMI bits are mapped to the resource elements of the first SC-FDMA symbol following the DMRS symbol first. Note that pre-DFT symbols mapped to the last SC-FDMA symbol can be used for PMI/CQI if there is not sufficient number of remaining resource elements in the previous SC-FDMA symbol.

Figure 25:
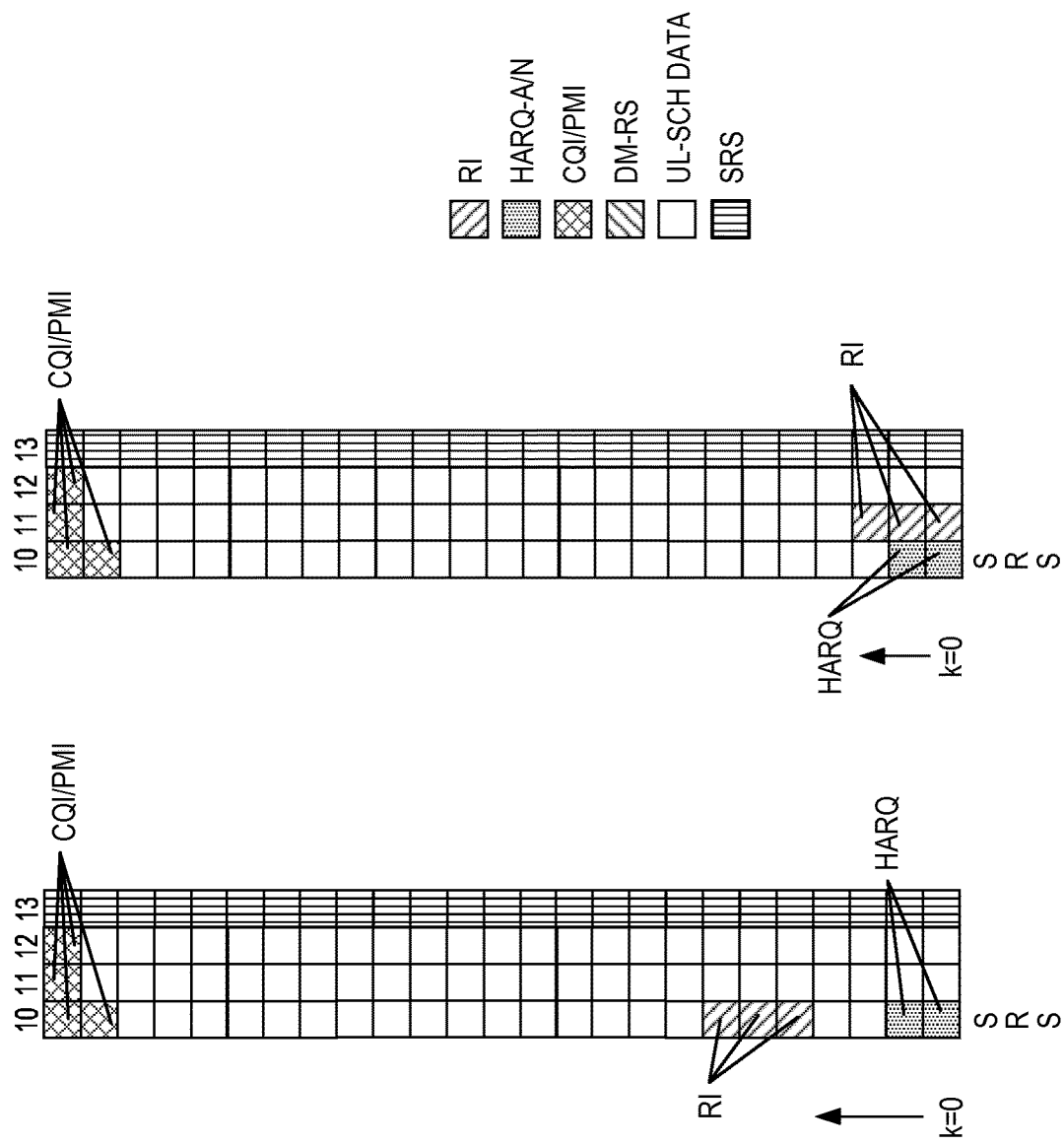
FIG. 25 illustrates multiplexing of UCI, data and SRS on 4-symbol sPUSCH configured with data+data+data+SRS where the closest DMRS in time domain is transmitted before this sPUSCH, according to some embodiments.

FIG. 25 illustrates examples on multiplexing UCI on 4-symbol sPUSCH, where the last symbol is used for SRS, and the rest of the symbols are for data transmission. Note that alternative UCI mappings that are latency-optimized can be used as well similarly as in FIG. 24, with the addition of SRS in the last SC-FDMA symbol.

UCI Mapping on 7-Symbol PUSCH

Figure 26:
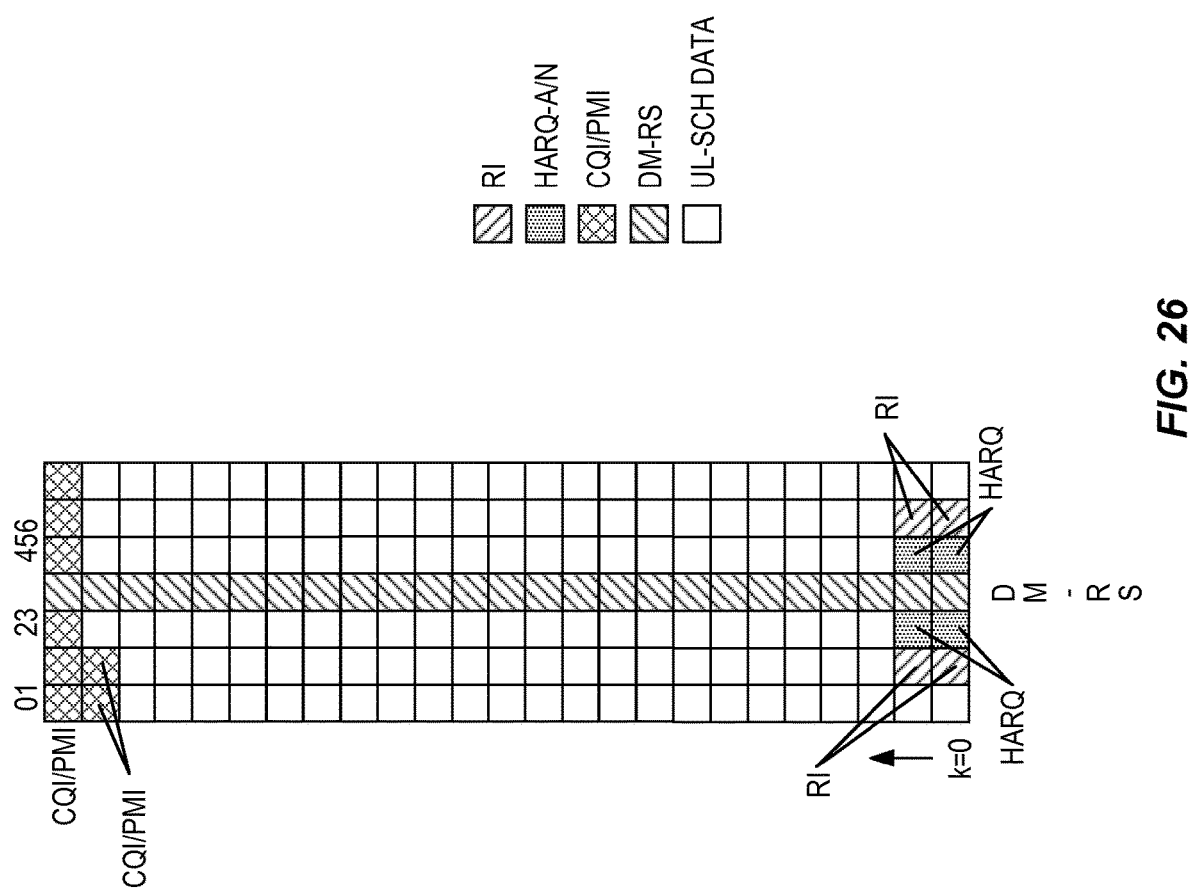
FIG. 26 illustrates multiplexing of UCI and data on 7-symbol sPUSCH where the legacy DMRS position is reused, according to some embodiments.

In this section, some examples of UCI mapping on 7-symbol sPUSCH are provided, considering different DMRS configurations. FIG. 26 shows an example of multiplexing UCI on 7-symbol sPUSCH, where the legacy DMRS position is reused, that is, the DMRS is placed at the middle of the 7-symbol sPUSCH. In this case, the legacy UCI mapping rule is reused.

Figure 27:
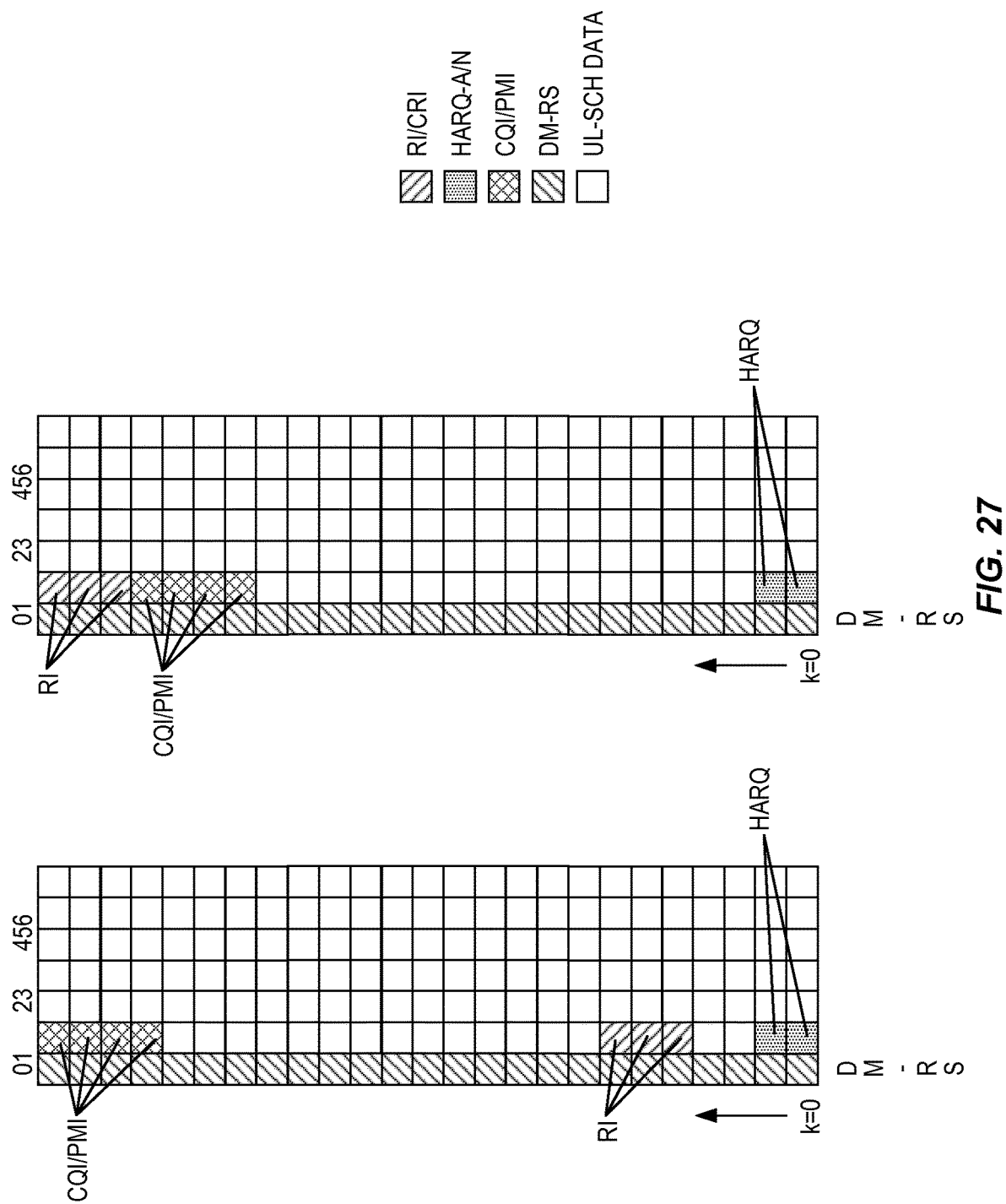
FIG. 27 illustrates multiplexing of UCI and data on 7-symbol sPUSCH where the DMRS is placed in the first SC-FDMA symbol and UCI is mapped to the following SC-FDMA symbol, according to some embodiments.
Figure 28:
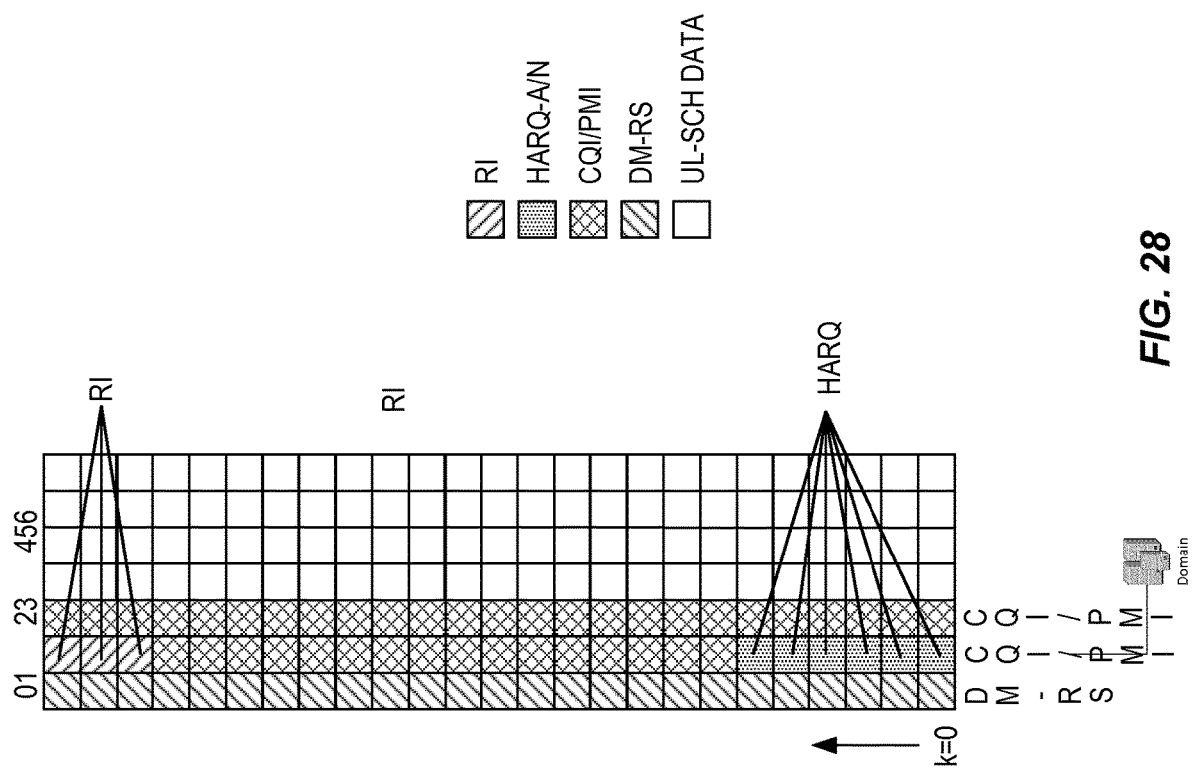
FIG. 28 illustrates multiplexing of UCI and data on 7-symbol sPUSCH in the case where the DMRS placed in the first SC-FDMA symbol and there is a large PMI/CQI payload, according to some embodiments.

FIG. 27 shows the latency-optimized pattern for 7-symbol sPUSCH. The DMRS is placed in the first SC-FDMA symbol and UCI is mapped to the following SC-FDMA symbol. In case the payload of CQI/PMI is large, CQI/PMI is mapped on consecutive SC-FDMA symbols starting from the SC-FDMA symbol following the DMRS symbol. An example of this case is illustrated in FIG. 28.

Figure 29:
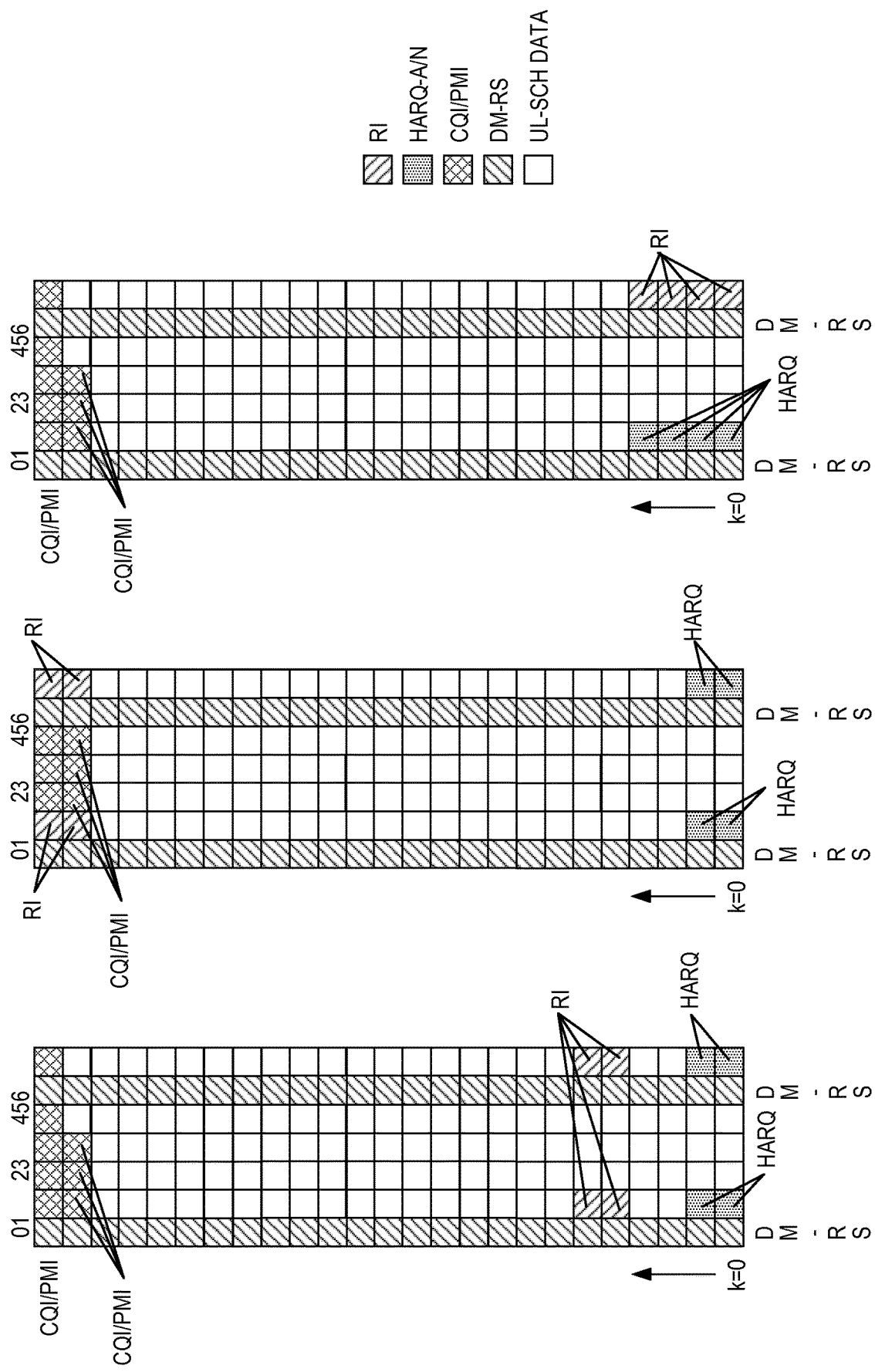
FIG. 29 illustrates multiplexing of UCI and data on 7-symbol sPUSCH where the first and the sixth SC-FDMA symbols are used for DMRS and the rest of the symbols are used for data, according to some embodiments.

In high Doppler scenarios, a single DMRS is not sufficient to provide good channel estimation at the eNodeB. In such cases, more DMRS symbols are needed to improve the channel estimation, and thereby improve the decoding of UCI and data. FIG. 29 shows some examples on UCI mapping on 7-symbol sPUSCH, where 2 SC-FDMA symbols are used for transmitting DMRS. The first and the sixth SC-FDMA symbols of the 7-symbol sPUSCH are used for DMRS, the rest of the symbols are used for data. Similar mapping rules can be used for other DMRS configurations for 7-symbol sPUSCH.

In the left-most and middle examples shown in FIG. 29, similar mapping rules as shown in FIG. 3, for 2 symbol sPUSCH, are used for multiplexing of HARQ ACK/NACK and RI on 7-symbol sPUSCH. In this example, HARQ ACK/NACK and RI are placed on both symbol 1 and symbol 6. In the right-most example in FIG. 29, HARQ ACK/NACK is placed on symbol 1, which is close to the first DMRS symbol, and RI is placed on symbol 6, which is close to the second DMRS symbol. The mapping in the left and middle examples of FIG. 29 can provide time diversity for transmitting HARQ ACK/NACK and RI. The left example in FIG. 29 requires a predefined maximum number of complex-valued symbols for HARQ ACK/NACK, which is not needed if the mapping in the middle or right-most example of FIG. 29 is used. Note that for high Doppler scenarios, the channel varies fast in time domain, thus, the CSI reports, i.e., RI, CQI and PMI, may not be very useful. In such cases, the middle example is the preferred mapping solution. When more resources are needed for the multiplexing of HARQ ACK/NACK or/and RI, symbol 4 can also be used for HARQ ACK/NACK or/and RI.

Case where there is No Data in sPUSCH

Figure 30:
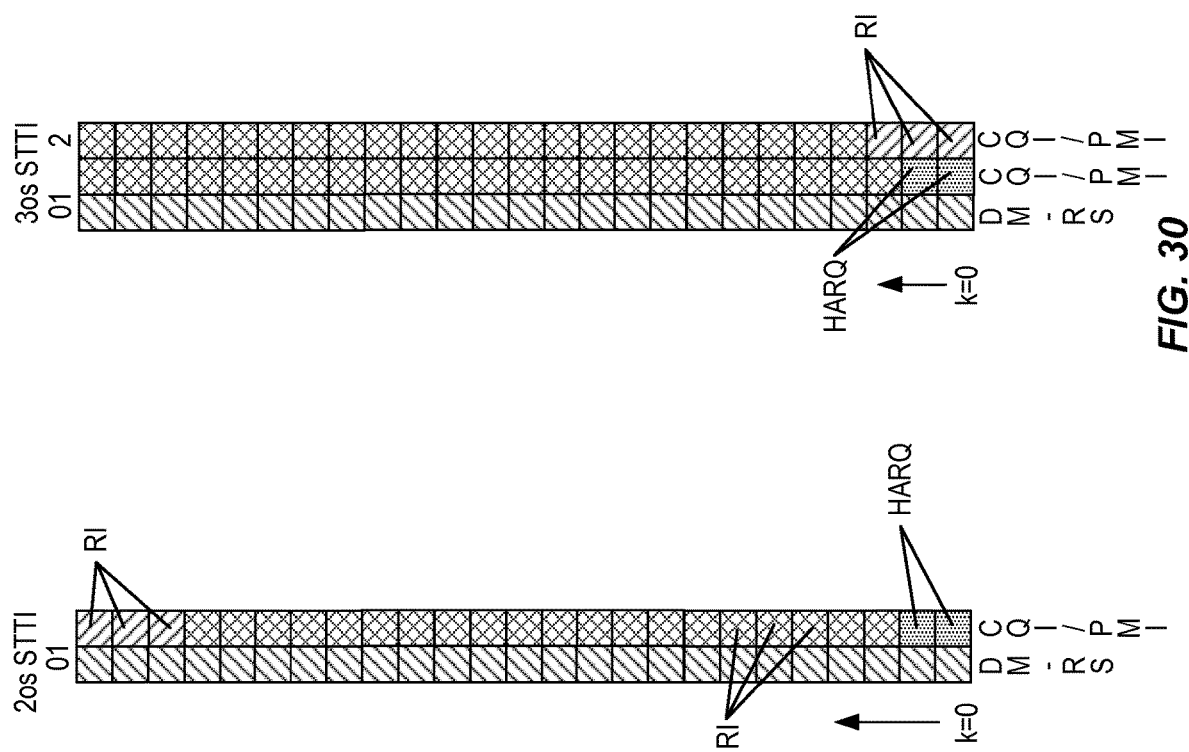
FIG. 30 illustrates an example of a mapping of UCI on 2-symbol sPUSCH and 3-symbol sPUSCH in case sPUSCH does not carry data, according to some embodiments.

In case of full TTI operation (1-millisecond TTI), an eNB can schedule an aperiodic CQI report, which is transmitted as UCI on PUSCH by the UE. The UE may not have any data in buffer and thus the PUSCH will only contain UCI. A similar behavior is possible in case of short TTI operation, when eNB schedules aperiodic CQI report on sPUSCH. The UCI mapping explained previously throughout this document can be reused, but the code rate of CQI/PMI is adapted in this situation so as to exploit the resource elements that are used neither for data, nor for RI/CRI and HARQ feedback. This means that the code rate with which the information bits corresponding to CQI/PMI are coded is lowered so that the resulting larger sequence of coded bits uses up all scheduled resource elements left unused by RI/CRI and HARQ feedback. FIG. 30 illustrates an example of multiplexing of UCI on 2-symbol sPUSCH and 3-symbol sPUSCH in case sPUSCH does not carry any data. Similar behavior is intended for all other cases and other sTTI lengths mentioned previously.

Figure 31:
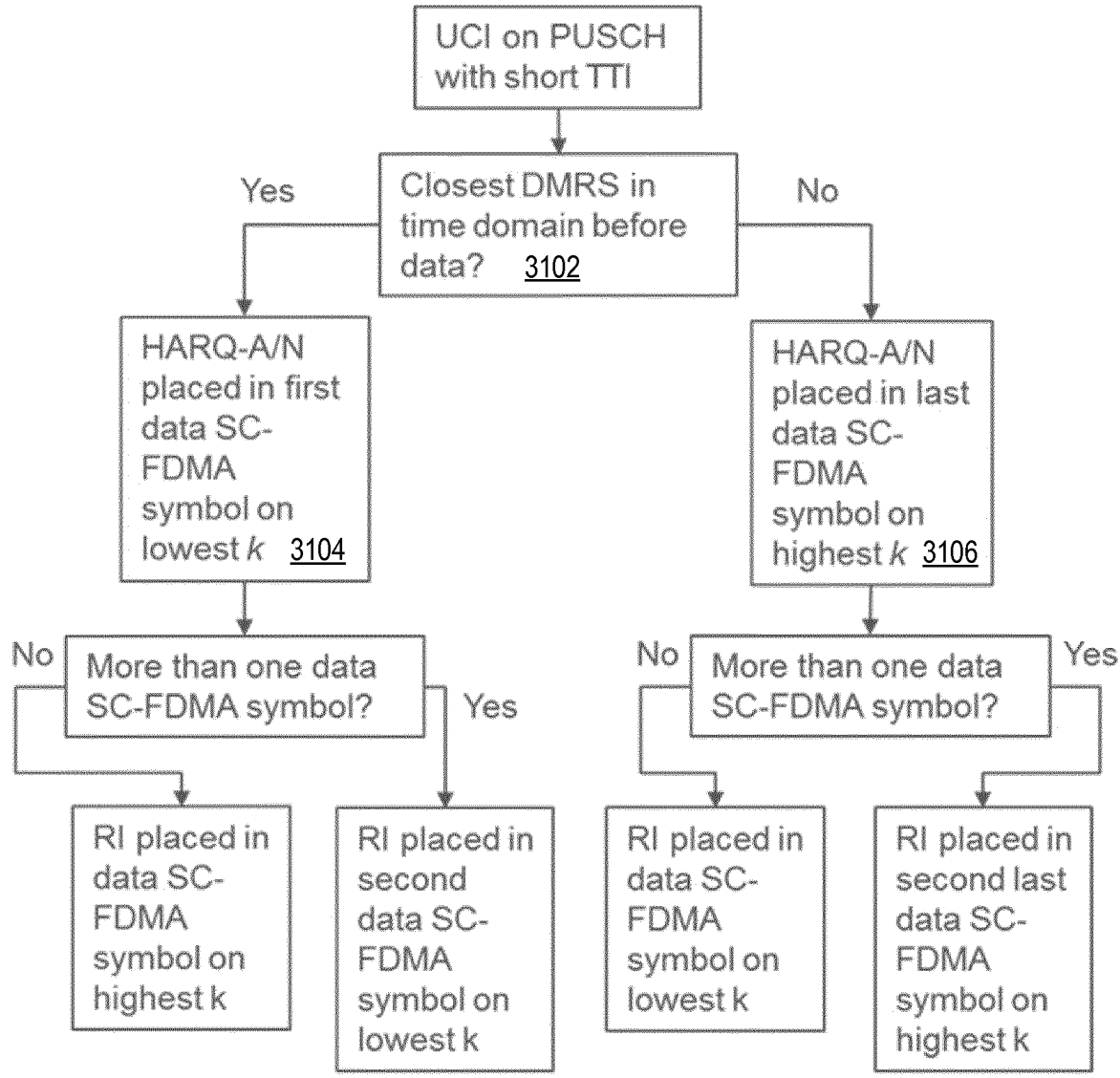
FIG. 31 illustrates a flow chart for the placement of RI and HARQ-A/N on short TTI PUSCH with different mapping for different sTTI lengths, according to some embodiments.

FIG. 31 is a flow chart of embodiments of the invention for the placement of RI and HARQ-A/N on short TTI PUSCH. A SC-FDMA symbol is DFT-spread starting in time from k=0. Different mapping solutions for different sTTI lengths are provided, without considering the mirroring method. For example, for UCI on PUSCH with sTTI, it is determined whether the closest DMRS in the time domain is before the data (block 3102). If so, HARQ-A/N is placed in the first data SC-FDMA symbol on the lowest k (block 3104). If not, HARQ-A/N is placed in the last data SC-FDMA symbol on the highest k (block 3106). If there is more than one data symbol, RI is placed either in the second data SC-FDMA symbol on the lowest k (3104 path) or the second last data SC-FDMA symbol on highest k (3106 path). If not, RI is placed in the data SC-FDMA symbol on the highest k (3104 path) or the data SC-FDMA symbol on the lowest k (3106 path).

Figure 32:
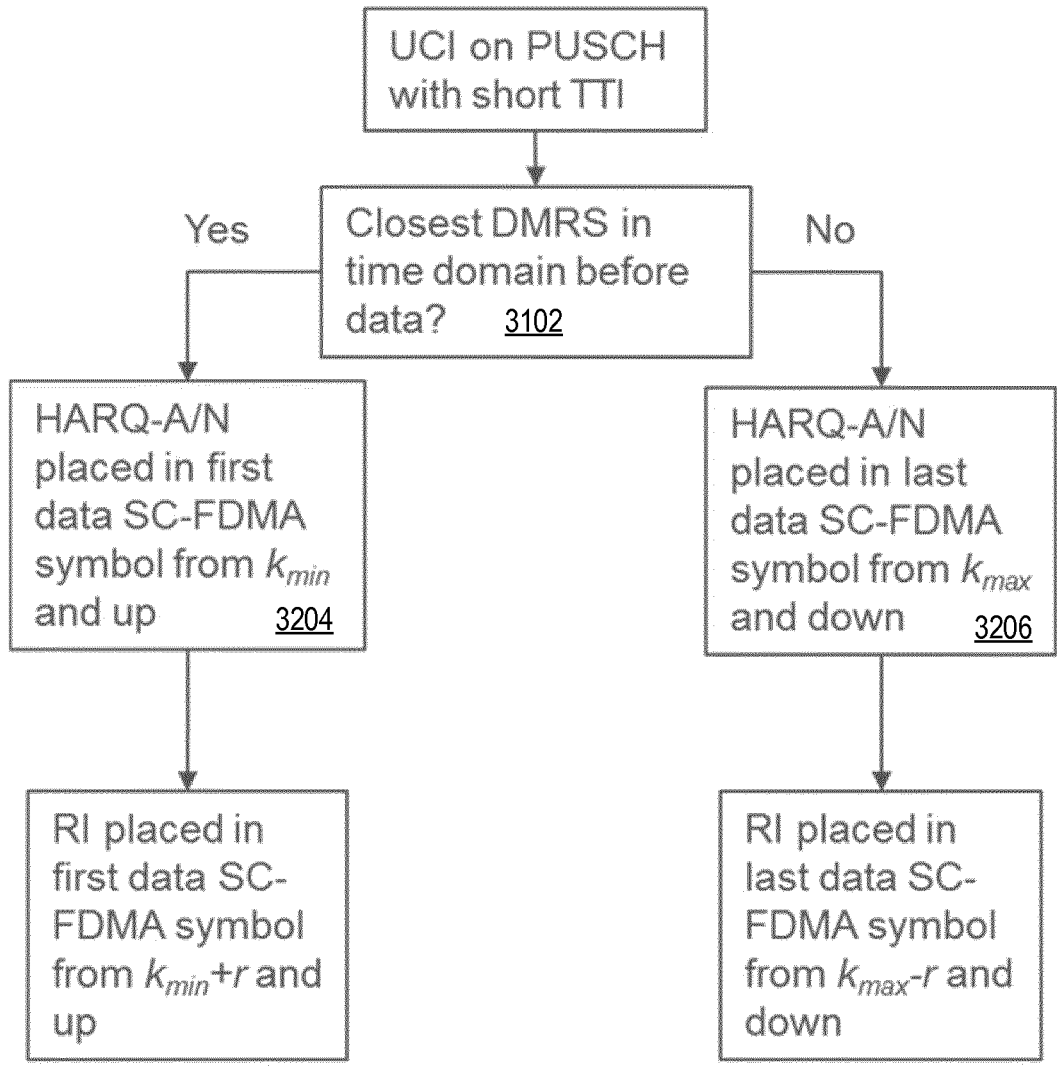
FIG. 32 illustrates a flow chart for the placement of RI and HARQ-A/N on short TTI PUSCH with uniform mapping for all sTTI lengths, according to some embodiments.

FIG. 32 is a flow chart of embodiments of the invention for the placement of RI and HARQ-A/N on short TTI PUSCH. A SC-FDMA symbol is DFT-spread starting in time from k=0. This method provides a uniform mapping solution for all sTTI lengths, without considering the mirroring method. If the closest DMRS in the time domain is before the data, HARQ-A/N is placed in the first SC_FDMA symbol from kmin and up (block 3204). If not, HARQ-A/N is placed in the last SC_FDMA symbol from kmax and down (block 3206).

In FIG. 31 and FIG. 32, k=kmin, . . . , kmax is the symbol index before transform precoding (see section 5.3.3 in 3GPP TS 36.211), and r is the predefined maximum number of symbols used for HARQ ACK/NACK.

When the mirroring method is considered, the UCI mapping for the cases where the closest DMRS is transmitted after the data are obtained by mirroring the UCI patterns based on the left paths of FIG. 31 and FIG. 32.

Implementations

Figure 33:
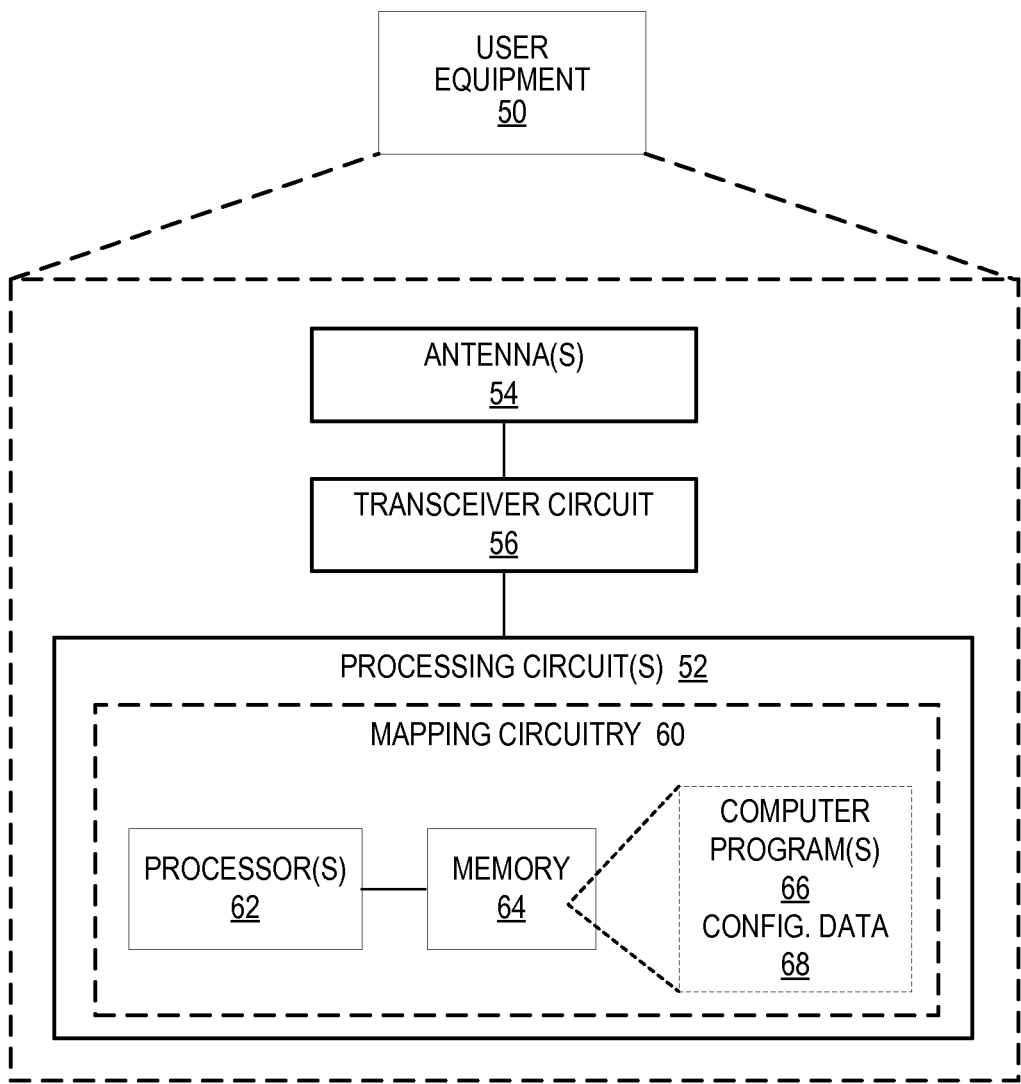
FIG. 33 is a block diagram of a user equipment configured to operate as a transmitting device, according to some embodiments.
Figure 35:
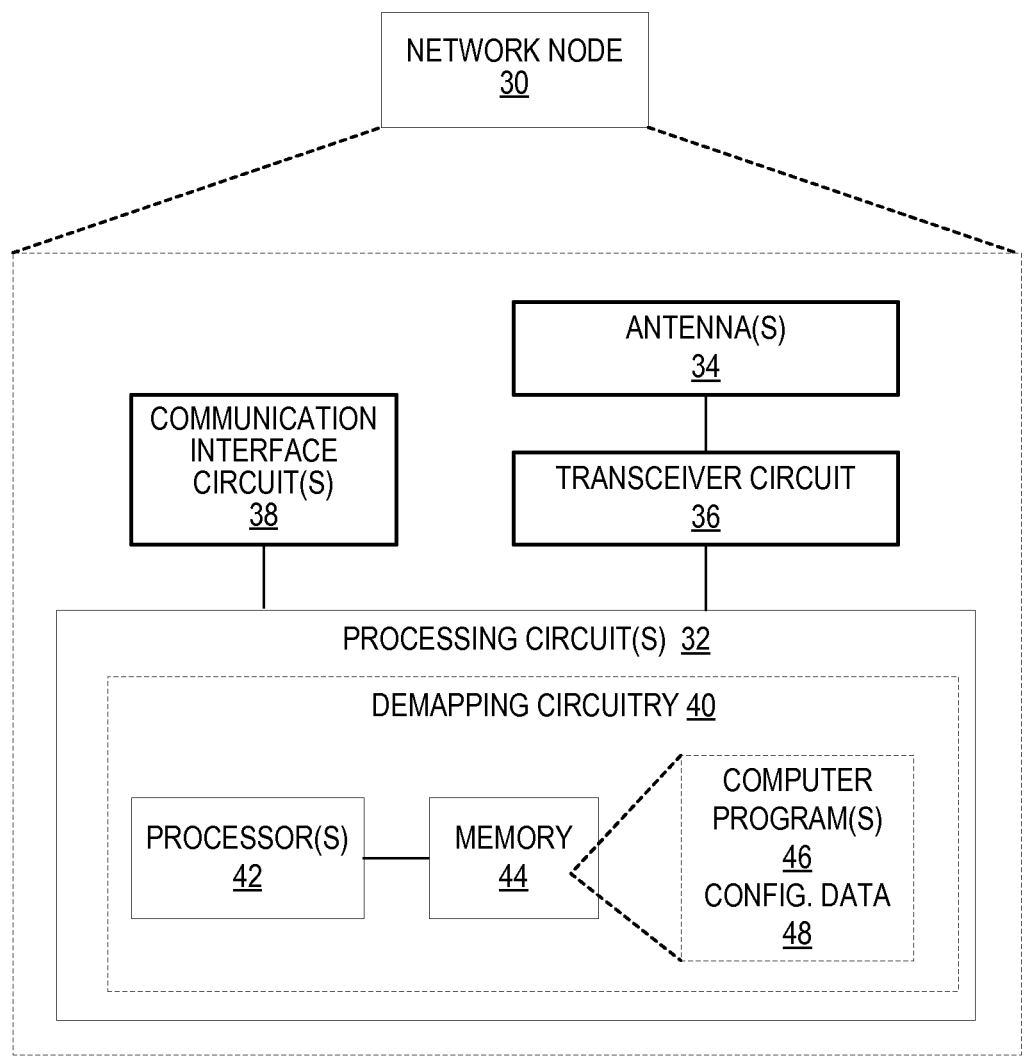
FIG. 35 is a block diagram of a network node configured to operate as a receiving device, according to some embodiments.

The techniques referred to above can be implemented by respective transmitting and receiving devices. FIG. 33 is a block diagram of a wireless device (UE 50) that is configured to operate as a transmitting device, and FIG. 35 is a block diagram of a network node (network node 30) configured to operate as a receiving device. For purposes of discussion, FIGS. 33 and 35 show the UE 50 as a transmitting device and the network node 30 as a receiving device. However, the network node 30 may also be configured to operate as a transmitting device, and likewise, the UE 50 may also be configured to operate as a receiving device.

FIG. 33 illustrates a diagram of a wireless device (UE 50) configured to operate as a transmitting device (or transmitter apparatus), according to some embodiments. To ease explanation, the UE 50 may be considered to represent any radio communication device such as a target device (device targeted for communication), device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

The UE 50 communicates with a transmitting device, radio node or base station, such as the network access node 30, via antennas 54 and a transceiver circuit 56. The transceiver circuit 56 may include transmitter circuitry, receiver circuitry, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced.

The UE 50 also includes one or more processing circuits 52 that are operatively associated with the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the UE 50.

In some embodiments, the processor 62 of the processing circuit 52 may execute a computer program 66 stored in the memory 64 that configures the processor 62 to perform a method of mapping control information to each of a plurality of TTIs/transmissions, for transmission as SC-FDMA signals, where each of the plurality of transmissions comprises one or more SC-FDMA symbols and where the control information comprises at least HARQ ACK/NACK data for each of the plurality of TTIs and may also include RI data and CQI data. Accordingly, the processing circuit 52 is configured to determine, for each of the plurality of transmissions, whether user data to be transmitted in the transmission, i.e. TTI, will be closest in time to a DMRS transmitted before the user data or to a DMRS transmitted after the user data.

The processing circuit 52 is also configured to, for each of the plurality of transmissions in which user data to be transmitted in the transmission/TTI will be closest in time to DMRS transmitted before the user data, map all HARQ ACK/NACK data for the transmission/TTI to the earliest in time SC-FDMA symbol of the transmission/TTI that carries user data, and to pre-DFT symbols that correspond to that SC-FDMA symbol and that are closest in time to the DMRS transmitted before the user data. The processing circuit 52 is also configured to, for each of the plurality of transmissions in which user data to be transmitted in the transmission/TTI will be closest in time to DMRS transmitted after the user data, map all HARQ ACK/NACK data for the transmission to the last in time SC-FDMA symbol of the transmission/TTI that carries user data, and to pre-DFT symbols that correspond to that SC-FDMA symbol and that are closest in time to the DMRS transmitted after the user data. The processing circuit 52 is further configured to form, for each of the plurality of transmissions, an SC-FDMA signal from user data and control information for the transmission/TTI, based on the mapping of the HARQ ACK/NACK data. This functionality may be performed by the mapping circuitry 60 in the processing circuit 52. The transmitter apparatus may include transmitter circuitry configured to transmit the SC-FDMA signals.

Figure 34:
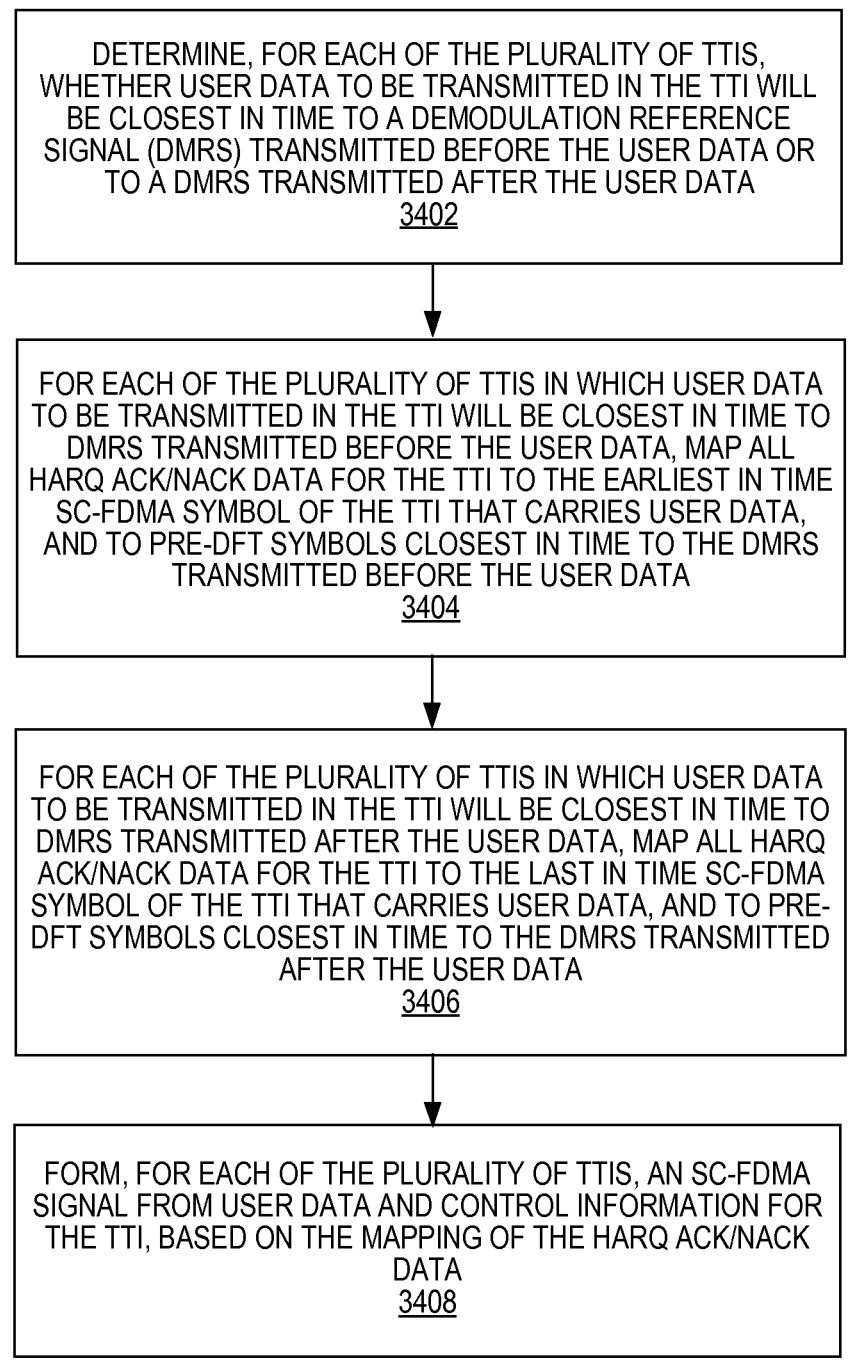
FIG. 34 illustrates a method of mapping HARQ ACK/NACK data to earlier or later SC-FDMA symbols of the TTI and pre-DFT symbols, according to some embodiments.

Regardless of its specific implementation, the processing circuit 52 of the network node 30 is configured to perform a method in a transmitting device, of mapping control information to each of a plurality of TTIs/transmissions, for transmission as SC-FDMA signals, where each of the plurality of transmissions comprises one or more SC-FDMA symbols and where the control information comprises at least HARQ ACK/NACK data, RI data and CQI data for each of the plurality of transmissions, such as method 3400 of FIG. 34.

The method 3400 includes determining, for each of the plurality of transmissions, whether user data to be transmitted in the transmission/TTI will be closest in time to a DMRS transmitted before the user data or to a DMRS transmitted after the user data (block 3402). The method 3400 includes, for each of the plurality of transmissions in which user data to be transmitted in the transmission/TTI will be closest in time to DMRS transmitted before the user data, mapping all HARQ ACK/NACK data for the transmission/TTI to the earliest in time SC-FDMA symbol of the transmission/TTI that carries user data, and to pre-DFT symbols that correspond to that SC-FDMA symbol and that are closest in time to the DMRS transmitted before the user data (block 3404). The method 3400 also includes, for each of the plurality of transmissions in which user data to be transmitted in the transmission/TTI will be closest in time to DMRS transmitted after the user data, mapping all HARQ ACK/NACK data for the transmission/TTI to the last in time SC-FDMA symbol of the transmission/TTI that carries user data, and to pre-DFT symbols that correspond to that SC-FDMA symbol and that are closest in time to the DMRS transmitted after the user data (block 3406). The method 3400 further includes forming, for each of the plurality of transmissions, an SC-FDMA signal from user data and control information for the transmission/TTI, based on the mapping of the HARQ ACK/NACK data (3408).

In some embodiments, the method 3400 includes, for each of the plurality of TTIs/transmissions, mapping RI data for the transmission/TTI to the same SC-FDMA symbol to which the HARQ ACK/NACK data is mapped, but to pre-DFT symbols that map to that same SC-FDMA symbol but that are as far as possible from the DMRS closest in time to the user data of the transmission/TTI.

In other embodiments, the method includes, for each of the plurality of transmissions in which two or more SC-FDMA symbols are to carry user data, mapping RI data for the transmission/TTI to an SC-FDMA symbol that carries user data and that is immediately adjacent in time to the SC-FDMA symbol to which the HARQ ACK/NACK data is mapped, and to pre-DFT symbols that map to that adjacent SC-FDMA symbol and that are as close as possible to the DMRS closest in time to the user data of the transmission/TTI.

In some embodiments, the method 3400 includes, for each of the plurality of transmissions, mapping RI data for the transmission/TTI to the same SC-FDMA symbol to which the HARQ ACK/NACK data is mapped, and to pre-DFT symbols that as close as possible to the pre-DFT symbols to which the HARQ ACK/NACK data is mapped, given a predetermined maximum number of pre-DFT symbols allocated to HARQ ACK/NACK data.

The method 3400 may also include determining, for each of the plurality of transmissions, whether more than one SC-FDMA symbol of the transmission/TTI is to carry user data. For each of the plurality of transmissions in which only one SC-FDMA symbol is to carry user data, the method 3400 then includes mapping RI data for the transmission/TTI to the same SC-FDMA symbol to which the HARQ ACK/NACK data is mapped, but to pre-DFT symbols that map to that same SC-FDMA symbol but that are as far as possible from the DMRS closest in time to the user data of the transmission. For each of the plurality of transmissions in which two or more SC-FDMA symbols are to carry user data, the method 3400 then includes mapping RI data for the transmission/TTI to an SC-FDMA symbol that carries user data and that is immediately adjacent in time to the SC-FDMA symbol to which the HARQ ACK/NACK data is mapped, and to pre-DFT symbols that map to that adjacent SC-FDMA symbol and that are as close as possible to the DMRS closest in time to the user data of the transmission.

In some cases, the method 3400 may include, for each of the plurality of transmissions in which two or more SC-FDMA symbols are to carry user data, mapping CQI data for the transmission/TTI as evenly as possible to the two or more SC-FDMA symbols that are to carry user data.

FIG. 35 illustrates a diagram of a network node 30 configured to operate as a receiving device (or receiver apparatus), according to some embodiments. The network node 30 facilitates communication between UEs and the core network. The generic terminology "network node" is used, but the network node 30 can be any kind of network node such as a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., 3rd party node, a node external to the current network), etc. It may also include, in some cases, Operations Support System (OSS), Operations and Maintenance (O&M), Self-Organizing Network (SON), positioning node, Evolved Serving Mobile Location Center (E-SMLC), a centralized controller, a core network node, Mobility Management Entity (MME), base station controller, or network controller.

The network node 30 has a communication interface circuit 38 that includes circuitry for communicating with other nodes in the core network, radio nodes, and/or other types of nodes in the network for the purposes of providing data and cellular communication services. The network node 30 communicates with UEs via antennas 34 and a transceiver circuit 36. The transceiver circuit 36 may include transmitter circuitry, receiver circuitry, and associated control circuits that are collectively configured to transmit and receive signals according to a radio access technology, for the purposes of providing cellular communication services. According to various embodiments, cellular communication services may be operated according to any one or more of the 3GPP cellular standards, GSM, general packet radio service (GPRS), wideband code division multiple access (WCDMA), high-speed downlink packet access (HSDPA), LTE and LTE-Advanced.

The network node 30 also includes one or more processing circuits 32 that are operatively associated with the communication interface circuit 38 or transceiver circuit 36. The network node 30 uses the communication interface circuit 38 to communicate with network nodes and the transceiver circuit 36 to communicate with UEs. For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32.

In general, the memory 44 comprises one or more types of computer-readable storage media providing non-transitory storage of the computer program 46 and any configuration data 48 used by the network node 30. Here, "non-transitory" means permanent, semi-permanent, or at least temporarily persistent storage and encompasses both long-term storage in non-volatile memory and storage in working memory, e.g., for program execution.

In some embodiments, the processor 42 of the processing circuit 32 may execute a computer program 46 stored in the memory 44 that configures the processor 42 to operate as a receiver (or receiving apparatus) for de-mapping control information from each of a plurality of TTIs/transmissions received as SC-FDMA signals, where each of the plurality of transmission time intervals comprises one or more SC-FDMA symbols and where the control information comprises at least HARQ ACK/NACK data for each of the plurality of transmissions and may also comprise RI data and/or CQI data. Accordingly, the processing circuit 32 is configured to control receiver circuitry (of the transceiver circuit 36) that is configured to receive, for each of the plurality of transmissions, an SC-FDMA signal. The processing circuit 32 is configured to determine, for each of the plurality of transmissions, whether user data received in the transmission is closest in time to a DMRS transmitted before the user data or to a DMRS transmitted after the user data.

The processing circuit 32 is configured to, for each of the plurality of transmissions in which user data received in the transmission is closest in time to DMRS transmitted before the user data, de-map all HARQ ACK/NACK data for the transmission/TTI from the earliest in time SC-FDMA symbol of the transmission/TTI that carries user data, and from post-despreading symbols closest in time to the DMRS transmitted before the user data. The processing circuit 32 is also configured to, for each of the plurality of transmissions in which user data received in the transmission is closest in time to DMRS transmitted after the user data, de-map all HARQ ACK/NACK data for the transmission/TTI from the last in time SC-FDMA symbol of the transmission/TTI that carries user data, and from post-despreading symbols closest in time to the DMRS transmitted after the user data. This functionality may be performed by the de-mapping circuitry 40 in the processing circuit 32. Similar to as mentioned above, both the network node 30 and the UE 50 may be configured with any combination of the mapping circuitry 60 and the de-mapping circuitry 40.

Figure 36:
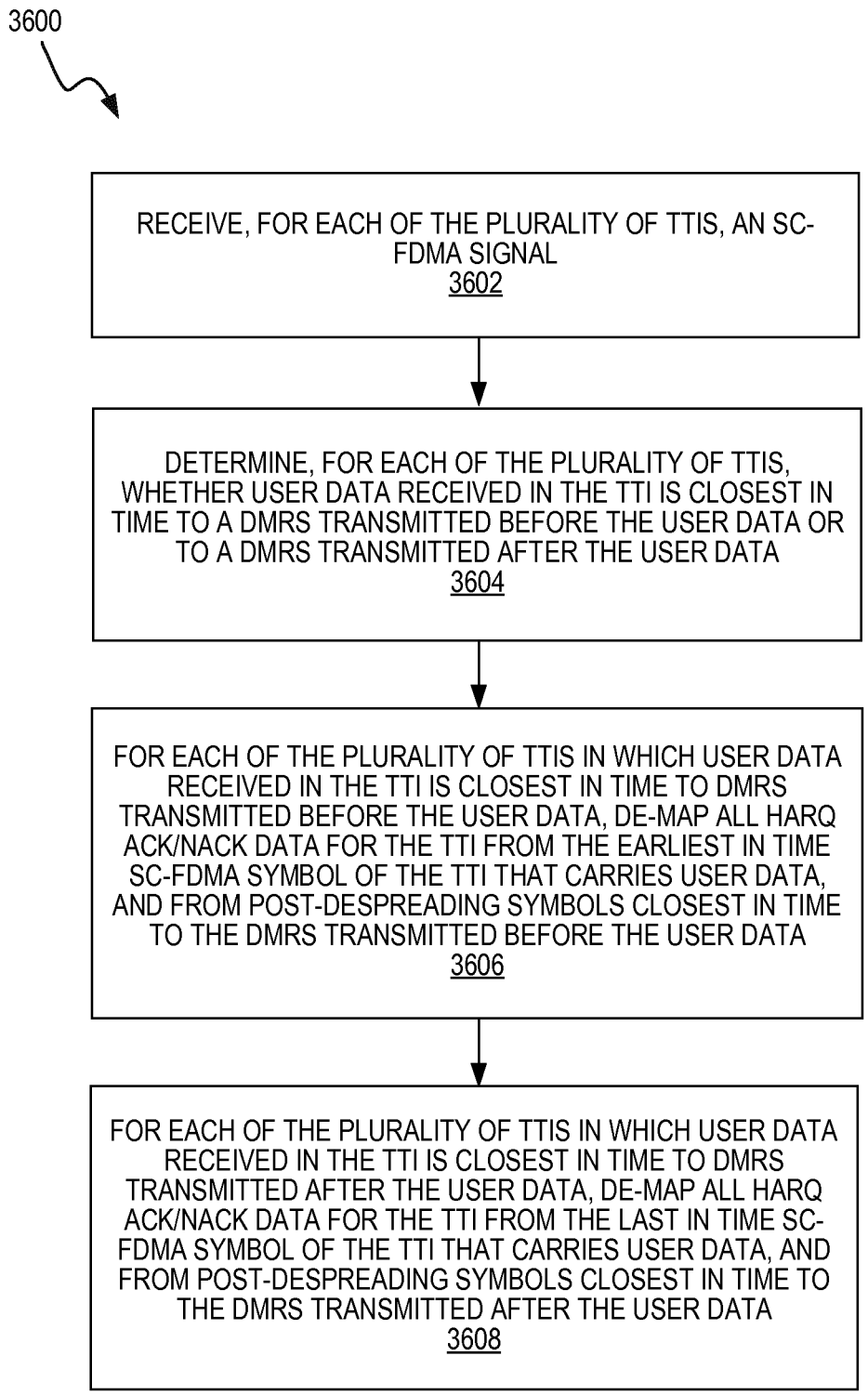
FIG. 36 illustrates a corresponding de-mapping method, according to some embodiments.

Regardless of the specific implementation, the processing circuit 32 of the network node 30 is configured to perform a method 3600 of de-mapping control information from each of a plurality of transmissions received as SC-FDMA signals, where each of the plurality of transmissions comprises one or more SC-FDMA symbols and where the control information comprises at least HARQ ACK/NACK data, RI data, and CQI data for each of the plurality of transmissions. The method 3600 is illustrated in FIG. 36 and includes receiving, for each of the plurality of transmissions, an SC-FDMA signal (block 3602). The method 3600 also includes determining, for each of the plurality of transmissions, whether user data received in the transmission is closest in time to a DMRS transmitted before the user data or to a DMRS transmitted after the user data (block 3604). For each of the plurality of transmissions in which user data received in the transmission is closest in time to DMRS transmitted before the user data, de-mapping all HARQ ACK/NACK data for the transmission/TTI from the earliest in time SC-FDMA symbol of the transmission/TTI that carries user data, and from post-despreading symbols closest in time to the DMRS transmitted before the user data (block 3606). The method 3600 also includes, for each of the plurality of transmissions in which user data received in the transmission is closest in time to DMRS transmitted after the user data, de-mapping all HARQ ACK/NACK data for the transmission/TTI from the last in time SC-FDMA symbol of the transmission/TTI that carries user data, and from post-despreading symbols closest in time to the DMRS transmitted after the user data (Block 3608).

In some embodiments, for each of the plurality of transmissions, the method 3600 includes de-mapping RI data for the transmission/TTI from the same SC-FDMA symbol to which the HARQ ACK/NACK data is mapped, but from post-despreading symbols that map to that same SC-FDMA symbol but that are as far as possible from the DMRS closest in time to the user data of the transmission.

In other embodiments, for each of the plurality of transmissions in which two or more SC-FDMA symbols carry user data, the method 3600 includes de-mapping RI data for the transmission/TTI from an SC-FDMA symbol that carries user data and that is immediately adjacent in time to the SC-FDMA symbol to which the HARQ ACK/NACK data is mapped, and from post-despreading symbols that map to that adjacent SC-FDMA symbol and that are as close as possible to the DMRS closest in time to the user data of the transmission.

In some embodiments, for each of the plurality of transmissions, the method 3600 includes de-mapping RI data for the transmission/TTI from the same SC-FDMA symbol to which the HARQ ACK/NACK data is mapped, and from post-despreading symbols that as close as possible to the post-despreading symbols to which the HARQ ACK/NACK data is mapped, given a predetermined maximum number of post-despreading symbols allocated to HARQ ACK/NACK data.

The method 3600 may include determining, for each of the plurality of transmissions, whether more than one SC-FDMA symbol of the transmission carries user data. For each of the plurality of transmissions in which only one SC-FDMA symbol carries user data, the method 3600 then includes de-mapping RI data for the transmission/TTI from the same SC-FDMA symbol to which the HARQ ACK/NACK data is mapped, but from post-despreading symbols that map to that same SC-FDMA symbol but that are as far as possible from the DMRS closest in time to the user data of the transmission. For each of the plurality of transmissions in which two or more SC-FDMA symbols carry user data, the method 3600 then includes de-mapping RI data for the transmission/TTI from an SC-FDMA symbol that carries user data and that is immediately adjacent in time to the SC-FDMA symbol to which the HARQ ACK/NACK data is mapped, and from post-despreading symbols that map to that adjacent SC-FDMA symbol and that are as close as possible to the DMRS closest in time to the user data of the transmission.

In some embodiments, for each of the plurality of transmissions in which two or more SC-FDMA symbols carry user data, the method 3600 includes de-mapping CQI data for the transmission/TTI as evenly as possible from the two or more SC-FDMA symbols that carry user data.

In other embodiments, for each of the plurality of transmissions in which two or more SC-FDMA symbols carry user data, the method 3600 includes de-mapping CQI data for the transmission/TTI, to the extent possible, from pre-DFT symbols that map to the first SC-FDMA symbol carrying user data, and then de-mapping any remaining CQI data from one or more subsequent SC-FDMA symbols.

Figure 37:
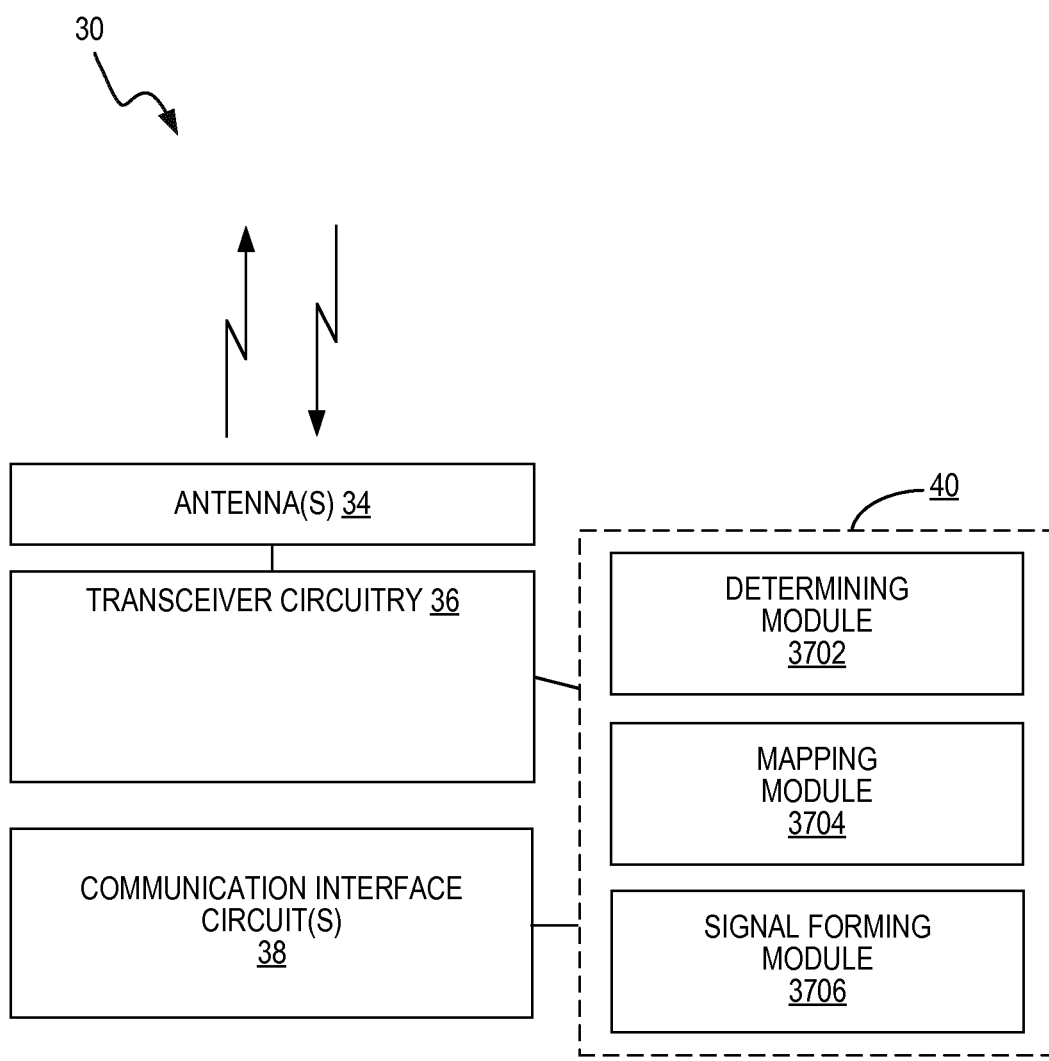
FIG. 37 is a block diagram illustrating a functional implementation of a network node configured to operate as a transmitting device, according to some embodiments.

FIG. 37 illustrates an example functional module or circuit architecture as may be implemented in the network node 30, based on the mapping circuitry 60, for mapping control information to each of a plurality of transmissions for transmission as SC-FDMA signals, where each of the plurality of transmissions comprises one or more SC-FDMA symbols and where the control information comprises at least HARQ ACK/NACK data, RI data and CQI data for each of the plurality of transmissions. The illustrated embodiment at least functionally includes a determining module 3702 for determining, for each of the plurality of transmissions, whether user data to be transmitted in the transmission will be closest in time to a DMRS transmitted before the user data or to a DMRS transmitted after the user data. The implementation includes a mapping module 3704 for, for each of the plurality of transmissions in which user data to be transmitted in the transmission will be closest in time to DMRS transmitted before the user data, mapping all HARQ ACK/NACK data for the transmission/TTI to the earliest in time SC-FDMA symbol of the transmission that carries user data, and to pre-DFT symbols closest in time to the DMRS transmitted before the user data. The mapping module 3704 is also for, for each of the plurality of transmissions in which user data to be transmitted in the transmission will be closest in time to DMRS transmitted after the user data, mapping all HARQ ACK/NACK data for the transmission/TTI to the last in time SC-FDMA symbol of the transmission that carries user data, and to pre-DFT symbols closest in time to the DMRS transmitted after the user data. The implementation includes a signal forming module 3706 for forming, for each of the plurality of transmissions, an SC-FDMA signal from user data and control information for the transmission, based on the mapping of the HARQ ACK/NACK data.

Figure 38:
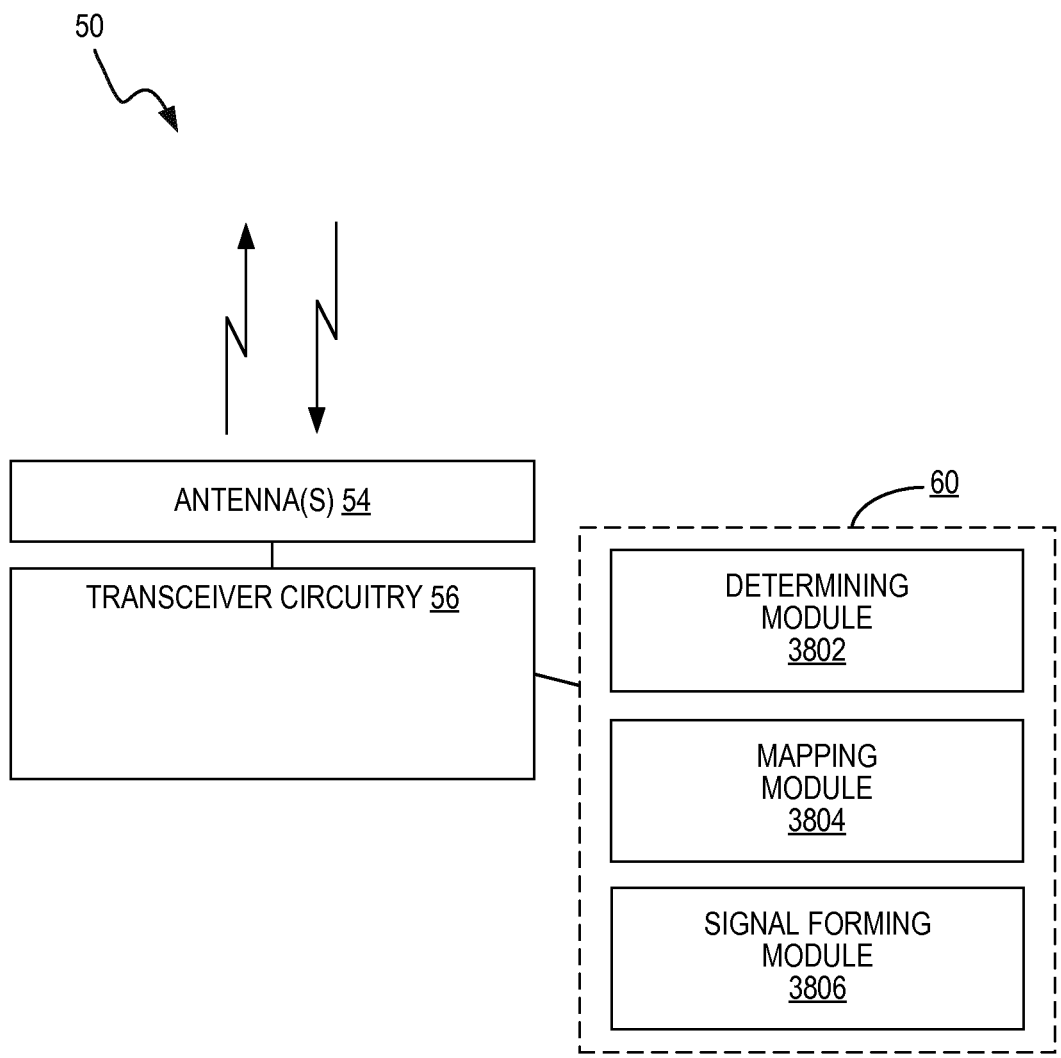
FIG. 38 is a block diagram illustrating a functional implementation of a user equipment configured to operate as a transmitting device, according to some embodiments.

FIG. 38 illustrates an example functional module or circuit architecture as may be implemented in the UE 50, based on the circuitry 60 being configured to also perform mapping control information to each of a plurality of transmissions for transmission as SC-FDMA signals, where each of the plurality of transmissions comprises one or more SC-FDMA symbols and where the control information comprises at least HARQ ACK/NACK data, RI data and CQI data for each of the plurality of transmissions. The illustrated embodiment at least functionally includes a determining module 3802 for determining, for each of the plurality of transmissions, whether user data to be transmitted in the transmission will be closest in time to a DMRS transmitted before the user data or to a DMRS transmitted after the user data. The implementation includes a mapping module 3804 for, for each of the plurality of transmissions in which user data to be transmitted in the transmission will be closest in time to DMRS transmitted before the user data, mapping all HARQ ACK/NACK data for the transmission/TTI to the earliest in time SC-FDMA symbol of the transmission/TTI that carries user data, and to pre-DFT symbols closest in time to the DMRS transmitted before the user data. The mapping module 3804 is also for, for each of the plurality of transmissions in which user data to be transmitted in the transmission will be closest in time to DMRS transmitted after the user data, mapping all HARQ ACK/NACK data for the transmission/TTI to the last in time SC-FDMA symbol of the transmission/TTI that carries user data, and to pre-DFT symbols closest in time to the DMRS transmitted after the user data. The implementation includes a signal forming module 3806 for forming, for each of the plurality of transmissions, an SC-FDMA signal from user data and control information for the transmission/TTI, based on the mapping of the HARQ ACK/NACK data.

Figure 39:
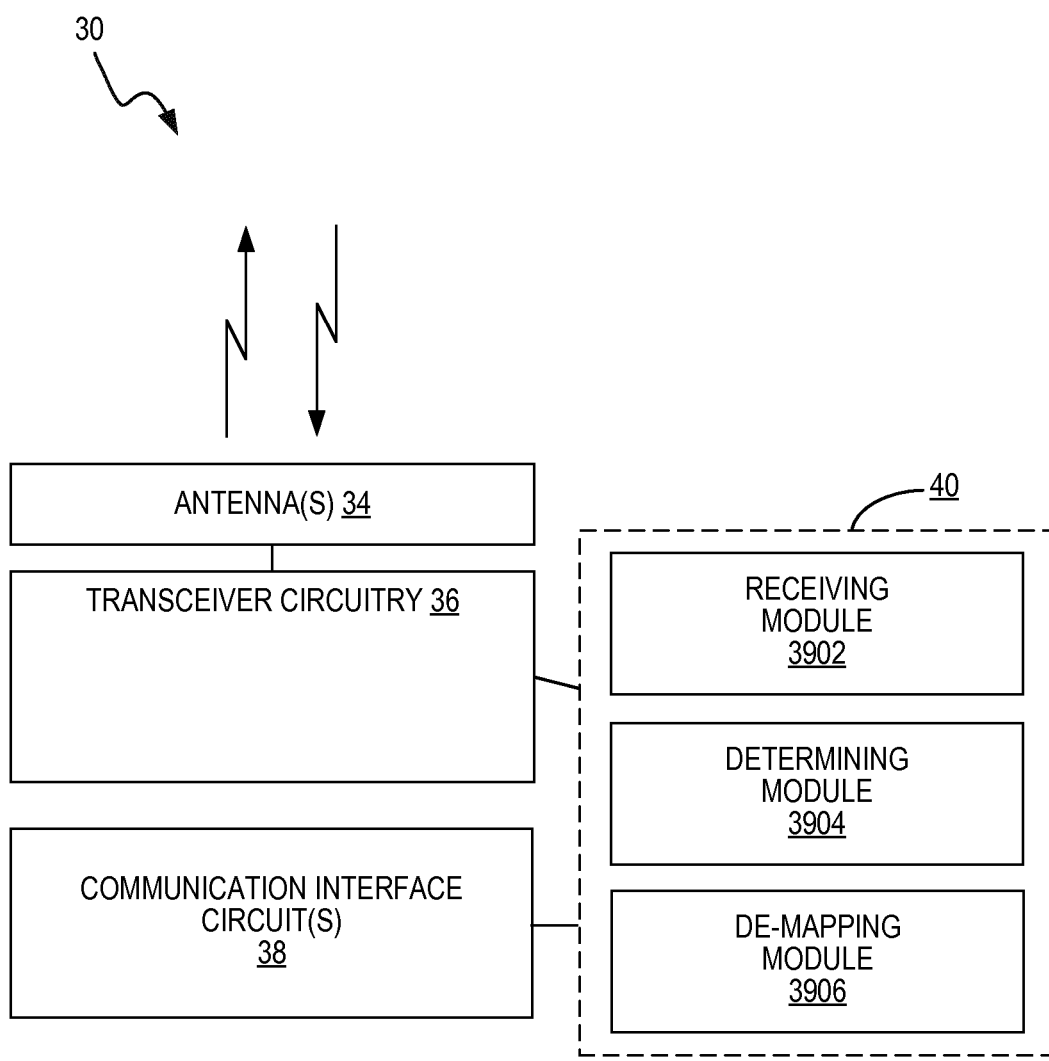
FIG. 39 is a block diagram illustrating a functional implementation of a network node configured to operate as a receiving device, according to some embodiments.

FIG. 39 illustrates an example functional module or circuit architecture as may be implemented in the network node 30, based on the circuitry 40 also being configured for de-mapping control information from each of a plurality of transmissions received as SC-FDMA signals, where each of the plurality of transmissions comprises one or more SC-FDMA symbols and where the control information comprises at least HARQ ACK/NACK data, RI data and CQI data for each of the plurality of transmission/TTIs. The illustrated embodiment at least functionally includes a receiving module 3902 for receiving, for each of the plurality of transmissions, an SC-FDMA signal. The implementation also includes a determining module 3904 for determining, for each of the plurality of transmissions, whether user data received in the transmission is closest in time to a DMRS transmitted before the user data or to a DMRS transmitted after the user data. The implementation includes a de-mapping module 3906 for, for each of the plurality of transmissions in which user data received in the transmission is closest in time to DMRS transmitted before the user data, de-mapping all HARQ ACK/NACK data for the transmission/TTI from the earliest in time SC-FDMA symbol of the transmission that carries user data, and from post-despreading symbols closest in time to the DMRS transmitted before the user data. The de-mapping module 3906 is also for, for each of the plurality of transmissions in which user data received in the transmission is closest in time to DMRS transmitted after the user data, de-mapping all HARQ ACK/NACK data for the transmission/TTI from the last in time SC-FDMA symbol of the transmission that carries user data, and from post-despreading symbols closest in time to the DMRS transmitted after the user data.

Figure 40:
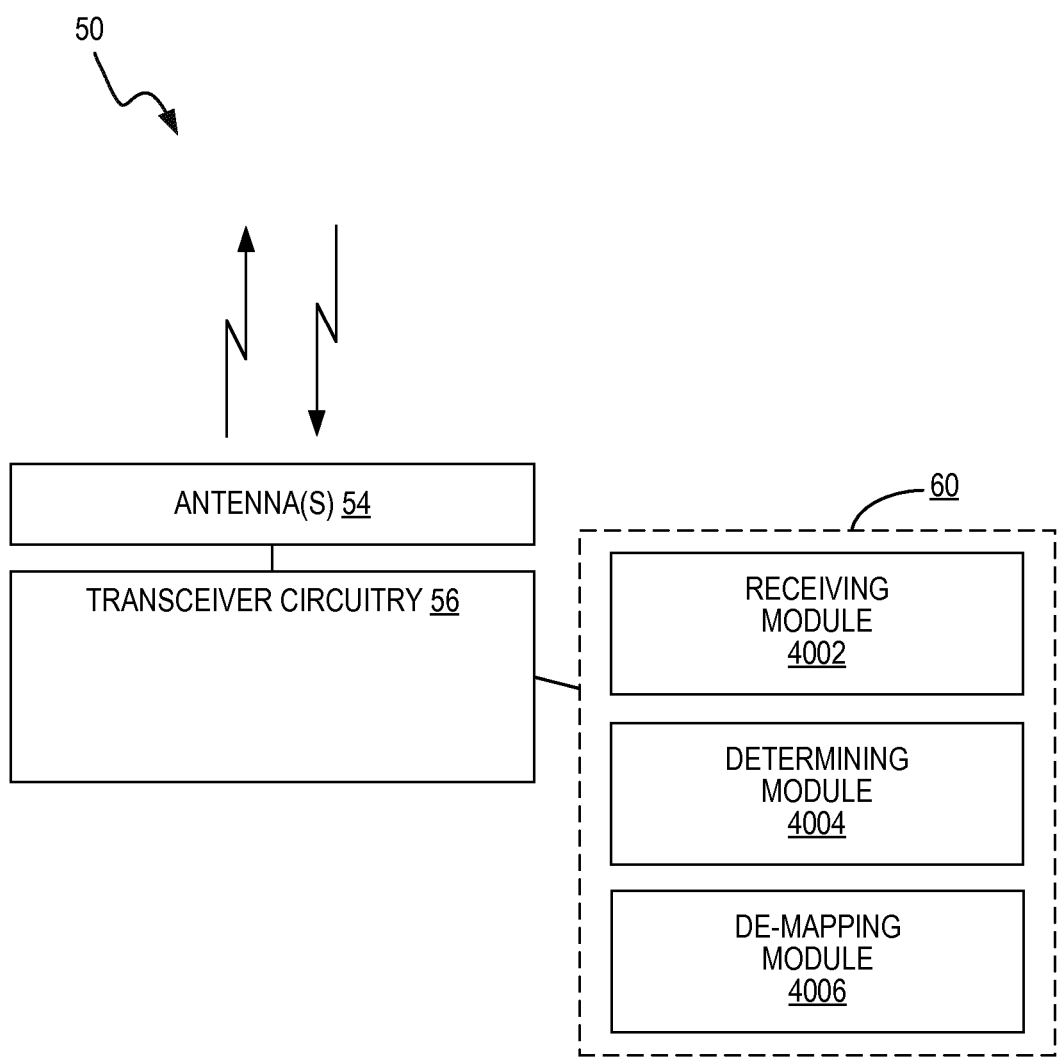
FIG. 40 is a block diagram illustrating a functional implementation of a user equipment configured to operate as a receiving device, according to some embodiments.

FIG. 40 illustrates an example functional module or circuit architecture as may be implemented in UE 50, based on the circuitry 60 being configured for de-mapping control information from each of a plurality of transmissions received as SC-FDMA signals, where each of the plurality of transmissions comprises one or more SC-FDMA symbols and where the control information comprises at least HARQ ACK/NACK data, RI data and CQI data for each of the plurality of transmissions. The illustrated embodiment at least functionally includes a receiving module 4002 for receiving, for each of the plurality of transmissions, an SC-FDMA signal. The implementation also includes a determining module 4004 for determining, for each of the plurality of transmissions, whether user data received in the transmission is closest in time to a DMRS transmitted before the user data or to a DMRS transmitted after the user data. The implementation includes a de-mapping module 4006 for, for each of the plurality of transmissions in which user data received in the transmission is closest in time to DMRS transmitted before the user data, de-mapping all HARQ ACK/NACK data for the transmission/TTI from the earliest in time SC-FDMA symbol of the transmission/TTI that carries user data, and from post-despreading symbols closest in time to the DMRS transmitted before the user data. The de-mapping module 4006 is also for, for each of the plurality of transmissions in which user data received in the transmission is closest in time to DMRS transmitted after the user data, de-mapping all HARQ ACK/NACK data for the transmission/TTI from the last in time SC-FDMA symbol of the transmission/TTI that carries user data, and from post-despreading symbols closest in time to the DMRS transmitted after the user data.

In view of the above discussion and detailed description, it will be appreciated that embodiments of the presently disclosed techniques and apparatus include, but are not limited to, the following enumerated embodiments:

(a). A method, in a transmitting device, of mapping control information to each of a plurality of transmission time intervals (TTIs), for transmission as Single-Carrier Frequency-Division Multiple Access (SC-FDMA) signals, where each of the plurality of transmission time intervals comprises one or more SC-FDMA symbols and where the control information comprises at least Hybrid Automatic Repeat-Request (HARQ) ACK/NACK data for each of the plurality of TTIs, the method comprising:

determining, for each of the plurality of TTIs, whether user data to be transmitted in the TTI will be closest in time to a demodulation reference signal (DMRS) transmitted before the user data or to a DMRS transmitted after the user data;

for each of the plurality of TTIs in which user data to be transmitted in the TTI will be closest in time to DMRS transmitted before the user data, mapping all HARQ ACK/NACK data for the TTI to the earliest in time SC-FDMA symbol of the TTI that carries user data, and to pre-Discrete-Fourier Transform (pre-DFT) symbols closest in time to the DMRS transmitted before the user data;

for each of the plurality of TTIs in which user data to be transmitted in the TTI will be closest in time to DMRS transmitted after the user data, mapping all HARQ ACK/NACK data for the TTI to the last in time SC-FDMA symbol of the TTI that carries user data, and to pre-DFT symbols closest in time to the DMRS transmitted after the user data; and forming, for each of the plurality of TTIs, an SC-FDMA signal from user data and control information for the TTI, based on the mapping of the HARQ ACK/NACK data.

(b). The method of example embodiment (a), wherein the method further comprises:

for each of the plurality of TTIs, mapping rank indicator (RI) data for the TTI to the same SC-FDMA symbol to which the HARQ ACK/NACK data is mapped, but to pre-DFT symbols that map to that same SC-FDMA symbol but that are as far as possible from the DMRS closest in time to the user data of the TTI.

(c). The method of example embodiment (a), wherein the method further comprises:

for each of the plurality of TTIs in which two or more SC-FDMA symbols are to carry user data, mapping rank indicator (RI) data for the TTI to an SC-FDMA symbol that carries user data and that is immediately adjacent in time to the SC-FDMA symbol to which the HARQ ACK/NACK data is mapped, and to pre-DFT symbols that map to that adjacent SC-FDMA symbol and that are as close as possible to the DMRS closest in time to the user data of the TTI.

(d). The method of embodiment (a), wherein the method further comprises:

for each of the plurality of TTIs, mapping rank indicator (RI) data for the TTI to the same SC-FDMA symbol to which the HARQ ACK/NACK data is mapped, and to pre-DFT symbols that as close as possible to the pre-DFT symbols to which the HARQ ACK/NACK data is mapped, given a predetermined maximum number of pre-DFT symbols allocated to HARQ ACK/NACK data.

(e). The method of example embodiment (a), wherein the method further comprises:

determining, for each of the plurality of TTIs, whether more than one SC-FDMA symbol of the TTI is to carry user data;

for each of the plurality of TTIs in which only one SC-FDMA symbol is to carry user data, mapping rank indicator (RI) data for the TTI to the same SC-FDMA symbol to which the HARQ ACK/NACK data is mapped, but to pre-DFT symbols that map to that same SC-FDMA symbol but that are as far as possible from the DMRS closest in time to the user data of the TTI;

for each of the plurality of TTIs in which two or more SC-FDMA symbols are to carry user data, mapping RI data for the TTI to an SC-FDMA symbol that carries user data and that is immediately adjacent in time to the SC-FDMA symbol to which the HARQ ACK/NACK data is mapped, and to pre-DFT symbols that map to that adjacent SC-FDMA symbol and that are as close as possible to the DMRS closest in time to the user data of the TTI.

(f). The method of any of example embodiments (a)-(e), the method further comprising:
for each of the plurality of TTIs in which two or more SC-FDMA symbols are to carry user data, mapping channel quality indicator (CQI) data for the TTI as evenly as possible to the two or more SC-FDMA symbols that are to carry user data.

(g). The method of any of example embodiments (a)-(e), the method further comprising:
for each of the plurality of TTIs in which two or more SC-FDMA symbols are to carry user data, mapping channel quality indicator (CQI) data for the TTI, to the extent possible, to pre-DFT symbols that map to the first SC-FDMA symbol carrying user data, and mapping any remaining CQI data to one or more subsequent SC-FDMA symbols.

(h). A transmitter apparatus configured to map control information to each of a plurality of transmission time intervals (TTIs), for transmission as Single-Carrier Frequency-Division Multiple Access (SC-FDMA) signals, where each of the plurality of transmission time intervals comprises one or more SC-FDMA symbols and where the control information comprises at least Hybrid Automatic Repeat-Request (HARQ) ACK/NACK data for each of the plurality of TTIs, the transmitter apparatus comprising:
processing circuitry configured to:
determine, for each of the plurality of TTIs, whether user data to be transmitted in the TTI will be closest in time to a demodulation reference signal (DMRS) transmitted before the user data or to a DMRS transmitted after the user data;
for each of the plurality of TTIs in which user data to be transmitted in the TTI will be closest in time to DMRS transmitted before the user data, map all HARQ ACK/NACK data for the TTI to the earliest in time SC-FDMA symbol of the TTI that carries user data, and to pre-Discrete-Fourier Transform (pre-DFT) symbols closest in time to the DMRS transmitted before the user data;
for each of the plurality of TTIs in which user data to be transmitted in the TTI will be closest in time to DMRS transmitted after the user data, map all HARQ ACK/NACK data for the TTI to the last in time SC-FDMA symbol of the TTI that carries user data, and to pre-DFT symbols closest in time to the DMRS transmitted after the user data; and
form, for each of the plurality of TTIs, an SC-FDMA signal from user data and control information for the TTI, based on the mapping of the HARQ ACK/NACK data; and
transmitter circuitry configured to transmit the SC-FDMA signals.

(i). The transmitter apparatus of example embodiment (h), wherein the processing circuitry is further configured to:
for each of the plurality of TTIs, map rank indicator (RI) data for the TTI to the same SC-FDMA symbol to which the HARQ ACK/NACK data is mapped, but to pre-DFT symbols that map to that same SC-FDMA symbol but that are as far as possible from the DMRS closest in time to the user data of the TTI.

(j). The transmitter apparatus of example embodiment (h), wherein the processing circuitry is further configured to:
for each of the plurality of TTIs in which two or more SC-FDMA symbols are to carry user data, map rank indicator (RI) data for the TTI to an SC-FDMA symbol that carries user data and that is immediately adjacent in time to the SC-FDMA symbol to which the HARQ ACK/NACK data is mapped, and to pre-DFT symbols that map to that adjacent SC-FDMA symbol and that are as close as possible to the DMRS closest in time to the user data of the TTI.

(k). The transmitter apparatus of embodiment (h), wherein the processing circuitry is further configured to:
for each of the plurality of TTIs, map rank indicator (RI) data for the TTI to the same SC-FDMA symbol to which the HARQ ACK/NACK data is mapped, and to pre-DFT symbols that as close as possible to the pre-DFT symbols to which the HARQ ACK/NACK data is mapped, given a predetermined maximum number of pre-DFT symbols allocated to HARQ ACK/NACK data.

(l). The transmitter apparatus of example embodiment (h), wherein the processing circuitry is further configured to:
determine, for each of the plurality of TTIs, whether more than one SC-FDMA symbol of the TTI is to carry user data;
for each of the plurality of TTIs in which only one SC-FDMA symbol is to carry user data, map rank indicator (RI) data for the TTI to the same SC-FDMA symbol to which the HARQ ACK/NACK data is mapped, but to pre-DFT symbols that map to that same SC-FDMA symbol but that are as far as possible from the DMRS closest in time to the user data of the TTI;
for each of the plurality of TTIs in which two or more SC-FDMA symbols are to carry user data, map RI data for the TTI to an SC-FDMA symbol that carries user data and that is immediately adjacent in time to the SC-FDMA symbol to which the HARQ ACK/NACK data is mapped, and to pre-DFT symbols that map to that adjacent SC-FDMA symbol and that are as close as possible to the DMRS closest in time to the user data of the TTI.

(m). The transmitter apparatus of any of example embodiments (h)-(l), wherein the processing circuitry is further configured to:
for each of the plurality of TTIs in which two or more SC-FDMA symbols are to carry user data, map channel quality indicator (CQI) data for the TTI as evenly as possible to the two or more SC-FDMA symbols that are to carry user data.

(n). The transmitter apparatus of any of example embodiments (h)-(l), wherein the processing circuitry is further configured to:
for each of the plurality of TTIs in which two or more SC-FDMA symbols are to carry user data, map channel quality indicator (CQI) data for the TTI, to the extent possible, to pre-DFT symbols that map to the first SC-FDMA symbol carrying user data, and map any remaining CQI data to one or more subsequent SC-FDMA symbols.

(o). A method, in a receiving device, of de-mapping control information from each of a plurality of transmission time intervals (TTIs), received as Single-Carrier Frequency-Division Multiple Access (SC-FDMA) signals, where each of the plurality of transmission time intervals comprises one or more SC-FDMA symbols and where the control information comprises at least Hybrid Automatic Repeat-Request (HARQ) ACK/NACK data for each of the plurality of TTIs, the method comprising: receiving, for each of the plurality of TTIs, an SC-FDMA signal;
determining, for each of the plurality of TTIs, whether user data received in the TTI is closest in time to a demodulation reference signal (DMRS) transmitted before the user data or to a DMRS transmitted after the user data;
for each of the plurality of TTIs in which user data received in the TTI is closest in time to DMRS transmitted before the user data, de-mapping all HARQ ACK/NACK data for the TTI from the earliest in time SC-FDMA symbol of the TTI that carries user data, and from post-despreading symbols closest in time to the DMRS transmitted before the user data; and
for each of the plurality of TTIs in which user data received in the TTI is closest in time to DMRS transmitted after the user data, de-mapping all HARQ ACK/NACK data for the TTI from the last in time SC-FDMA symbol of the TTI that carries user data, and from post-despreading symbols closest in time to the DMRS transmitted after the user data.

(p). The method of example embodiment (o), wherein the method further comprises:
for each of the plurality of TTIs, de-mapping rank indicator (RI) data for the TTI from the same SC-FDMA symbol to which the HARQ ACK/NACK data is mapped, but from post-despreading symbols that map to that same SC-FDMA symbol but that are as far as possible from the DMRS closest in time to the user data of the TTI.

(q). The method of example embodiment (o), wherein the method further comprises:
for each of the plurality of TTIs in which two or more SC-FDMA symbols are to carry user data, de-mapping rank indicator (RI) data for the TTI from an SC-FDMA symbol that carries user data and that is immediately adjacent in time to the SC-FDMA symbol to which the HARQ ACK/NACK data is mapped, and from post-despreading symbols that map to that adjacent SC-FDMA symbol and that are as close as possible to the DMRS closest in time to the user data of the TTI.

(r). The method of embodiment (o), wherein the method further comprises:
for each of the plurality of TTIs, de-mapping rank indicator (RI) data for the TTI from the same SC-FDMA symbol to which the HARQ ACK/NACK data is mapped, and from post-despreading symbols that as close as possible to the post-despreading symbols to which the HARQ ACK/NACK data is mapped, given a predetermined maximum number of post-despreading symbols allocated to HARQ ACK/NACK data.

(s). The method of example embodiment (o), wherein the method further comprises:
determining, for each of the plurality of TTIs, whether more than one SC-FDMA symbol of the TTI is to carry user data;
for each of the plurality of TTIs in which only one SC-FDMA symbol is to carry user data, de-mapping rank indicator (RI) data for the TTI from the same SC-FDMA symbol to which the HARQ ACK/NACK data is mapped, but from post-despreading symbols that map to that same SC-FDMA symbol but that are as far as possible from the DMRS closest in time to the user data of the TTI;
for each of the plurality of TTIs in which two or more SC-FDMA symbols are to carry user data, de-mapping RI data for the TTI from an SC-FDMA symbol that carries user data and that is immediately adjacent in time to the SC-FDMA symbol to which the HARQ ACK/NACK data is mapped, and from post-despreading symbols that map to that adjacent SC-FDMA symbol and that are as close as possible to the DMRS closest in time to the user data of the TTI.

(t). The method of any of example embodiments (o)-(s), the method further comprising:
for each of the plurality of TTIs in which two or more SC-FDMA symbols are to carry user data, de-mapping channel quality indicator (CQI) data for the TTI as evenly as possible from the two or more SC-FDMA symbols that are to carry user data.

(u). The method of any of example embodiments (o)-(s), the method further comprising:
for each of the plurality of TTIs in which two or more SC-FDMA symbols are to carry user data, de-mapping channel quality indicator (CQI) data for the TTI, to the extent possible, from pre-DFT symbols that map to the first SC-FDMA symbol carrying user data, and then de-mapping any remaining CQI data from one or more subsequent SC-FDMA symbols.

(v). A receiver apparatus configured to de-map control information from each of a plurality of transmission time intervals (TTIs) transmitted as Single-Carrier Frequency-Division Multiple Access (SC-FDMA) signals, where each of the plurality of transmission time intervals comprises one or more SC-FDMA symbols and where the control information comprises at least Hybrid Automatic Repeat-Request (HARQ) ACK/NACK data for each of the plurality of TTIs, the receiver apparatus comprising:
receiver circuitry configured to receive, for each of the plurality of TTIs, an SC-FDMA signal; and
processing circuitry configured to:
determine, for each of the plurality of TTIs, whether user data received in the TTI is closest in time to a demodulation reference signal (DMRS) transmitted before the user data or to a DMRS transmitted after the user data;
for each of the plurality of TTIs in which user data received in the TTI is closest in time to DMRS transmitted before the user data, de-map all HARQ ACK/NACK data for the TTI from the earliest in time SC-FDMA symbol of the TTI that carries user data, and from post-despreading symbols closest in time to the DMRS transmitted before the user data; and
for each of the plurality of TTIs in which user data received in the TTI is closest in time to DMRS transmitted after the user data, de-map all HARQ ACK/NACK data for the TTI from the last in time SC-FDMA symbol of the TTI that carries user data, and from post-despreading symbols closest in time to the DMRS transmitted after the user data.

(w). The receiver apparatus of example embodiment (v), wherein the processing circuitry is further configured to:
for each of the plurality of TTIs, de-map rank indicator (RI) data for the TTI from the same SC-FDMA symbol to which the HARQ ACK/NACK data is mapped, but from post-despreading symbols that map to that same SC-FDMA symbol but that are as far as possible from the DMRS closest in time to the user data of the TTI.

(x). The receiver apparatus of example embodiment (v), wherein the processing circuitry is further configured to:
for each of the plurality of TTIs in which two or more SC-FDMA symbols are to carry user data, de-map rank indicator (RI) data for the TTI from an SC-FDMA symbol that carries user data and that is immediately adjacent in time to the SC-FDMA symbol to which the HARQ ACK/NACK data is mapped, and from post-despreading symbols that map to that adjacent SC-FDMA symbol and that are as close as possible to the DMRS closest in time to the user data of the TTI.

(y). The receiver apparatus of embodiment (v), wherein the processing circuitry is further configured to:
for each of the plurality of TTIs, de-map rank indicator (RI) data for the TTI from the same SC-FDMA symbol to which the HARQ ACK/NACK data is mapped, and from post-despreading symbols that as close as possible to the post-despreading symbols to which the HARQ ACK/NACK data is mapped, given a predetermined maximum number of post-despreading symbols allocated to HARQ ACK/NACK data.

(z). The receiver apparatus of example embodiment (v), wherein the processing circuitry is further configured to:
determine, for each of the plurality of TTIs, whether more than one SC-FDMA symbol of the TTI is to carry user data;
for each of the plurality of TTIs in which only one SC-FDMA symbol is to carry user data, de-map rank indicator (RI) data for the TTI from the same SC-FDMA symbol to which the HARQ ACK/NACK data is mapped, but from post-despreading symbols that map to that same SC-FDMA symbol but that are as far as possible from the DMRS closest in time to the user data of the TTI;
for each of the plurality of TTIs in which two or more SC-FDMA symbols are to carry user data, de-map RI data for the TTI from an SC-FDMA symbol that carries user data and that is immediately adjacent in time to the SC-FDMA symbol to which the HARQ ACK/NACK data is mapped, and from post-despreading symbols that map to that adjacent SC-FDMA symbol and that are as close as possible to the DMRS closest in time to the user data of the TTI.

(aa). The receiver apparatus of any of example embodiments (v)-(z), wherein the processing circuitry is further configured to:
for each of the plurality of TTIs in which two or more SC-FDMA symbols are to carry user data, de-map channel quality indicator (CQI) data for the TTI as evenly as possible from the two or more SC-FDMA symbols that are to carry user data.

(bb). The receiver apparatus of any of example embodiments (v)-(z), wherein the processing circuitry is further configured to:
for each of the plurality of TTIs in which two or more SC-FDMA symbols are to carry user data, de-map channel quality indicator (CQI) data for the TTI, to the extent possible, from pre-DFT symbols that map to the first SC-FDMA symbol carrying user data, and then de-map any remaining CQI data from one or more subsequent SC-FDMA symbols.

(cc). A non-transitory computer readable storage medium storing a computer program comprising program instructions that, when executed on at least one processing circuit of a transmitting device configured for mapping control information to each of a plurality of transmission time intervals (TTIs), for transmission as Single-Carrier Frequency-Division Multiple Access (SC-FDMA) signals, where each of the plurality of transmission time intervals comprises one or more SC-FDMA symbols and where the control information comprises at least Hybrid Automatic Repeat-Request (HARQ) ACK/NACK data for each of the plurality of TTIs, cause the transmitting device to:
determine, for each of the plurality of TTIs, whether user data to be transmitted in the TTI will be closest in time to a demodulation reference signal (DMRS) transmitted before the user data or to a DMRS transmitted after the user data;
for each of the plurality of TTIs in which user data to be transmitted in the TTI will be closest in time to DMRS transmitted before the user data, map all HARQ ACK/NACK data for the TTI to the earliest in time SC-FDMA symbol of the TTI that carries user data, and to pre-Discrete-Fourier Transform (pre-DFT) symbols closest in time to the DMRS transmitted before the user data;
for each of the plurality of TTIs in which user data to be transmitted in the TTI will be closest in time to DMRS transmitted after the user data, map all HARQ ACK/NACK data for the TTI to the last in time SC-FDMA symbol of the TTI that carries user data, and to pre-DFT symbols closest in time to the DMRS transmitted after the user data; and form, for each of the plurality of TTIs, an SC-FDMA signal from user data and control information for the TTI, based on the mapping of the HARQ ACK/NACK data.

(dd). A non-transitory computer readable storage medium storing a computer program comprising program instructions that, when executed on at least one processing circuit of a receiving device configured for de-mapping control information from each of a plurality of transmission time intervals (TTIs), received as Single-Carrier Frequency-Division Multiple Access (SC-FDMA) signals, where each of the plurality of transmission time intervals comprises one or more SC-FDMA symbols and where the control information comprises at least Hybrid Automatic Repeat-Request (HARQ) ACK/NACK data for each of the plurality of TTIs, cause the receiving device to:
determine, for each of the plurality of TTIs, whether user data received in the TTI is closest in time to a demodulation reference signal (DMRS) transmitted before the user data or to a DMRS transmitted after the user data;

for each of the plurality of TTIs in which user data received in the TTI is closest in time to DMRS transmitted before the user data, de-map all HARQ ACK/NACK data for the TTI from the earliest in time SC-FDMA symbol of the TTI that carries user data, and from post-despreading symbols closest in time to the DMRS transmitted before the user data; and for each of the plurality of TTIs in which user data received in the TTI is closest in time to DMRS transmitted after the user data, de-map all HARQ ACK/NACK data for the TTI from the last in time SC-FDMA symbol of the TTI that carries user data, and from post-despreading symbols closest in time to the DMRS transmitted after the user data.

(ee). A transmitter apparatus, adapted to perform the method of any one of claims (a)-(g).

(ff). A receiver apparatus, adapted to perform the method of any one of claims (o)-(u).

(gg). A computer program, comprising instructions which, when executed on a processing circuit, cause the processing circuit to carry out the method according to any one of claims (a)-(g) and (o)-(u).

(hh). A carrier containing the computer program of claim (gg), wherein the carrier is one of an electronic signal, optical signal, radio signal, or computer readable storage medium.

(ii). A transmitter apparatus configured for map control information to each of a plurality of transmission time intervals (TTIs), for transmission as Single-Carrier Frequency-Division Multiple Access (SC-FDMA) signals, where each of the plurality of transmission time intervals comprises one or more SC-FDMA symbols and where the control information comprises at least Hybrid Automatic Repeat-Request (HARQ) ACK/NACK data for each of the plurality of TTIs, comprising:

a determining module for determining, for each of the plurality of TTIs, whether user data to be transmitted in the TTI will be closest in time to a DMRS transmitted before the user data or to a DMRS transmitted after the user data;

a mapping module for, for each of the plurality of TTIs in which user data to be transmitted in the TTI will be closest in time to DMRS transmitted before the user data, mapping all HARQ ACK/NACK data for the TTI to the earliest in time SC-FDMA symbol of the TTI that carries user data, and to pre-DFT symbols closest in time to the DMRS transmitted before the user data;

the mapping module also for, for each of the plurality of TTIs in which user data to be transmitted in the TTI will be closest in time to DMRS transmitted after the user data, mapping all HARQ ACK/NACK data for the TTI to the last in time SC-FDMA symbol of the TTI that carries user data, and to pre-DFT symbols closest in time to the DMRS transmitted after the user data; and a signal forming module for forming, for each of the plurality of TTIs, an SC-FDMA signal from user data and control information for the TTI, based on the mapping of the HARQ ACK/NACK data.

(jj). A receiver apparatus configured for de-mapping control information from each of a plurality of transmission time intervals (TTIs), received as Single-Carrier Frequency-Division Multiple Access (SC-FDMA) signals, where each of the plurality of transmission time intervals comprises one or more SC-FDMA symbols and where the control information comprises at least Hybrid Automatic Repeat-Request (HARQ) ACK/NACK data for each of the plurality of TTIs, comprising:

a receiving module for receiving, for each of the plurality of TTIs, an SC-FDMA signal;

a determining module for determining, for each of the plurality of TTIs, whether user data received in the TTI is closest in time to a DMRS transmitted before the user data or to a DMRS transmitted after the user data; and a de-mapping module for, for each of the plurality of TTIs in which user data received in the TTI is closest in time to DMRS transmitted before the user data, de-mapping all HARQ ACK/NACK data for the TTI from the earliest in time SC-FDMA symbol of the TTI that carries user data, and from post-despreading symbols closest in time to the DMRS transmitted before the user data;

where the de-mapping module is also for, for each of the plurality of TTIs in which user data received in the TTI is closest in time to DMRS transmitted after the user data, de-mapping all HARQ ACK/NACK data for the TTI from the last in time SC-FDMA symbol of the TTI that carries user data, and from post-despreading symbols closest in time to the DMRS transmitted after the user data.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a transmitting device, of mapping control information within a transmission time interval (TTI) for each of a plurality of transmissions of control information and user data as Single-Carrier Frequency-Division Multiple Access (SC-FDMA) signals, wherein each transmission comprises one or more SC-FDMA symbols and where the control information in each transmission comprises at least Hybrid Automatic Repeat-Request (HARQ) ACK/NACK data, the method comprising:

determining, for each transmission, whether user data to be transmitted in the transmission will be closest in time to a demodulation reference signal (DMRS) transmitted before the user data or to a DMRS transmitted after the user data;

for each transmission in which user data to be transmitted in the transmission will be closest in time to DMRS transmitted before the user data, mapping all HARQ ACK/NACK data for the transmission to the earliest in time SC-FDMA symbol carrying user data within the transmission and to pre-Discrete Fourier Transform (pre-DFT) symbols that correspond to that SC-FDMA symbol and that are closest in time to the DMRS transmitted before the user data;

for each transmission in which user data to be transmitted in the transmission will be for each transmission in which user data to be transmitted in the transmission will be closest in time to DMRS transmitted after the user data, mapping all HARQ ACK/NACK data for the transmission to the last in time SC-FDMA symbol carrying user data within the transmission and to pre-DFT symbols that correspond to that SC-FDMA symbol and that are closest in time to the DMRS transmitted after the user data; and forming, for each of the plurality of transmissions, an SC-FDMA signal from the user data and control information for the transmission, based on the mapping of the HARQ ACK/NACK data.

2. The method of claim 1, wherein the method further comprises, for each of the transmissions:

mapping rank indicator (RI) data for the transmission to the same SC-FDMA symbol to which the HARQ ACK/NACK data is mapped, and to pre-DFT symbols that correspond to that same SC-FDMA symbol but that are as far as possible from the DMRS closest in time to the user data in the transmission; or if two or more SC-FDMA symbols are to carry user data, mapping rank indicator (RI) data for the transmission to an SC-FDMA symbol that carries user data and that is immediately adjacent in time to the SC-FDMA symbol to which the HARQ ACK/NACK data is mapped, and to pre-DFT symbols that correspond to that adjacent SC-FDMA symbol and that are as close as possible to the DMRS closest in time to the user data of the transmission; or mapping rank indicator (RI) data for the transmission to the same SC-FDMA symbol to mapping rank indicator (RI) data for the transmission to the same SC-FDMA symbol to which the HARQ ACK/NACK data is mapped, and to pre-DFT symbols that are as close as possible to the pre-DFT symbols to which the HARQ ACK/NACK data is mapped, given a predetermined maximum number of pre-DFT symbols allocated to HARQ ACK/NACK data.

3. The method of claim 1, wherein the method further comprises:

determining, for each of one or more transmissions, whether more than one SC-FDMA symbol of the transmission is to carry user data;

for each of the one or more transmissions in which only one SC-FDMA symbol is to carry user data, mapping rank indicator (RI) data for the transmission to the same SC-FDMA symbol to which the HARQ ACK/NACK data is mapped, but to pre-DFT symbols that correspond to that same SC-FDMA symbol but that are as far as possible from the DMRS closest in time to the user data of the transmission; and for each of the one or more transmissions in which two or more SC-FDMA symbols are to carry user data, mapping RI data for the transmissions to an SC-FDMA symbol that carries user data and that is immediately adjacent in time to the SC-FDMA symbol to which the HARQ ACK/NACK data is mapped, and to pre-DFT symbols that correspond to that adjacent SC-FDMA symbol and that are as close as possible to the DMRS closest in time to the user data of the transmission.

4. The method of claim 1, the method further comprising, for each of one or more transmissions in which two or more SC-FDMA symbols are to carry user data:

mapping channel quality indicator (CQI) data for the transmission as evenly as possible to the two or more SC-FDMA symbols that are to carry user data; or mapping channel quality indicator (CQI) data for the transmission, to the extent possible, to pre-DFT symbols that correspond to the first SC-FDMA symbol carrying user data for the transmission, and mapping any remaining CQI data to one or more subsequent SC-FDMA symbols of the transmission.

5. A user equipment (UE) configured to map control information within a transmission time interval (TTI) for each of a plurality of transmissions of control information and user data as Single-Carrier Frequency-Division Multiple Access (SC-FDMA) signals, wherein each transmission comprises one or more SC-FDMA symbols and where the control information in each transmission comprises at least Hybrid Automatic Repeat-Request (HARQ) ACK/NACK data, the UE comprising:

processing circuitry configured to:

determine, for each transmission, whether user data to be transmitted in the transmission will be closest in time to a demodulation reference signal (DMRS) transmitted before the user data or to a DMRS transmitted after the user data;

for each of the plurality of transmissions in which user data to be transmitted in the transmission will be closest in time to DMRS transmitted before the user data, map all HARQ ACK/NACK data for the transmission to the earliest in time SC-FDMA symbol carrying data within the transmission, and to pre-Discrete-Fourier Transform (pre-DFT) symbols that correspond to that SC-FDMA symbol and that are closest in time to the DMRS transmitted before the user data;

for each transmission in which user data to be transmitted in the transmission will be closest in time to DMRS transmitted after the user data, map all HARQ ACK/NACK data for the transmission to the last in time SC-FDMA symbol carrying user data within the transmission, and to pre-DFT symbols that correspond to that SC-FDMA and that are closest in time to the DMRS transmitted after the user data; and form, for each of the plurality of transmissions, an SC-FDMA signal from the user data and control information for the transmission, based on the mapping of the HARQ ACK/NACK data; and transmitter circuitry configured to transmit the SC-FDMA signals.

6. The UE of claim 5, wherein the processing circuitry is further configured, for each of the transmissions, to:

map rank indicator (RI) data for the transmission to the same SC-FDMA symbol to which the HARQ ACK/NACK data is mapped, and to pre-DFT symbols that correspond to that same SC-FDMA symbol but that are as far as possible from the DMRS closest in time to the user data of the transmission; or if two or more SC-FDMA symbols are to carry user data, map rank indicator (RI) data for the transmission to an SC-FDMA symbol that carries user data and that is immediately adjacent in time to the SC-FDMA symbol to which the HARQ ACK/NACK data is mapped, and to pre-DFT symbols that correspond to that adjacent SC-FDMA symbol and that are as close as possible to the DMRS closest in time to the user data of the transmission; or map rank indicator (RI) data for the transmission to the same SC-FDMA symbol to which map rank indicator (RI) data for the transmission to the same SC-FDMA symbol to which the HARQ ACK/NACK data is mapped, and to pre-DFT symbols that as close as possible to the pre-DFT symbols to which the HARQ ACK/NACK data is mapped, given a predetermined maximum number of pre-DFT symbols allocated to HARQ ACK/NACK data.

7. The UE of claim 5, wherein the processing circuitry is further configured to:
- determine, for each of one or more transmissions, whether more than one SC-FDMA symbol of the transmission is to carry user data;
- for each of the one or more transmissions in which only one SC-FDMA symbol is to carry user data, map rank indicator (RI) data for the transmission to the same SC-FDMA symbol to which the HARQ ACK/NACK data is mapped, but to pre-DFT symbols that correspond to that same SC-FDMA symbol but that are as far as possible from the DMRS closest in time to the user data of the transmission;
- for each of the one or more transmissions in which two or more SC-FDMA symbols are to carry user data, map RI data for the transmission to an SC-FDMA symbol that carries user data and that is immediately adjacent in time to the SC-FDMA symbol to which the HARQ ACK/NACK data is mapped, and to pre-DFT symbols that correspond to that adjacent SC-FDMA symbol and that are as close as possible to the DMRS closest in time to the user data of the transmission.

8. The UE of claim 5, wherein the processing circuitry is further configured to, for each of one or more transmissions in which two or more SC-FDMA symbols are to carry user data:
- map channel quality indicator (CQI) data for the transmission as evenly as possible to the two or more SC-FDMA symbols that are to carry user data; or
- map channel quality indicator (CQI) data for the transmission, to the extent possible, to pre-DFT symbols that correspond to the first SC-FDMA symbol carrying user data for the transmission, and map any remaining CQI data to one or more subsequent SC-FDMA symbols of the transmission.

9. A method, in a receiving device, of de-mapping control information from within a transmission time interval (TTI) for each of a plurality of transmissions of control information and user data received as Single-Carrier Frequency-Division Multiple Access (SC-FDMA) signals, where each of the plurality of transmissions comprises one or more SC-FDMA symbols and where the control information in each transmission comprises at least Hybrid Automatic Repeat-Request (HARQ) ACK/NACK data, the method comprising:
- receiving, for each of the plurality of transmissions, an SC-FDMA signal;
- determining, for each of the plurality of transmissions, whether user data received in the transmission is closest in time to a demodulation reference signal (DMRS) transmitted before the user data or to a DMRS transmitted after the user data;
- for each of the plurality of transmissions in which user data received in the transmission is closest in time to DMRS transmitted before the user data, de-mapping all HARQ ACK/NACK data for the transmission from the earliest in time SC-FDMA symbol carrying user data in the transmission, and from post-despreading symbols that correspond to that SC-FDMA symbol and that are closest in time to the DMRS transmitted before the user data; and
- for each of the plurality of transmissions in which user data received in the transmission is closest in time to DMRS transmitted after the user data, de-mapping all HARQ ACK/NACK data for the transmission from the last in time SC-FDMA symbol carrying user data in the transmission, and from post-despreading symbols that correspond to that SC-FDMA symbol and that are closest in time to the DMRS transmitted after the user data.

10. The method of claim 9, wherein the method further comprises, for each of the received transmissions:
- de-mapping rank indicator (RI) data for the transmission from the same SC-FDMA symbol to which the HARQ ACK/NACK data is mapped, but from post-despreading symbols that correspond to that same SC-FDMA symbol but that are as far as possible from the DMRS closest in time to the user data of the transmission; or
- if two or more SC-FDMA symbols carry user data, de-mapping rank indicator (RI) data for the transmission from an SC-FDMA symbol that carries user data and that is immediately adjacent in time to the SC-FDMA symbol to which the HARQ ACK/NACK data is mapped, and from post-despreading symbols that correspond to that adjacent SC-FDMA symbol and that are as close as possible to the DMRS closest in time to the user data of the transmission; or
- de-mapping rank indicator (RI) data for the transmission from the same SC-FDMA symbol to which the HARQ ACK/NACK data is mapped, and from post-despreading symbols that as close as possible to the post-despreading symbols to which the HARQ ACK/NACK data is mapped, given a predetermined maximum number of post-despreading symbols allocated to HARQ ACK/NACK data.

11. The method of claim 9, wherein the method further comprises:
- determining, for each of one or more of the received transmissions, whether more than one SC-FDMA symbol of the transmission carry user data;
- for each of the one or more of the received transmissions in which only one SC-FDMA symbol carry user data, de-mapping rank indicator (RI) data for the transmission from the same SC-FDMA symbol to which the HARQ ACK/NACK data is mapped, but from post-despreading symbols that correspond to that same SC-FDMA symbol but that are as far as possible from the DMRS closest in time to the user data of the transmission;
- for each of the one or more of the received transmissions in which two or more SC-FDMA symbols carry user data, de-mapping RI data for the transmission from an SC-FDMA symbol that carries user data and that is immediately adjacent in time to the SC-FDMA symbol to which the HARQ ACK/NACK data is mapped, and from post-despreading symbols that correspond to that adjacent SC-FDMA symbol and that are as close as possible to the DMRS closest in time to the user data of the transmission.

12. The method of claim 9, the method further comprising:
- for each of one or more of the received transmissions in which two or more SC-FDMA symbols carry user data, de-mapping channel quality indicator (CQI) data for the transmission as evenly as possible from the two or more SC-FDMA symbols that carry user data.

13. An eNodeB configured to de-map control information from within a transmission time interval (TTI) for each of a plurality of transmissions of control information and user data received as Single-Carrier Frequency-Division Multiple Access (SC-FDMA) signals, where each of the plurality of transmissions comprises one or more SC-FDMA symbols and where the control information in each transmission comprises at least Hybrid Automatic Repeat-Request (HARQ) ACK/NACK data, the eNodeB comprising:
receiver circuitry configured to receive, for each of the plurality of transmissions, an SC-FDMA signal; and
processing circuitry configured to:
determine, for each of the plurality of transmissions, whether user data received in the transmission is closest in time to a demodulation reference signal (DMRS) transmitted before the user data or to a DMRS transmitted after the user data;
for each of the plurality of transmissions in which user data received in the transmission is closest in time to DMRS transmitted before the user data, de-map all HARQ ACK/NACK data for the transmission from the earliest in time SC-FDMA symbol carrying data in the transmission, and from post-despreading symbols that correspond to that SC-FDMA symbol and that are closest in time to the DMRS transmitted before the user data; and
for each of the plurality of transmissions in which user data received in the transmission is closest in time to DMRS transmitted after the user data, de-map all HARQ ACK/NACK data for the transmission from the last in time SC-FDMA symbol carrying user data in the transmission, and from post-despreading symbols that correspond to that SC-FDMA symbol and that are closest in time to the DMRS transmitted after the user data.

14. The eNodeB of claim 13, wherein the processing circuitry is further configured to, for each of the transmissions:
de-map rank indicator (RI) data for the transmission from the same SC-FDMA symbol to which
the HARQ ACK/NACK data is mapped, but from post-despreading symbols that correspond to that same SC-FDMA symbol but that are as far as possible from the DMRS closest in time to the user data of the transmission; or
if two or more SC-FDMA symbols carry user data, de-map rank indicator (RI) data for the transmission from an SC-FDMA symbol that carries user data and that is immediately adjacent in time to the SC-FDMA symbol to which the HARQ ACK/NACK data is mapped, and from post-despreading symbols that correspond to that adjacent SC-FDMA symbol and that are as close as possible to the DMRS closest in time to the user data of the transmission; or de-map rank indicator (RI) data for the transmission from the same SC-FDMA symbol to which the HARQ ACK/NACK data is mapped, and from post-despreading symbols that as close as possible to the post-despreading symbols to which the HARQ ACK/NACK data is mapped, given a predetermined maximum number of post-despreading symbols allocated to HARQ ACK/NACK data.

15. The eNodeB of claim 13, wherein the processing circuitry is further configured to:
determine, for each of one or more transmissions, whether more than one SC-FDMA symbol of the transmission carries user data;
for each of the one or more transmissions in which only one SC-FDMA symbol carry user data, de-map rank indicator (RI) data for the transmission from the same SC-FDMA symbol to which the HARQ ACK/NACK data is mapped, but from post-despreading symbols that correspond to that same SC-FDMA symbol but that are as far as possible from the DMRS closest in time to the user data of the transmission;
for each of the one or more transmissions in which two or more SC-FDMA symbols carry user data, de-map RI data for the transmission from an SC-FDMA symbol that carries user data and that is immediately adjacent in time to the SC-FDMA symbol to which the HARQ ACK/NACK data is mapped, and from post-despreading symbols that correspond to that adjacent SC-FDMA symbol and that are as close as possible to the DMRS closest in time to the user data of the transmission.

16. The eNodeB of claim 13, wherein the processing circuitry is further configured to, for each of one or more transmissions in which two or more SC-FDMA symbols carry user data:
de-map channel quality indicator (CQI) data for the transmission as evenly as possible from
the two or more SC-FDMA symbols that carry user data; or
if two or more SC-FDMA symbols carry user data, de-map channel quality indicator (CQI) data for the transmission, to the extent possible, from pre-DFT symbols that map to the first SC-FDMA symbol carrying user data, and then de-map any remaining CQI data from one or more subsequent SC-FDMA symbols.

* * * * *